United States Patent [19]

Matsui et al.

[11] Patent Number: 4,661,231

[45] Date of Patent: Apr. 28, 1987

[54] FLUOROCARBON POLYMERS AND PROCESSES FOR THEIR PREPARATION

[75] Inventors: Kiyohide Matsui, Sagamihara; Yoshiyuki Kikuchi, Tokyo; Tamejiro Hiyama, Sagamihara; Etsuko Tobita, Tokyo; Kiyoshi Kondo, Yamato, all of Japan

[73] Assignees: Toyo Soda Manufacturing Co., Ltd., Shin-nanyo; Sagami Chemical Research Center, Tokyo, both of Japan

[21] Appl. No.: 792,860

[22] Filed: Oct. 30, 1985

Related U.S. Application Data

[62] Division of Ser. No. 566,431, Dec. 28, 1983, Pat. No. 4,567,206.

[30] Foreign Application Priority Data

Dec. 28, 1982 [JP] Japan ............................ 57-227443
Jun. 29, 1983 [JP] Japan ............................ 58-116062
Oct. 17, 1983 [JP] Japan ............................ 58-192473

[51] Int. Cl.$^4$ ..................... C25B 9/00; C08D 5/20; B01D 13/00
[52] U.S. Cl. ............................. 204/252; 204/296; 204/301; 210/321.2
[58] Field of Search ................ 521/27; 204/295, 252, 204/301

[56] References Cited

U.S. PATENT DOCUMENTS

| | | | |
|---|---|---|---|
| 4,082,701 | 4/1978 | Fries et al. | 521/32 |
| 4,107,097 | 8/1978 | Seita et al. | 521/32 |
| 4,113,585 | 1/1978 | Resnick. | |
| 4,298,699 | 11/1981 | Asowa et al. | 521/31 |
| 4,360,434 | 11/1982 | Kawaguchi et al. | 521/27 |

FOREIGN PATENT DOCUMENTS 2247495 1/1982 France.
2396030 2/1982 France.
6706967 11/1968 Netherlands.

OTHER PUBLICATIONS

L. M. Yagupol'skii et al, "Quaternary Ammonium Salts with Perfluoroalkyl Groups at the Nitrogen Atom," Plenum Publishing Corporation, UDC 547.416, 1981.

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A fluorocarbon polymer comprising a perfluorocarbon main chain and a pendant chain attached to the main chain, characterized in that the pendant chain has a quaternary ammonium type terminal group.

12 Claims, No Drawings

FLUOROCARBON POLYMERS AND PROCESSES FOR THEIR PREPARATION

This is a division of application Ser. No. 566,431, filed Dec. 28, 1983, now U.S. Pat. No. 4,567,206.

The present invention relates to novel quaternary ammonium type polyemrs useful as highly durable anion exchangers and to novel nitrogen-containing fluorocarbon polymers useful as intermediates for the preparation of the quaternary ammonium type polymers. The present invention also relates to processes for preparing such novel polymers.

Anion exchangers, particularly membrane-type anion exchangers, are practically used in the fields of e.g. electrodialysis, diffusion dialysis and various electric cells.

For such membrane-type ion exchangers, it has been common to employ a copolymer or a polymer mixture obtainable by a various combination of hydrocarbon monomers, to which anion exchange groups have been introduced by a polymer reaction.

However, such conventional anion exchangers are likely to be materially deteriorated when subjected to severe conditions, for instance, when used in the presence of e.g. chlorine or a strong base, or when subjected to the repetition of swelling and contruction. Therefore, it is desired to develop an anion exchanger which is durable even under such severe conditions.

As a membrane-type anion exchanger developed to improve the durability, there has been known an exchanger prepared by mixing a fluorinated polymer such as poly(tetrafluoroethylene) and an inorganic anion exchanger such as a hydrate of zirconium oxide, and press-molding the mixture (Japanese Unexamined Patent Publication No. 35079/1975). However, the ion exchange capacity of an inorganic anion exchanger composed of such an amphoteric metal oxide is usually largely dependent on the hydrogen ion concentration in the environment in which it is used. In some cases, an inversion of the ion exchange ability will take place. For instance, the hydrate of zirconium oxide acts as an anion exchanger at a pH of 6 or less, but it acts as a cation exchanger at a pH greater than 6. Further, it exhibits no substantial ion exchange ability under a neutral condition. Thus, the condition under which the membrane-type anion exchanger comprising such an ion exchanger may be used, is substantially restricted.

Further, it is also known to obtain a durable membrane by fluorinating the surface of a hydrocarbon anion exchange membrane (Japanese Unexamined Patent Publication No. 4489/1977). However, according to this method, it is usually difficult to accomplish adequate fluorination, and it is thereby hardly possible to obtain an anion exchange membrane having adequate properties required for practical industrial purposes.

In view of the superior durability of the fluorinated polymer, the present inventors have conducted extensive researches to develop an anion exchanger using the fluorinated polymer as the base material, and have invented a quaternarty ammonium type polymer which is useful as an anion exchanger having superior durability and a process for its preparation. The present inventors have also found novel nitrogen-containing fluorocarbon polymers which are useful as intermediates for the preparation of the quaternary ammonium type polymer, and process for their preparation.

Namely, the present invention provides a quaternary ammonium type polymer comprising a perfluorocarbon main chain and a pendant chain attached to the main chain, characterized in that the pendant chain has a quaternary ammonium type terminal group represented by the formula:

(I) where Q is

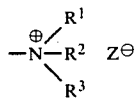

(where each of $R^1$ and $R^2$ is a lower alkyl group, an aromatic group or a hydroxy-lower alkyl group, or $R^1$ and $R^2$ together form a tetramethylene or pentamethylene group, $R^3$ is a lower alkyl group, and Z is a counter ion for the quaternary ammonium ion),

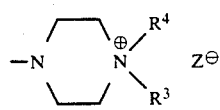

(where $R^4$ is a lower alkyl group, and $R^3$ and Z are as defined above),

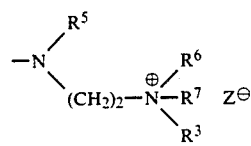

(where $R^5$ is a hydrogen atom or a lower alkyl group, each of $R^6$ and $R^7$ is a lower alkyl group, or $R^6$ and $R^7$ together form a tetramethylene or pentamethylene group, and $R^3$ and Z are as defined above), or

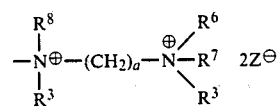

(where $R^8$ is a lower alkyl group, a is an integer of 3 to 5, and $R^3$, $R^6$, $R^7$ and Z are as defined above).

The quaternary ammonium type polymer can be prepared by a process which comprises reacting a nitrogen-containing fluorocarbon polymer comprising a perfluorocarbon main chain and a pendant chain attached to the main chain and having a terminal group represented by the formula:

(II) where Y is

(where each of $R^{1'}$ and $R^{2'}$ is a hydrogen atom, a lower alkyl group, an aromatic group or a hydroxy-lower alkyl group, or $R^{1'}$ and $R^{2'}$ together form a tetramethylene or pentamethylene group),

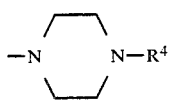

(where $R^4$ is a lower alkyl group), or

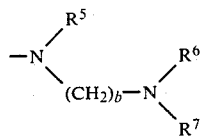

(where $R^5$ is a hydrogen atom or a lower alkyl group, each of $R^6$ and $R^7$ is a lower alkyl group, or $R^6$ and $R^7$ together form a tetramethylene or pentamethylene group, and b is an integer of 2 to 5), with an alkylating agent to convert the terminal group of the formula II to the terminal group of the formula I.

The nitrogen-containing fluorocarbon polymer having terminal groups of the formula II, is a novel intermediate. It can be prepared by a process which comprises reacting a fluorocarbon polymer comprising a perfluorocarbon main chain and a pendant chain attached to the main chain and having a carboxylic acid amide terminal group represented by the formula:

 (III)

where Y is as defined above, with a reducing agent to convert the terminal group of the formula III to the terminal group of the formula II.

The nitrogen-containing fluorocarbon polymer having terminal groups of the formula III, is also a novel polymer. It can be prepared by a process which comprises reacting a fluorocarbon polymer comprising a perfluorocarbon main chain and a pendant chain attached to the main chain and having a substituted carbonyl terminal group represented by the formula:

 (IV)

where W is a halogen atom, a hydroxyl group unsubstituted or substituted by a tri(lower alkyl)silyl group or an ammonium group, or a lower alkoxy group, with ammonia or an amine represented by the formula:

 (V)

where Y is as defined above, to convert the terminal group of the formula IV to the terminal group of the formula III.

In this specification, the pendant chain is meant for a substituted or unsubstituted alkyl group, a perfluoro alkyl group or an aromatic group, which is attached to a main chain of a perfluorocarbon polymer. A hetero atom or an organic ring may be present between the carbon-carbon bond of the pendant chain.

Now, the present invention will be described in detail with reference to the preferred embodiments.

In a typical quaternary ammonium type polymer of the present invention, the pendant chains have a structure represented by the formula:

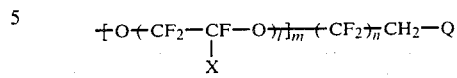

where X is a fluorine atom, a chlorine atom or a $-CF_3$ group, l is an integer of 0 to 5, m is 0 or 1, n is an integer of 1 to 5, and, Q is as defined above. The integers l, m and n may be the same or different among the pendant groups. Namely, the respective pendant groups have the same integers l, m and n when they are derived from the same fluoroolefin monomer, whereas they have different integers l, m and n when they are derived from different fluoroolefin monomers, as in the case of a copolymer prepared by copolymerizing at least two fluoroolefin monomers having different l, m and n with a principal chain-forming perfluorocarbon monomer.

In the quaternary ammonium type polymer of the present invention, the main chain is preferably a linear perfluorocarbon random polymer chain which comprises repeating units represented by the formula:

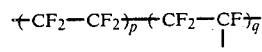

where p is an integer of 3 to 16, q is an integer of 1 to 10, and the ratio of $p'/q'$ is within a range of from 2 to 16 where $p'$ is an average value of all p in the repeating units and $q'$ is an average value of all q in the repeating units.

Accordingly, a preferred quaternary ammonium type polymer of the present invention comprises repeating units represented by the formula:

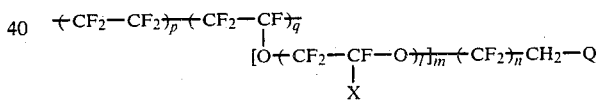

where p, q, X, l, m, n and Q are as defined above. In the above formula.

The quaternary ammonium type terminal group of the pendant chain is represented by the formula $-CH_2-Q$.

Q is selected from the group consisting of:

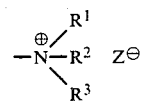 (I)

where each of $R^1$ and $R^2$ is a lower alkyl group such as methyl, ethyl, n- or i-propyl, or n-, i-, s- or t-butyl; an aromatic group such as phenyl, tolyl, p-chlorophenyl, p-methoxyphenyl, furyl or thienyl; or a hydroxy-lower alkyl group such as 2-hydroxyethyl, 2-hydroxy-n-propyl or 3-hydroxy-n-propyl; or $R^1$ and $R^2$ together form a tetramethylene or pentamethylene group; $R^3$ is a lower alkyl group such as methyl, ethyl, n- or i-propyl, or n-, i-, s- or t-butyl, which is derived from an alkylating agent mentioned hereinafter; and Z is a counter ion for the quaternary ammonium ion, e.g. an anion of a halogen atom such as bromine or iodine; a super strong acid ion such as tetrafluoroborate ion, hexachloroantimonic acid ion or a trifluoromethanesulfonic acid; a sulfonic acid ion such as a benzenesulfonic acid ion or a toluene-sulfonic acid ion; a carboxylic acid ion such as an acetic acid ion; or a monoalkylsulfuric acid ion;

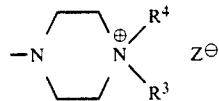

where $R^4$ is a lower alkyl group such as methyl, ethyl, n- or i-propyl, or n-, i-, s- or t-butyl; and $R^3$ and Z are as defined above;

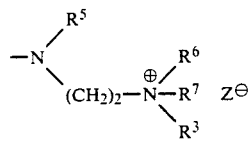

where $R^5$ is a hydrogen atom; or a lower alkyl group such as methyl, ethyl, n- or i-propyl, or n-, i-, s- or t-butyl; each of $R^6$ and $R^7$ is a lower alkyl group such as methyl, ethyl, n- or i-propyl, or n-, i-, s- or t-butyl; or $R^6$ and $R^7$ together form a tetramethylene or pentamethylene group; and $R^3$ and Z are as defined above; and

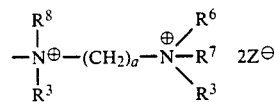

where $R^8$ is a lower alkyl group such as methyl, ethyl, n- or i-propyl, or n-, i-, s- or t-butyl; a is an integer of 3 to 5; and $R^3$, $R^6$, $R^7$ and Z are as defined above.

From the viewpoint of usefulness as the ion-exchanger, it is most preferred that the pendant chain has terminal groups of the formulae:

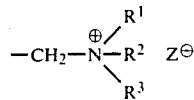

in terms of much higher resistance of the resulting ion exchanger to chlorine,

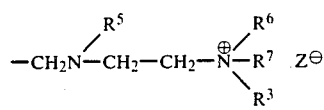

in terms of much higher resistance to bases and

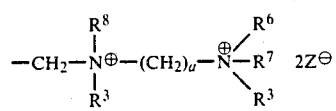

in terms of much lower electric resistance. In the formulae $R^1$, $R^2$, $R^3$, $R^6$, $R^7$, $R^8$, a and Z are as defined above. Particularly preferred specific terminal groups are

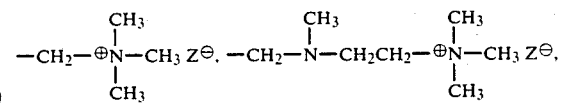

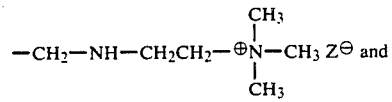

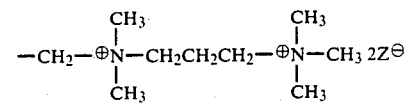

The quaternary ammonium type fluorocarbon polymer of the present invention may have, for example, the following repeating units:

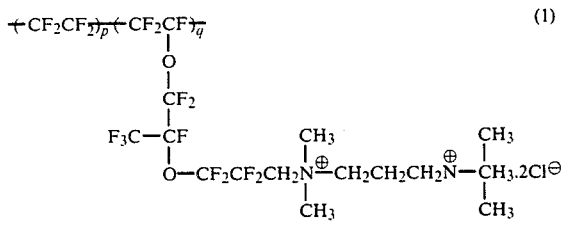

(1)

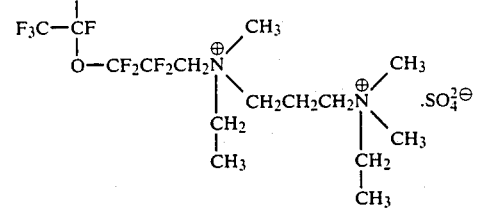

(2)

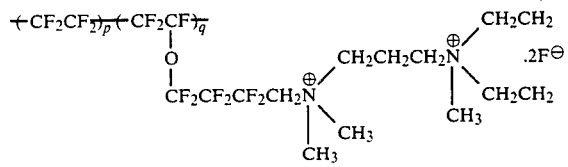

(3)

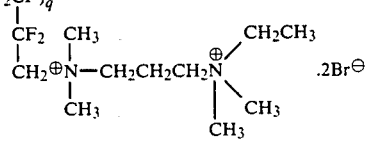

(4)

-continued
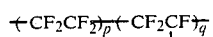
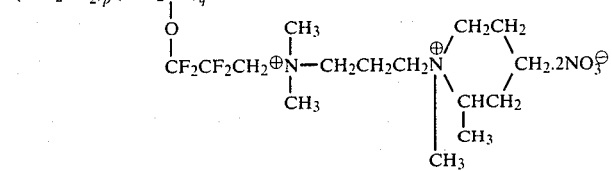
(5)
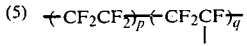
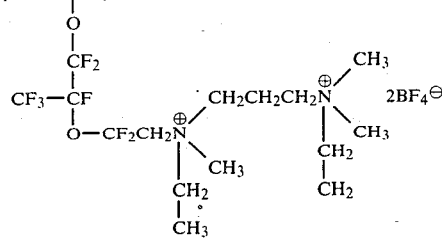
(6)
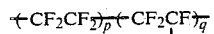
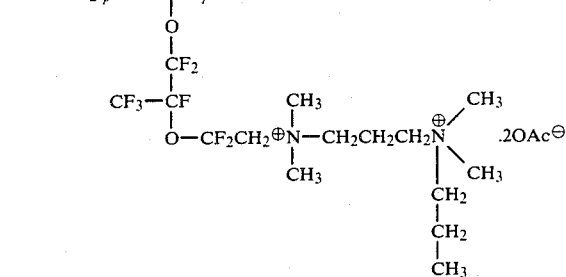
(7)
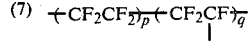
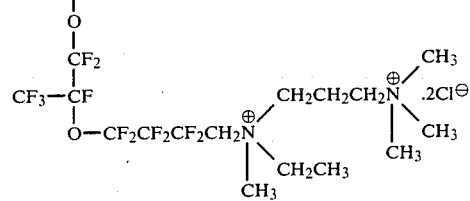
(8)
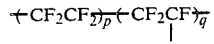
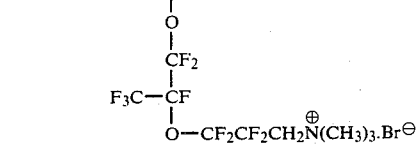
(9)
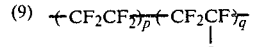
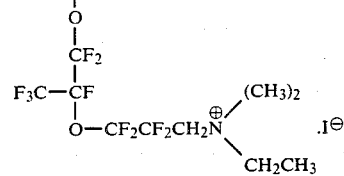
(10)
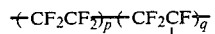
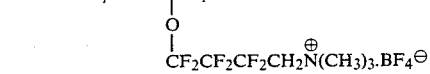
(11)
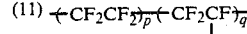
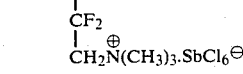
(12)
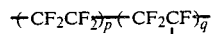
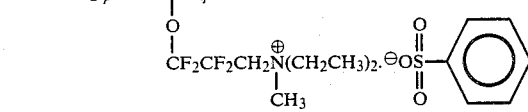
(13)
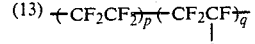
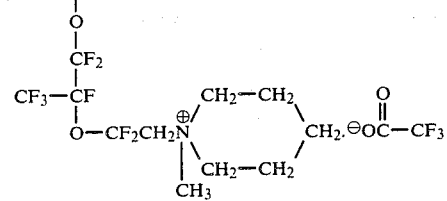
(14)
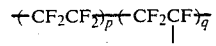
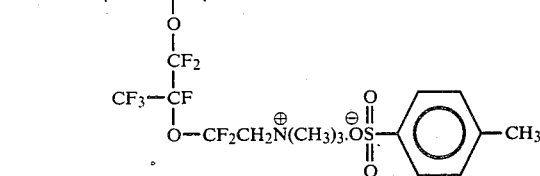
(15)
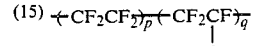
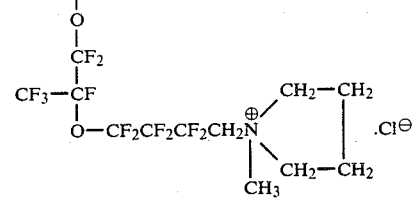
(16)
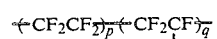
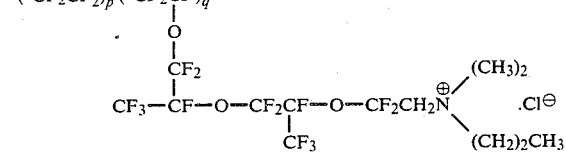
(17)
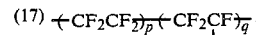
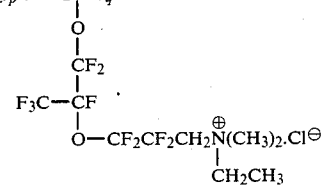
(18)

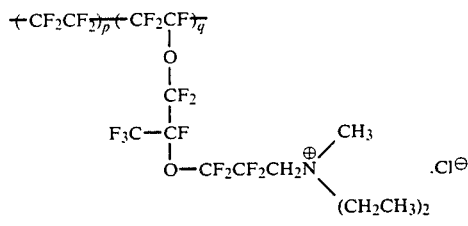
(19)

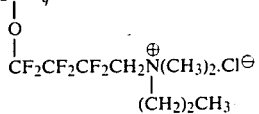
(20)

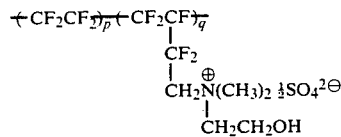

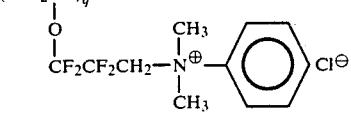
(21)                                                    (22)

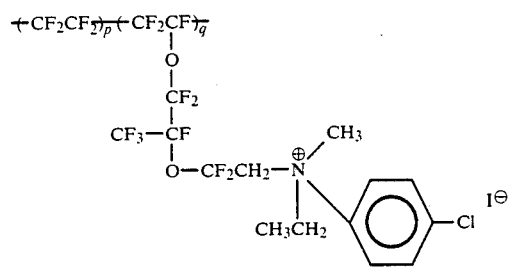

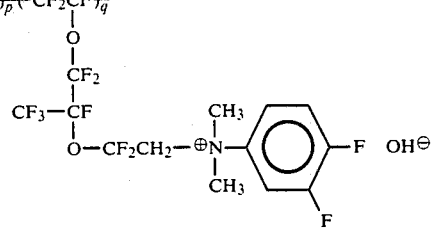
(23)                                                    (24)

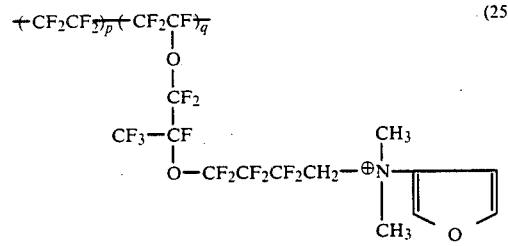

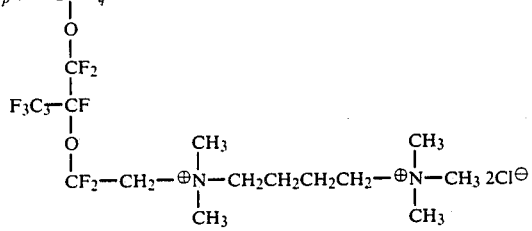
(25)                                                    (26)

The quaternary ammonium type fluorocarbon polymer of the present invention has a excellent physical strength, dimension stability and toughness, and further a favorable flexibility especially in the form of membrane.

The quaternary ammonium type fluorocarbon polymer of the present invention contains a hydrocarbon group as a part thereof. Nevertheless, it is extremely resistant to oxidation, particularly oxidation by chlorine and shows superior resistance to solvents and bases. Further, even when subjected to the repetition of the contraction by drying and the swelling in a solvent (inclusive of water), it undergoes no substantial property change, and its handling is very easy as compared with conventional anion exchangers. For instance, in the form of a membrane, the quaternary ammonium type polymer of the present invention is useful for applications for which conventional anion exchange membranes are hardly useful, e.g. as a diaphragm for an organic electrolytic reaction, or as a membrane for various dialyses conducted under severe conditions. It is useful in various forms as a resin which is capable of performing anion exchange with the quaternary ammonium ions in the presence of various solvents. Furthermore, it is useful as a catalyst for various reactions, for instance, as a catalyst for the synthesis of cyanohydrin, as a phase transfer catalyst, or as a halogenation reaction catalyst.

Further, in a tubular form, the quaternary ammonium polymer may be employed as a multi-tube module in a space-saving dialysis apparatus. It is useful also for an undesirable anion removal system in an ion chromatography. As opposed to conventional cross-linked type anion exchangers, the anion exchanger of the quaternary ammonium type polymer of the present invention is a non-cross-liked type, and accordingly, it can readily be adapted to a change of the environment in which it is used.

The anion exchange membrane of the present invention may have a greater number of ion exchange groups per a pendant group, which results in a lower membrane resistance, than the membrane from which it is prepared, and thus providing an advantage that it gives a low cell voltage, when used for electrolysis.

Thus, the quaternary ammonium type polymer of the present invention has a significant industrial value by virtue of the superior durability, etc.

It is known that a fluorinated polymer, particularly a perfluorocarbon polymer, is far superior in the heat resistance and the chemical resistance to common hydrocarbon polymers. Whereas, the quaternary ammonium type polymer of the present invention has an unexpectedly high durability in spite of the fact that its pendant chains contain hydrocarbon groups. Namely, while the main chain may be stabilized by its nature as a perfluorocarbon polymer chain, it has been expected impossible to avoid a degradation or decomposition of the hydrocarbon groups in the pendant groups and the consequential elimination of the functional groups if the polymer is subjected to severe conditions. Therefore, it has been totally unexpected that the quaternary ammonium type polymer containing hydrocarbon groups is substantially free from such degradation.

The quaternary ammonium type fluorocarbon polymer having terminal groups of the formula I is prepared by a process which comprises reacting a novel nitrogen-containing fluorocarbon polymer comprising a perfluorocarbon main chain and a pendant chain attached to the main chain and having a terminal group represented by the formula:

$$-CH_2-Y \qquad (II)$$

where Y is as defined above, with an alkylating agent to convert the terminal group of the formula II to the terminal group of the formula I.

The alkylating agent used in the above process may be represented by the formula:

$$R^3A$$

where $R^3$ is a lower alkyl group, as mentioned above, and A is a residual group of the alkylating agent other than the lower alkyl group, which is released at the time of the alkylation. For example, $R^3$ may be methyl, ethyl, n- or i-propyl, or n-, i-, s- or t-butyl, and A may be an iodine atom, a bromine atom, a dimethyloxonium fluoroborate group, a diethyloxonium fluoroborate group, a dimethyloxonium hexafluoroantimonate group, a trifluoroacetic acid group, a trifluoromethanesulfonic acid group, a monomethylsulfuric acid group, a p-toluenesulfonic acid group or a p-nitrobenzenesulfonic acid group. Thus, as the alkylating agent, there may be mentioned a lower alkyl iodide, bromide or ester of a strong acid, or a tri(lower alkyl)oxonium salt of a super acid, such as methyl iodide, ethyl bromide, n-propyl bromide, n-butyl iodide, trimethyloxonium fluoroborate ($(CH_3)_3OBF_4$), triethyloxonium fluoroborate ($(C_2H_5)_3OBF_4$), trimethyloxonium hexachloroantimonate ($(CH_3)_3OSbCl_6$), dimethyl sulfate, methyl trifluoroacetate, methyl trifluoromethanesulfonate, methyl p-toluenesulfonate or ethyl p-nitrobenzenesulfonate.

For the alkylation, there may be employed a solvent such as methanol, ethanol, methylene chloride, chloroform, carbon tetrachloride, tetrahydrofuran, sulforane, N,N-dimethylformamide (DMF), nitromethane or N-methyl-2-pyrrolidone (NMP).

The alkylation can be conducted under conditions which are commonly employed in alkylation of this type. For instance, it can readily be carried out by contacting the nitrogen-containing fluorocarbon polymer as the starting material, with the alkylating agent or its solution at a temperature of from about 0° to about 100° C.

The alkylating agent is used in an amount of at least a stoichiometric amount, preferably at least twice the stoichiometric amount, relative to the amino group to be converted to the quaternary ammonium group. In order to let the reaction proceed quickly and completely, it is common to employ the alkylating agent in a large excess amount.

When a solvent is employed, it is advisable to use it in a sufficient amount so that the fluorocarbon polymer is adequately immersed therein.

The alkylation reaction rate may vary depending upon the species of the alkylating agent used, reaction conditions such as the temperature, the solvent, etc., but it may usually be conducted under the above-mentioned conditions for about 10 hours to about 5 days.

In the case where the terminal group of the formula

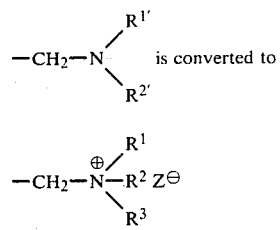

is converted to by the alkylation, if $R^{1'}$ and $R^{2'}$ are lower alkyl groups, $R^1$ and $R^2$ will be the same as $R^{1'}$ and $R^{2'}$, respectively, whereas if $R^{1'}$ and $R^{2'}$ are hydrogen atoms, they will be substituted by $R^3$ of the alkylating agent, i.e. $R^1$ and $R^2$ will be the same as $R^3$ derived from the alkylating agent.

Likewise, in the case where the pendant group of the formula:

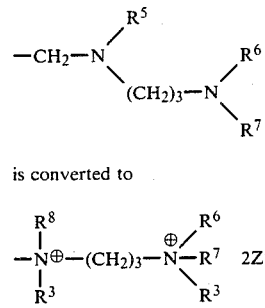

is converted to by the alkylation, if $R^5$ is a lower alkyl group, $R^8$ will be the same as $R^5$, whereas if $R^5$ is a hydrogen atom, it will be substituted by $R^3$ of the alkylating agent, i.e. $R^8$ will be the same as $R^3$ derived from the alkylating agent.

$R^3$ is a lower alkyl group derived from the alkylating agent. Z is a counter ion for the quaternary ammonium ion, which is usually derived also from the alkylating agent. As such a counter ion, there may be mentioned an anion of a halogen atom, such as bromine or iodine, a super strong acid ion such as a tetrafluoroborate ion, a hexachloroantimonic acid ion or a trifluoromethanesulfonic acid ion, a sulfonic acid ion such as a benzenesulfonic acid ion or a toluenesulfonic acid ion, a carboxylic acid ion such as an acetic acid ion, or a monoalkylsulfuric acid ion. These counter ions may be substituted by other ions, as the case requires. The substitution of ions can readily be made by a conventional method, for example, by treating the quaternary ammonium type fluorocarbon polymer obtained by the process of the present invention, with an alkali metal salt such as NaCl, LiCl, LiBr, LiI, NaOH, KOH, NaNO$_3$ or K$_2$SO$_4$.

The starting material fluorocarbon polymer having terminal groups of the formula II may be used in any desired form such as in a flat membrane form, a tubular form, a fiber form or a powder form, whereby the final quaternary ammonium type polymer is obtainable in the corresponding form. Thus, an anion exchanger of the quaternary ammonium type polymer may be obtained in any desired form by so selecting the form of the starting material.

The nitrogen-containing fluorocarbon polymer having terminal groups of the formula II used as the starting material in the above process, is also a novel polymer. It preferably has pendant groups represented by the formula:

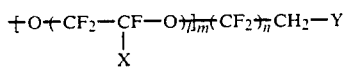

where X is a fluorine atom, a chlorine atom or a —CF$_3$ group, l is an integer of 0 to 5, m is 0 or 1, n is an integer of 1 to 5, and Y is as defined above. The integers l, m and n may be the same or different among the pendant groups, as mentioned above with respect to the pendant groups of the typical quaternary ammonium type polymer of the present invention.

In the nigrogen-containing fluorocarbon polymer, the main chain is preferably a linear perfluorocarbon random polymer chain which comprises repeating units represented by the formula:

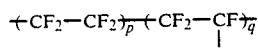

where p is an integer of 3 to 16, q is an integer of 1 to 10, and the ratio of p'/q' is within a range of from 2 to 16 where p' is an average value of all p in the repeating units and q' is an average value of all q in the repeating units.

Accordingly, a preferred nitrogen-containing fluorocarbon polymer having terminal groups of the formula II comprises repeating units represented by the formula:

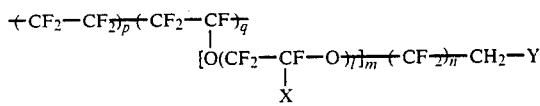

where p, q, l, m, n, X and Y are as defined above.

The terminal group of the nitrogen-containing fluorocarbon polymer is represented by the formula —CH$_2$—Y where Y is selected from the group consisting of

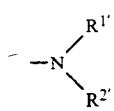

where each of R$^{1'}$ and R$^{2'}$ is hydrogen atom; a lower alkyl group such as methyl, ethyl, n- or i-propyl, or n-, i-, s- or t-butyl; an aromatic group such as phenyl, tolyl, p-chlorophenyl, p-methoxyphenyl, furyl or thienyl; or a hydroxy-lower alkyl group such as 2-hydroxyethyl, 2-hydroxy-n-propyl or 3-hydroxy-n-propyl; or R$^{1'}$ and R$^{1'}$ together form a tetramethylene or pentamethylene group;

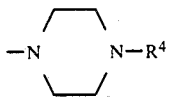

where R$^4$ is a lower alkyl group such as methyl, ethyl, n- or i-propyl, or n-, i-, s- or t-butyl;

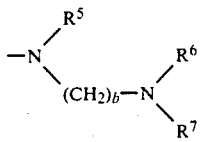

where R$^5$ is a hydrogen atom, a lower alkyl group such as methyl, ethyl, n- or i-propyl, or n-, i-, s- or t-butyl; each of R$^6$ and R$^7$ is a lower alkyl group such as methyl, ethyl, n- or i-propyl, or n-, i-, s- or t-butyl; or R$^6$ and R$^7$ together form a tetramethylene or pentamethylene group; and b is an integer of 2 to 5.

The nitrogen-containing fluorocarbon polymer having terminal groups represented by the formulae:

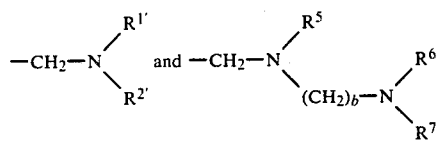

where R$^{1'}$, R$^{2'}$, R$^5$, R$^6$, R$^7$ and b are as defined above, is especially preferred, since it provides a superior quaternary ammonium type polymer of the present invention.

Particularly preferred specific terminal groups are

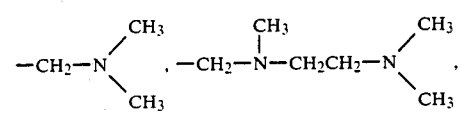

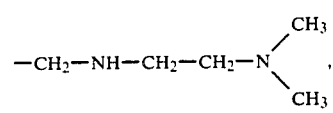

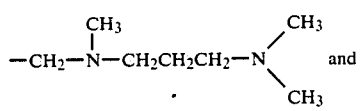

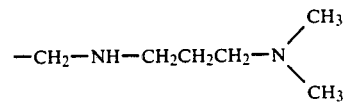

The fluorocarbon polymer having terminal groups of the formula II may have, for example, the following repeating units:

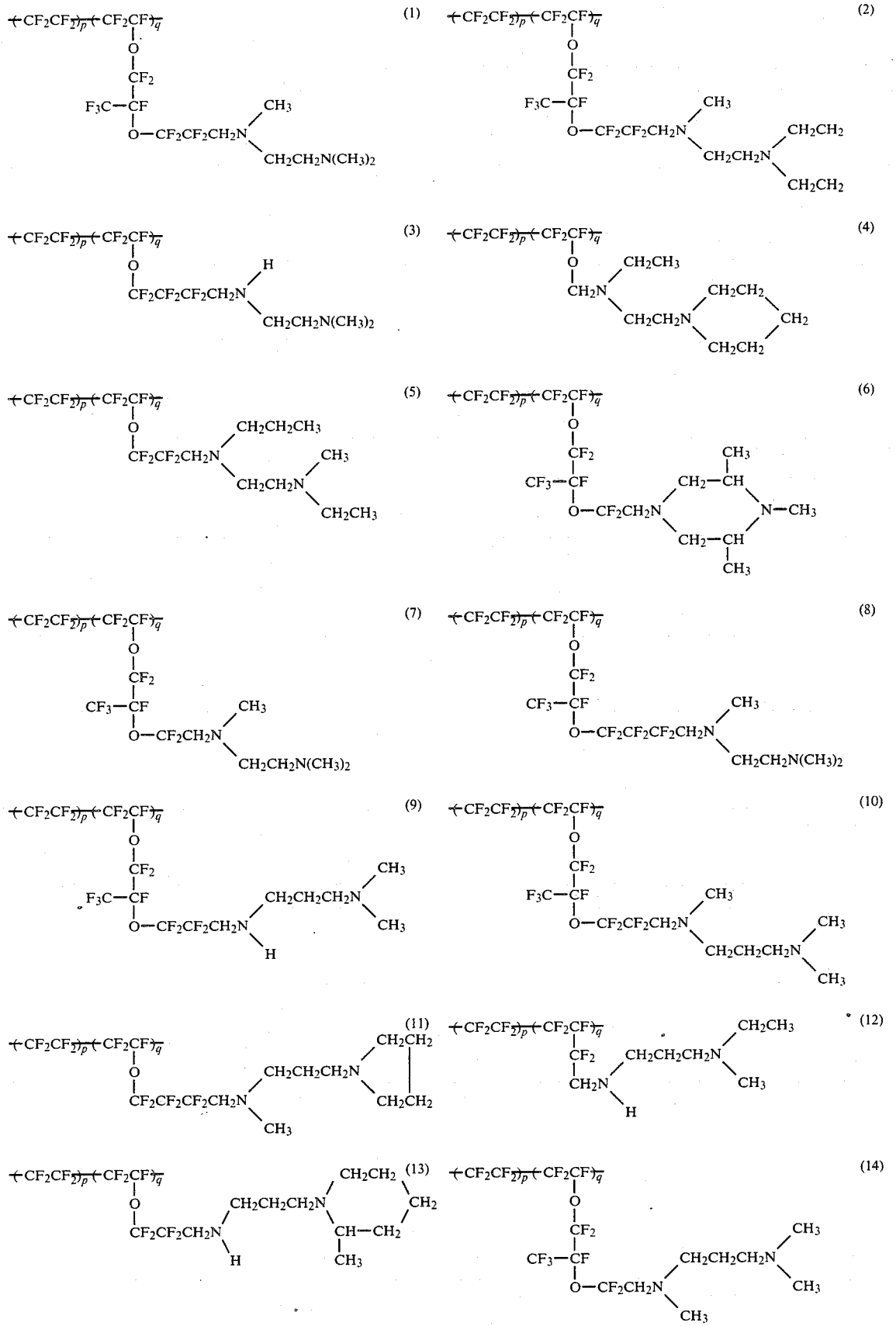

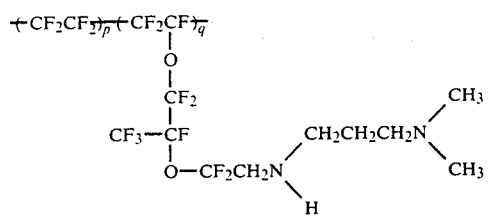 (15)
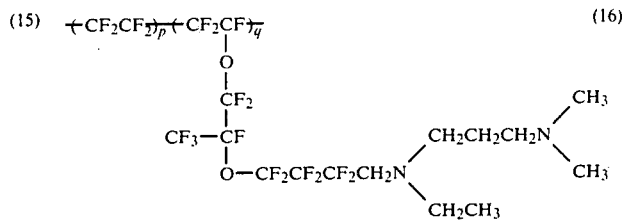 (16)
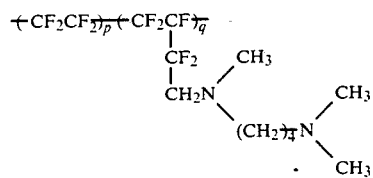 (17)
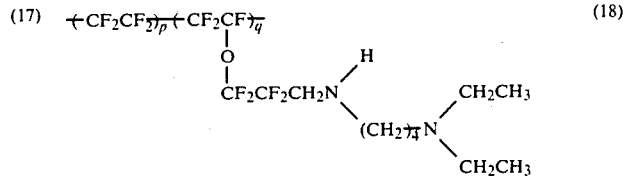 (18)
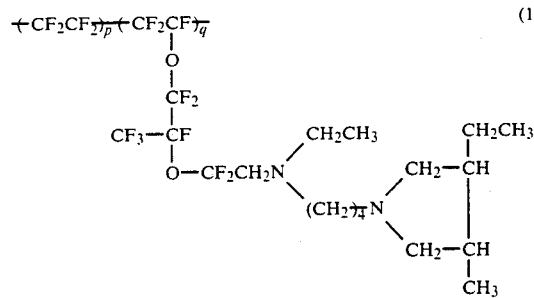 (19)
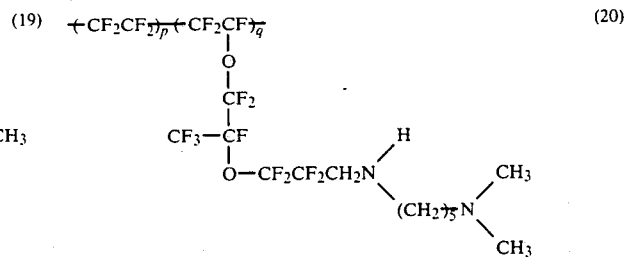 (20)
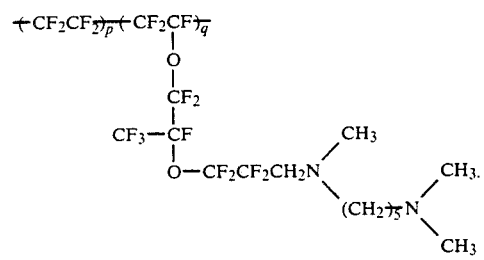 (21)
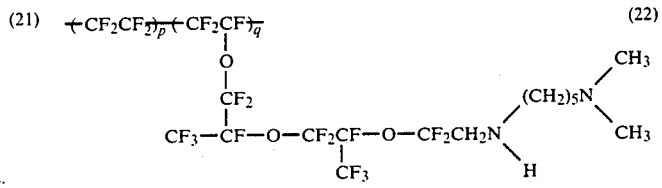 (22)
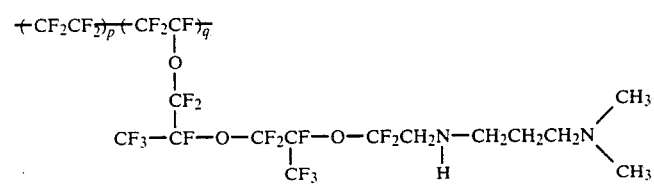 (23)
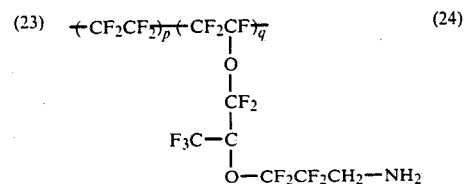 (24)
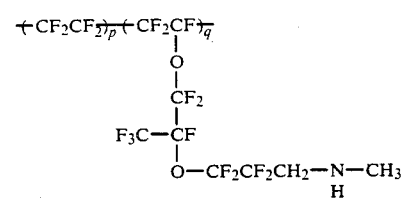 (25)
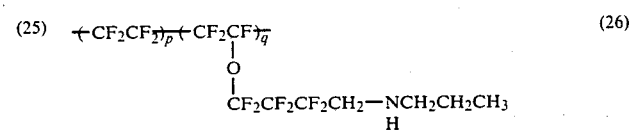 (26)
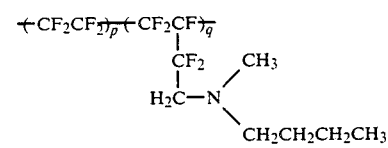 (27)
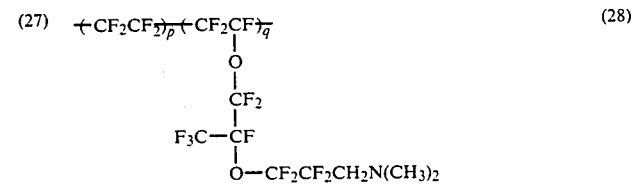 (28)

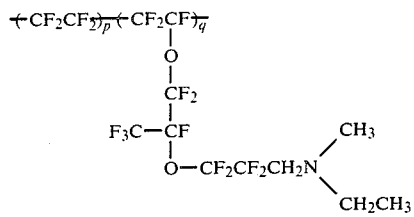 (29)

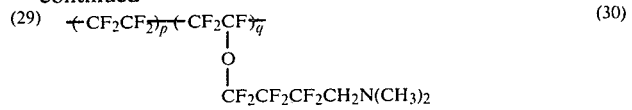 (30)

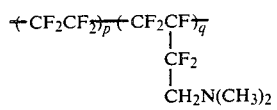 (31)

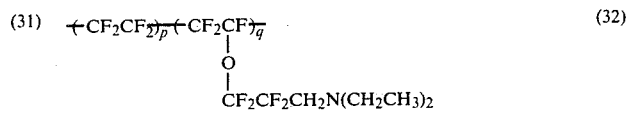 (32)

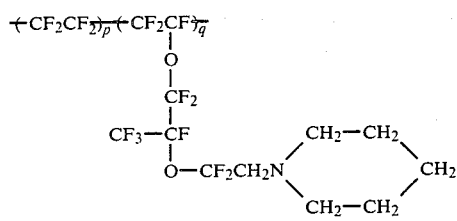 (33)

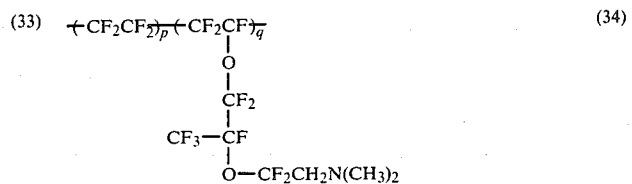 (34)

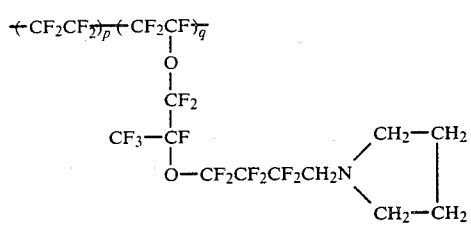 (35)

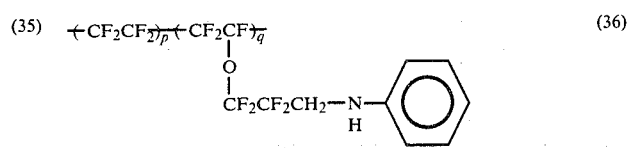 (36)

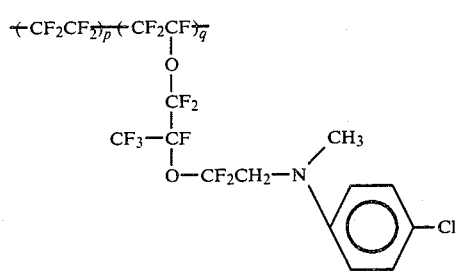 (37)

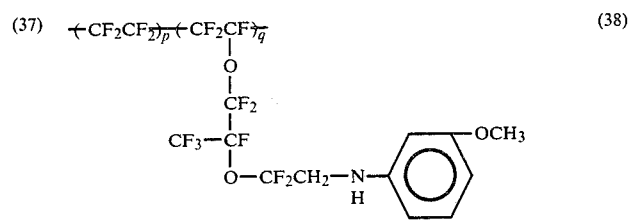 (38)

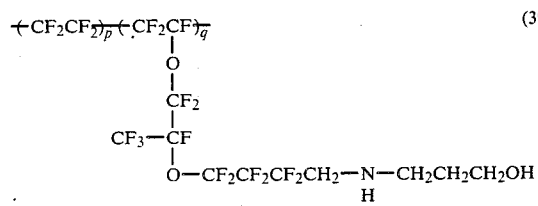 (39)

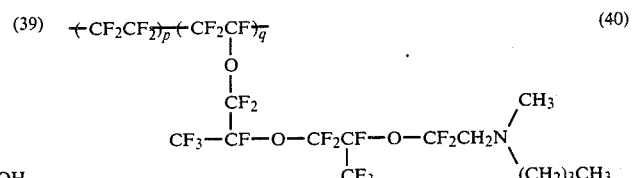 (40)

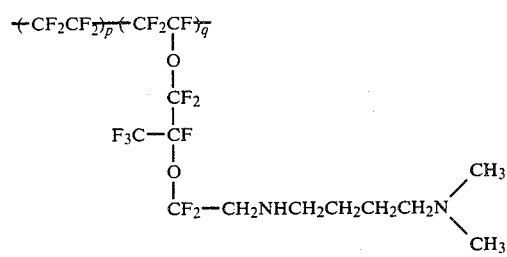 (41)

The nitrogen-containing fluorocarbon polymer having terminal groups of the formula II is a solid substance having excellent heat resistance, acid resistance and alkali resistance, and can be formed into various forms such as a flat membrane form, a fiber form, a tubular form or a powder form. It is useful not only as the starting material for the quanternary ammonium type polymer, but also as a weakly basic anion exchange membrane having superior durability by itself.

The nitrogen-containing fluorocarbon polymer having terminal groups represented by the formula —CH$_2$Y (II) can be prepared by a process which comprises reacting a fluorocarbon polymer comprising a perfluorocarbon main chain and a pendant chain attached to the main chain and having a carboxylic acid amide terminal group represented by the formula:

$$-\underset{\underset{O}{\|}}{C}-Y \qquad (III)$$

where Y is as defined above, with a reducing agent to convert the terminal group of the formula III to the terminal group of the formula II.

As the reducing agent, there may be used aluminum hydride, an alkyl aluminum hydride such as diisobutyl aluminum hydride, a halogeno aluminum hydride such as monochloro aluminum hydride, lithium aluminum hydride or diborane. However, it is preferred to use diborane in view of the efficiency of the reaction and the convenience of the post-treatment. Borane may be generated in the reaction system by reacting e.g. sodium borohydride with a boron trifluoride ether complex, or it may be added to the reaction system in the form of various complexes of borane (e.g. in the form of a dimethyl sulfide complex).

The reducing agent is used in an amount of at least a stoichiometric amount relative to the functional groups, i.e. the carboxylic acid amide groups, in the fluorocarbon polymer. Usually it is used in a substantially excess amount. Its concentration in a solvent is usually from 0.01 to 5M, preferably from 0.1 to 2M.

The reaction proceeds smoothly when conducted in a solvent such as tetrahydrofuran, dioxane or an ether such as diethylene glycol dimethyl ether. The solvent is used in a sufficient amount so that the fluorocarbon polymer having the carboxylic acid amide terminal groups is adequately immersed therein. It may be used in a substantially excess amount.

The reaction temperature is not critical. However, it is preferred that at the initial stage, the reaction is conducted at a temperature of from 0° C. (i.e. ice cooling temperature) to room temperature, and then the reaction system is heated to a temperature of from the refluxing temperature to 100° C. to complete the reaction.

The starting material fluorocarbon polymer having the substituted carbonyl groups of the formula III may be used in any desired form such as in a flat membrane form, a tubular form, a fiber form or a powder form, whereby the resulting polymer having the terminal amino groups of the formula II is obtainable in the corresponding form, which may then be converted, in that form, to the final quaternary ammonium type polymer by the above-mentioned alkylation. Thus, the anion exchanger of the quaternary ammonium type polymer may be obtained in any desired form by so selecting the form of the starting material.

The fluorocarbon polymer having the terminal groups of the formula III used as the starting material, is also a novel polymer. A typical pendant chain of the fluorocarbon polymer has a structure represented by the formula:

$$+O+CF_2-\underset{\underset{X}{|}}{CF}-O\overset{}{\frac{}{}}_m+CF_2\overset{}{\frac{}{}}_n-\underset{\underset{O}{\|}}{C}-Y$$

where X is a fluorine atom, a chlorine atom or a —CF$_3$ group, l is an integer of 0 to 5, m is 0 or 1, n is an integer of 1 to 5, and Y is as defined above.

The main chain is preferably a linear perfluorocarbon random polymer chain comprising repeating units represented by the formula:

$$+CF_2CF_2\overset{}{\frac{}{}}_p+CF_2\underset{|}{CF}\overset{}{\frac{}{}}_q$$

where p is an integer of 3 to 16, q is an integer of 1 to 10, and the ratio of p'/q' is within a range of from 2 to 16 where p' is an average value of all p in the repeating units and q' is an average value of all q in the repeating units.

Accordingly, a preferred fluorocarbon polymer having terminal groups of the formula III has repeating units represented by the formula:

$$+CF_2-CF_2\overset{}{\frac{}{}}_p+CF_2-\underset{\underset{[O+CF_2-\underset{\underset{X}{|}}{CF}-O\overset{}{\frac{}{}}_m+CF_2\overset{}{\frac{}{}}_n\underset{\underset{O}{\|}}{C}-Y]}{|}}{CF}\overset{}{\frac{}{}}_q$$

where p, q, l, m, n, X and Y are as defined above.

Among the various terminal groups represented by the formula $$-\underset{\underset{O}{\|}}{C}-Y,$$

particularly preferred is a terminal group represented by the formula:

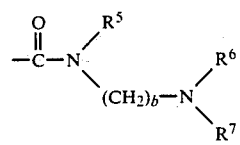

where R$^5$, R$^6$, R$^7$ and b are as defined above.

Particularly preferred specific terminal groups are

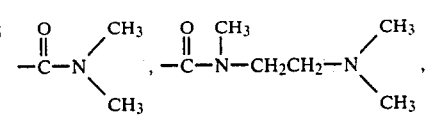

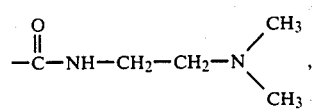

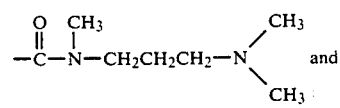

and

-continued
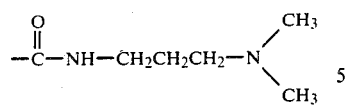
The fluorocarbon polymer having terminal groups of the formula III may have, for instance, the following repeating units:
(1)
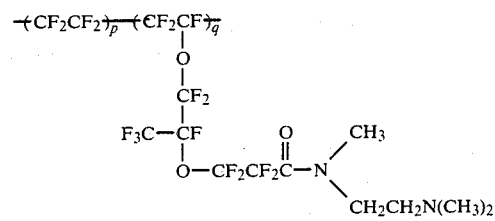
(2)
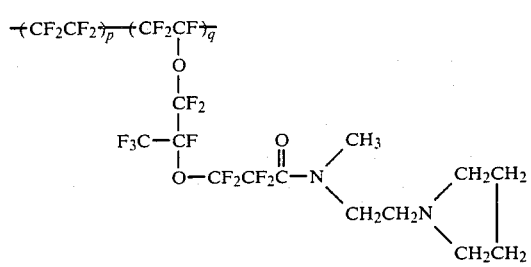
(3)
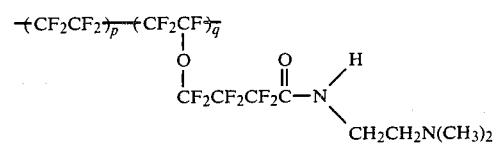
(4)
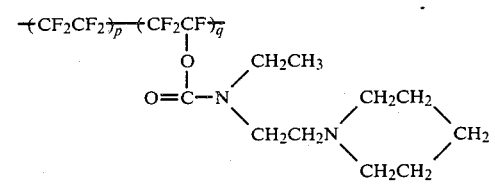
(5)
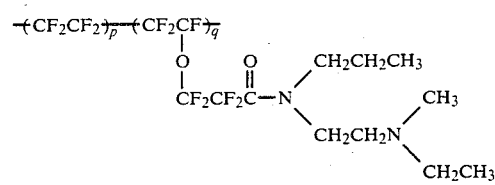
(6)
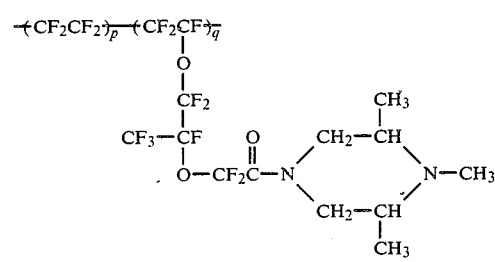
(7)
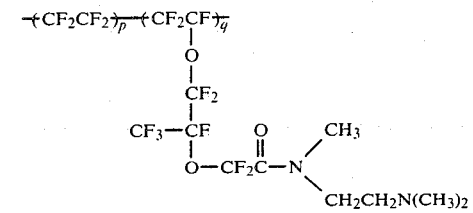
(8)
(9)
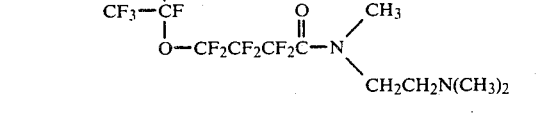
(10)
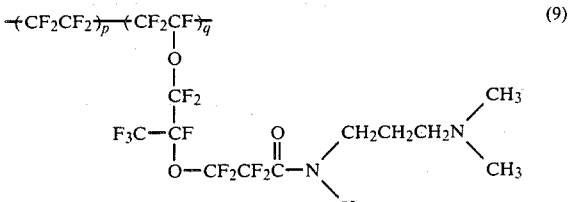
(11)
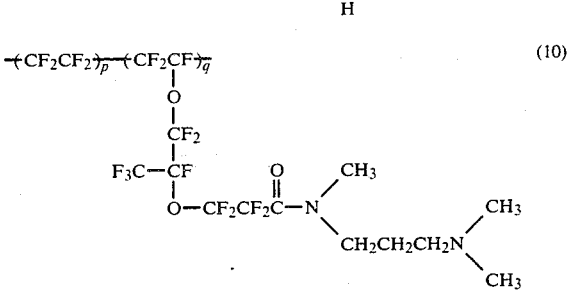
(12)
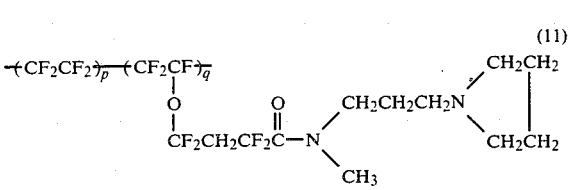
(13)
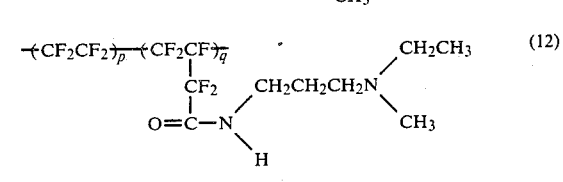
(14)
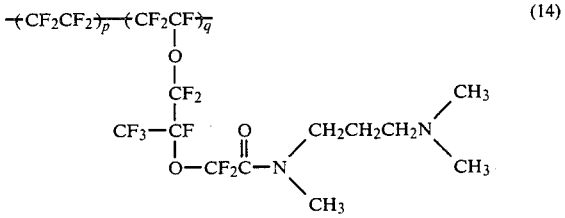

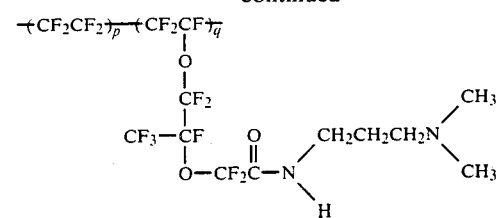 (15)
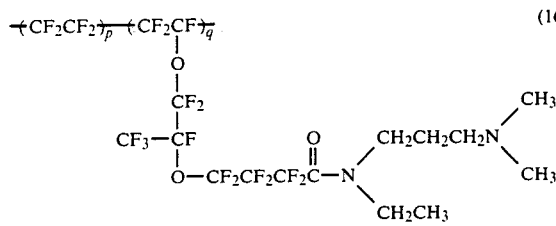 (16)
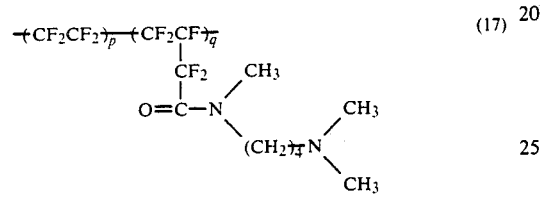 (17)
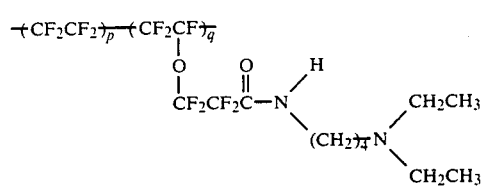 (18)
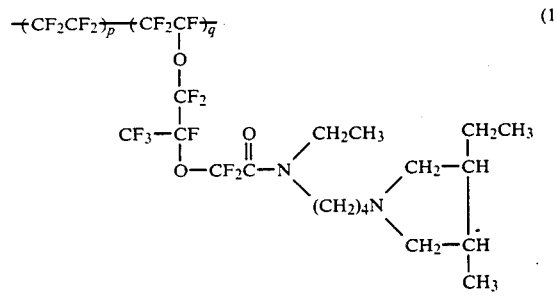 (19)
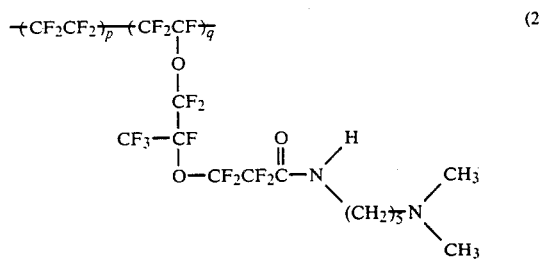 (20)
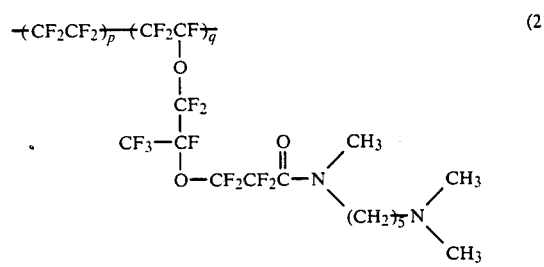 (21)
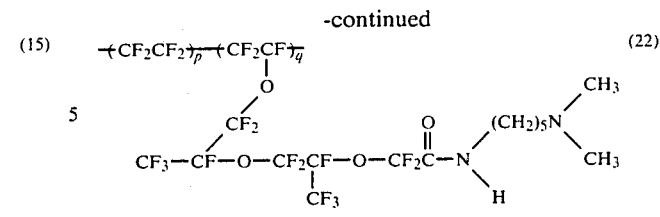 (22)
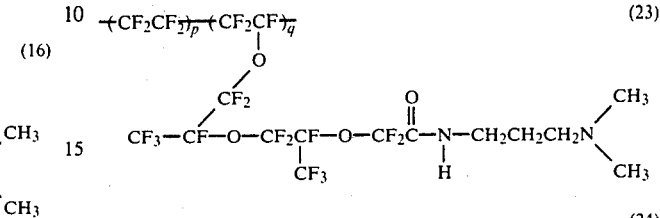 (23)
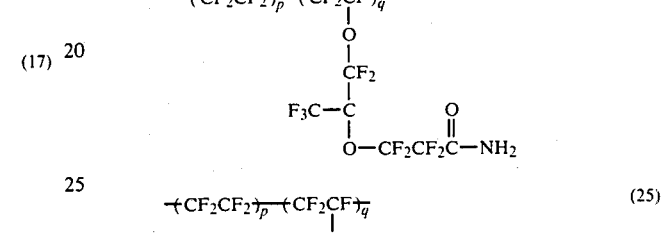 (24)
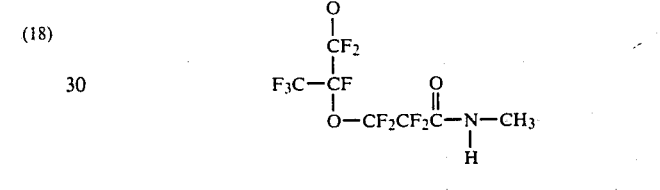 (25)
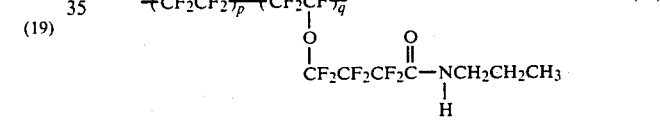 (26)
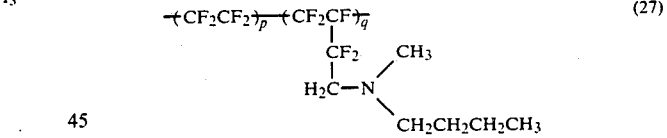 (27)
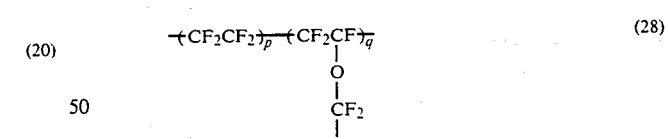 (28)
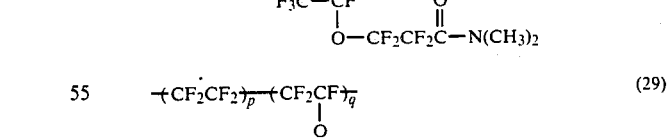 (29)
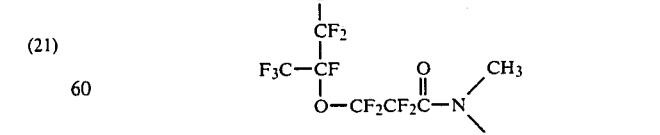 (30)

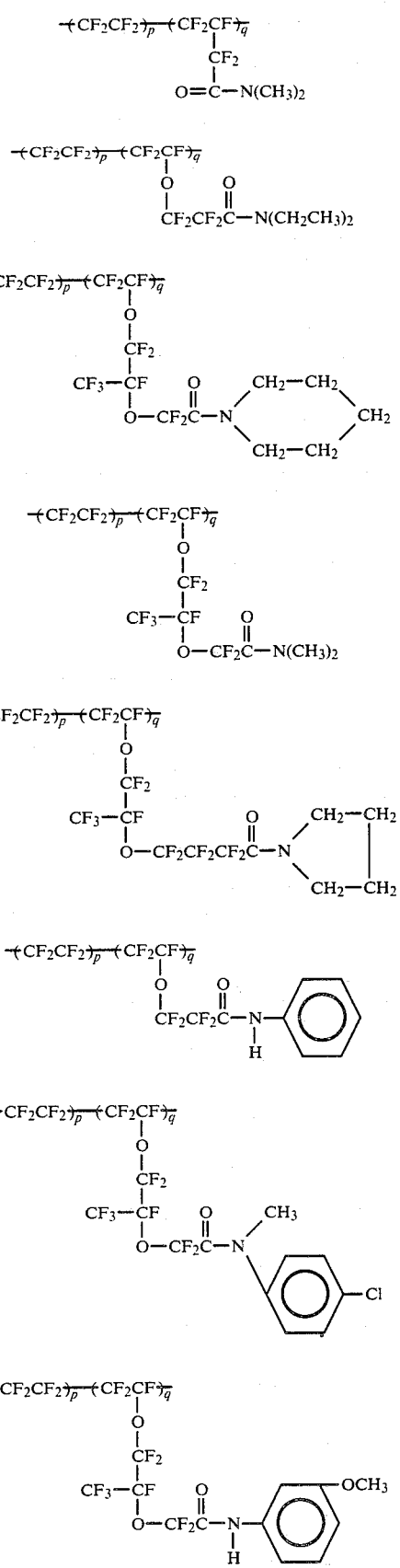
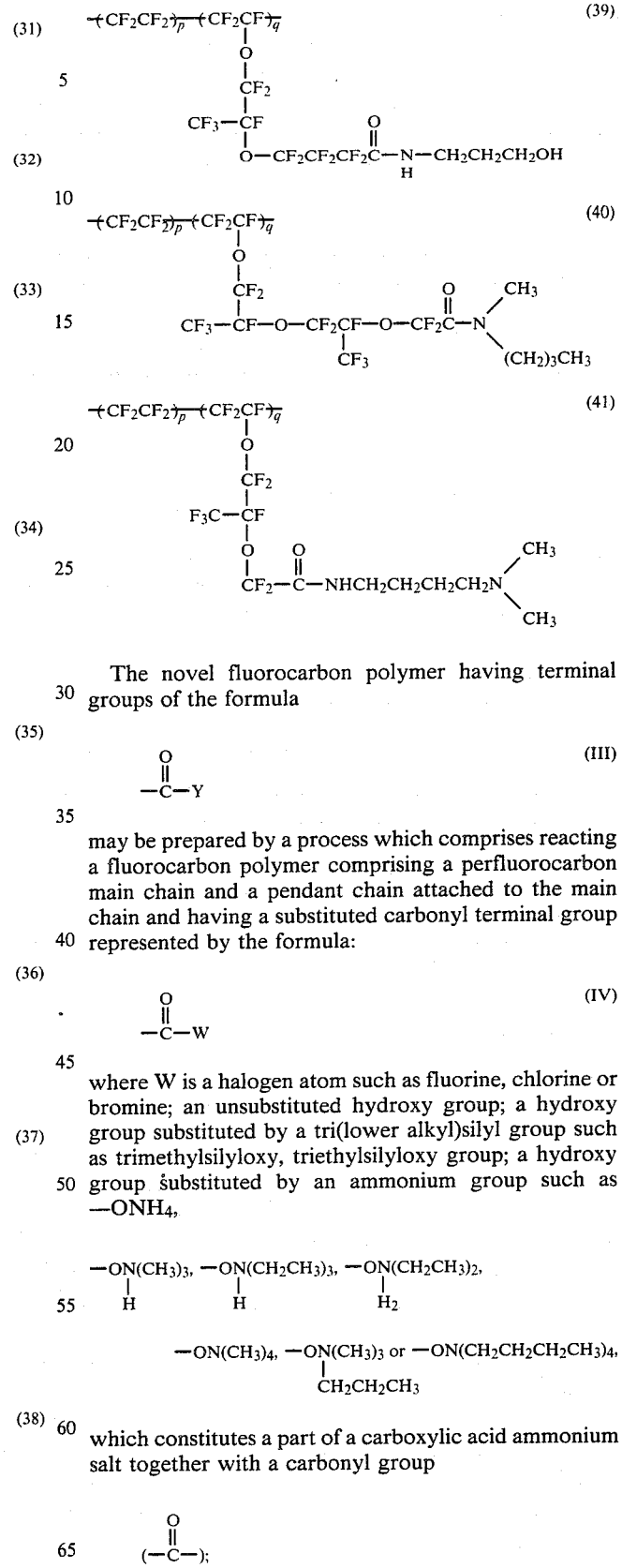

The novel fluorocarbon polymer having terminal groups of the formula $$-\overset{O}{\underset{\|}{C}}-Y \quad (III)$$

may be prepared by a process which comprises reacting a fluorocarbon polymer comprising a perfluorocarbon main chain and a pendant chain attached to the main chain and having a substituted carbonyl terminal group represented by the formula:

$$-\overset{O}{\underset{\|}{C}}-W \quad (IV)$$

where W is a halogen atom such as fluorine, chlorine or bromine; an unsubstituted hydroxy group; a hydroxy group substituted by a tri(lower alkyl)silyl group such as trimethylsilyloxy, triethylsilyloxy group; a hydroxy group substituted by an ammonium group such as $-ONH_4$, $$-\underset{H}{ON(CH_3)_3}, \quad -\underset{H}{ON(CH_2CH_3)_3}, \quad -\underset{H_2}{ON(CH_2CH_3)_2},$$

$$-ON(CH_3)_4, \quad -\underset{CH_2CH_2CH_3}{ON(CH_3)_3} \text{ or } -ON(CH_2CH_2CH_2CH_3)_4,$$

which constitutes a part of a carboxylic acid ammonium salt together with a carbonyl group $$(-\overset{O}{\underset{\|}{C}}-);$$

or a lower alkoxy group such as methoxy, ethoxy, n-propoxy, n-butoxy, s-butoxy or n-pentoxy; with ammonia or an amine represented by the formula:

H—Y  (v)

where Y is as defined above, to convert the terminal group of the formula IV to the terminal group of the formula III.

The fluorocarbon polymer having terminal groups of the formula IV used as the starting material preferably has pendant chains represented by the formula:

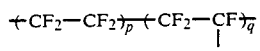

where X, W, l, m and n are as defined above.

A typical main chain of the polymer is a linear perfluorocarbon random polymer chain which comprises repeating units represented by the formula:

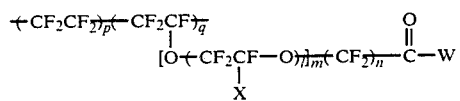

where p is an integer of 3 to 15, and q is an integer of 1 to 10.

Accordingly, a preferred polymer has repeating units represented by the formula:

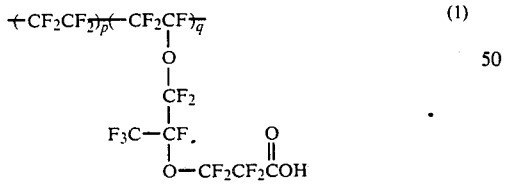

where X, W, l, m, n, p and q are as defined above.

As specific examples of the fluorocarbon polymer having substituted carbonyl terminal groups of the formula IV, there may be mentioned those having the following repeating units:

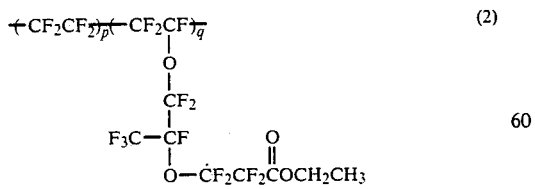  (1)

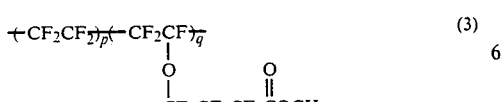  (2)

(3)

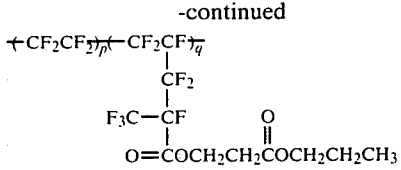  (4)

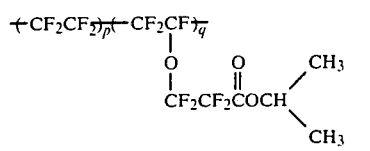  (5)

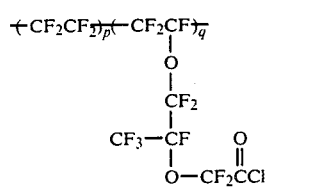  (6)

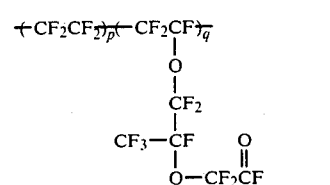  (7)

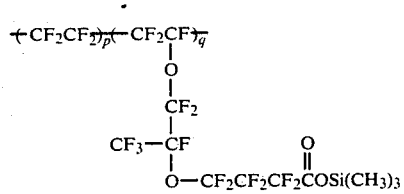  (8)

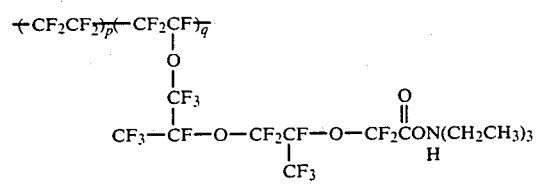  (9)

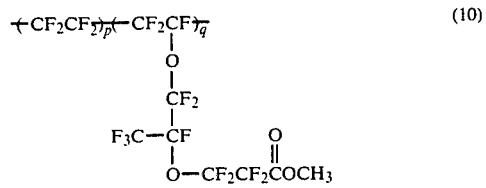  (10)

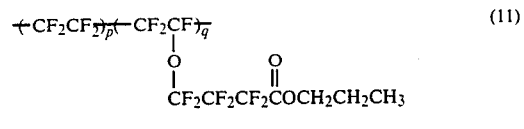  (11)

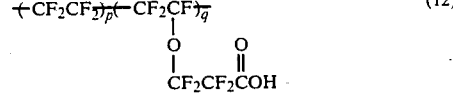  (12)

These fluorocarbon polymers are well known as carboxylic acid type cation exchange perfluorocarbon polymers (particularly as cation exchange membranes for the electrolysis of sodium chloride) or as their precursors.

Among the fluorocarbon polymers, those having pendant chains with acid halide type terminal groups may readily be prepared by treating perfluorocarbon polymers having pendant chains with terminal carboxyl groups (i.e. those having the above formula wherein W is a hydroxyl group), with a halogenating agent such as a chlorinating agent. As the chlorinating agent, there may be employed thionyl chloride, phosphorus trichloride, phosphorus pentachloride or phosphorus oxychloride. However, from the viewpoint of the reaction efficiency, it is preferred to use thionyl chloride or phosphorus chloride in phosphorus oxychloride. The reaction temperature is usually within a range of from 50° to 150° C. although it depends on the nature of the starting material and the chlorinating agent.

Whereas, silyl ester type fluorocarbon polymers may be prepared by treating the above-mentioned carboxylic type polymer with a silylating agent such as a tri(-lower alkyl)silyl chloride or an N,O-bis[tri(lower alkyl)silyl]acetamide.

As the amine of the formula V to be used for the above reaction, there may be mentioned methylamine, ethylamine, n-propylamine, i-propylamine, n-butylamine, i-butylamine, dimethylamine, diethylamine, dipropylamine, methylethylamine, pyrrolidine, piperidine, pipecoline, 3-ethylpiperidine, aniline, N-methylaniline, p-toluidine, m-toluidine, p-chloroaniline, m-chloroaniline, p-fluoroaniline, o-fluoroaniline, p-bromoaniline, p-anisidine, m-anisidine, p-dimethylaminoaniline, m-nitroaniline, 2-aminofuran, 3-aminofuran, ethanolamine, diethanolamine, 3-hydroxypropylamine, 3-hydroxybutylamine, N,N-dimethyl-1,3-propanediamine, N,N-diethyl-1,3-propanediamine, N-ethyl-N-methyl-1,3-propanediamine, N-isobutyl-N-methyl-1,3-propanediamine, N,N,N-trimethyl-1,3-propanediamine, N,N-dimethyl-N'-propyl-1,3-propanediamine, N-(3-aminopropyl)-2-pipecoline, 3-pyrrolidinopropylamine, 3-piperidinopropylamine, N,N-dimethyl-1,4-butanediamine or N,N-dimethyl-1,5-pentanediamine. Instead of these amines, the corresponding silyl amines obtained by substituting the hydrogen atoms on the nitrogen atoms of the amine of the formula V by a trimethylsilyl group, may also be used.

The reaction with the amine may be conducted by contacting the polymer with a gaseous amine, or in a liquid amine or by means of a solvent.

When a polymer other than an acid halide type polymer or an ester type polymer is used as the starting material for the reaction, it is preferred to employ a silylating agent such as trimethylchlorosilane, bis(trimethylsilyl)acetamide or 1,1,1,3,3,3-hexamethyldisilazane, together with the amine of the formula V. Particularly when the first silylating agent is used, it is preferred to conduct the reaction in the presence of a tertiary amine such as triethyl amine or N-methylpyrrolidine.

The ammonia or the amine is used in an amount of at least a stoichimetric amount, preferably at least three times the stoichiometric amount, more preferably in a great excess, relative to the starting material. The reaction may be conducted in the presence of a tertiary amine.

As the solvent, there may be employed an ether such as diethyl ether, tetrahydrofuran, dimethoxyethane or dioxane; a hydrocarbon such as benzene, toluene or hexane; acetonitrile; or dimethylsulfoxide. When a fluorocarbon polymer having terminal groups of the formula IV where W is a lower alkoxy group, is used, i.e. when the terminal group of the pendant chain is a carboxylic acid ester type, it is possible to employ not only the above-mentioned solvents but also alcohols such as methanol or ethanol.

The solvent is used in a sufficient amount so that the fluorocarbon polymer having the substituted carbonyl groups is adequately immersed therein. It may be used in an excess amount.

The reaction temperature is not critical. However, it is common to conduct the reaction at a temperature of from about −30° C. to about 150° C., preferably from about 0° C. to 80° C.

Now, the present invention will be described in further detail with reference to Examples and Reference Examples. The term "an amine type polymer" used here is meant for a nitrogen-containing fluorocarbon polymer containing amino groups, and the term "an amide type polymer" is meant for a fluorocarbon polymer having carboxylic acid amide groups. Further, the term "a terminal group" used here is meant for a terminal group of the pendant chain. The infrared absorption spectrum means a transmission spectrum unless otherwise specified. The dyeing test was conducted by using the following dye baths.

Crystal Violet: a 0.05% methanol solution of Crystal Violet

Cresol Red: a 0.05% methanol solution of Cresol Red

Thymol Blue: a 0.05% methanol solution of Thymol Blue

Bromothymol Blue: a 0.05% methanol solution of Bromothymol Blue

Basic Cresol Red: a solution obtained by adding about 1% of a 10% NaOH aqueous solution to a 0.05% water-methanol solution of Cresol Red Basic Thymol Blue: a solution obtained by adding about 1% of a 10% NaOH aqueous solution to a 0.05% methanol solution of Thymol Blue Further, the electric resistance of a membrane was measured in a 0.5N NaCl aqueous solution at alternating current of 1000 cycles at a temperature of 25° C. after bringing the membrane to equilibrium in the 0.5N NaCl aqueous solution. The transport number of a membrane was calculated from the membrane potential generated between a 0.5N NaCl aqueous solution and a 2.0N NaCl aqueous solution, by means of a Nernst's equation.

The ion exchange capacity of an ammonium-type polymer was obtained by subjecting an ammonium chloride type polymer to complete salt exchange and then quantitatively analyzing chlorine ions which were present in the polymer as counter ions, according to Vorhard method.

Further, the conversion was calculated from the nitrogen value obtained from the elemental analysis, taking into accounts of the change of the equivalent of weight due to the conversion of the terminal groups and taking the ion exchange capacity of the starting material copolymer as being 100%.

EXAMPLE 1

A copolymer film [Nafion 114 (tradename) manufactured by DuPont Co.; film thickness: 100 μm; sulfonic acid-based ion-exchange capacity: 0.91 meq/g.dry film] obtained by the copolymerization of $CF_2=CF_2$ with

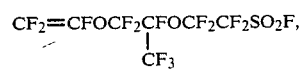

was treated with 2N hydrochloric acid and then converted to a sulfonylchloride form, which was further subjected to hydrogen-iodide treatment and then to washing with alkali, whereby a membrane of a sodium carboxylate type copolymer. The pendant chains of this membrane-form copolymer had a structure of

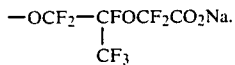

This membrane was treated with a mixture of 8N hydrochloric acid/methanol (volume ratio of 1/1) for hydrolysis and esterification and then heated in a mixture of phosphorus pentachloride/phosphorus oxychloride (weight ratio of 1/1.6) at 120° C. for 24 hours. Then, the membrane was washed in carbon tetrachloride and dried. In its infrared absorption spectrum, the membrane thus obtained showed a strong absorption by carbonyl at 1800 cm$^{-1}$ and absorption peaks in the vicinity of 2980, 2880 and 1440 cm$^{-1}$ attributable to the absorption by C—H. Thus, the membrane was found to be a mixture-type polymer membrane wherein the majority of terminal groups of the pendant chains were —CO$_2$Me groups and some —COCl groups were mixed therein.

This mixture-type polymer membrane was composed mainly of repeating units having a structure of the formula (1) identified hereinafter, wherein W is a methoxy group. The ratio of p'/q' was about 6.5.

The mixture-type polymer membrane thus obtained was immersed in dried ether, and dimethylamine gas was introduced (concentration of 1.3M) under cooling with ice, whereupon the membrane was reacted therewith for 6 hours under cooling and 18 hours at room temperature. The membrane was washed with a mixture of a 3% sodium bicarbonate aqueous solution/methanol (volume ratio of 1/1) at 80° C. for 5 hours, and then dried under reduced pressure over night, whereby a colorless transparent amide-type polymer membrane was obtained.

Infrared absorption spectrum (cm$^{-1}$) 3300, 2950, 2825, 2360, 1705, 1500, 1470, 1410, 1300–1100, 980, 920, 730, 650–610, 560–600.

The absorption by C—H was observed at 2950 and 1500–1410 cm$^{-1}$, and the absorption by amide carbonyl was observed at 1705 cm$^{-1}$. The conversion calculated from the nitrogen value obtained by the elemental analysis was 92% relative to the SO$_3$H-based exchange capacity. The amide-type polymer membrane thus obtained was not dyed by Crystal Violet or Cresol Red, thus indicating that no ionic groups were present in the membrane.

This membrane was composed mainly of repeating units represented by the formula (101) identified hereinafter. The ratio of p'/q' was about 6.5.

This membrane was immersed in a solution obtained by dissolving sodium borohydride (concentration of 0.53M) in dried diethylene glycol dimethyl ether under an argon atmosphere. A dried diethylene glycol dimethyl ether solution of boron trifluoride ether complex (0.62 molar equivalent to the sodium borohydride) was dropwise added under cooling with ice. The reaction was conducted for 5 hours under cooling and 18 hours at 100° C., whereby the absorption at 1700 cm$^{-1}$ in the infrared absorption spectrum disppeared, thus indicating that the reduction to an amine-type polymer proceeded completely. The membrane thus obtained was washed with methanol and dried, whereupon the infrared absorption spectrum was measured. The conversion was 88%.

Infrared absorption spectrum (cm$^{-1}$) 2970, 2850, 2800, 2360, 1475–1455, 1395, 1350–1040, 980, 930, 860, 835, 730, 640–610, 560–490.

The amine-type polymer membrane thus obtained was not dyed by Crystal Violet or Cresol Red. Thus it was found that no ionic groups were present in the membrane.

This membrane was an amine-type polymer composed substantially of repeating units represented by the formula (201) identified hereinafter. The ratio of p'/q' was about 6.5.

The amine-type polymer membrane thus obtained was immersed in a solution of methyl iodide/methanol (volume ratio of ¼) and reacted at 60° C. for 48 hours. The membrane obtained was washed with methanol and then reacted in a methanol solution of lithium chloride (concentration of 1.28M) at 60° C. for 24 hours. This membrane was heated to 60° C. in methanol, whereby a quaternary ammonium chloride-type copolymer membrane was obtained. In the dyeing test, the membrane thus obtained was not dyed by Crystal Violet, but it was dyed red (bluish purple in basic water) with Bromocresol Purple and yellowish orange (reddish purple in basic water) with Cresol Red. Thus, the presence of anion exchange groups was confirmed.

Infrared absorption spectrum (cm$^{-1}$) 3300, 3030, 2950, 2810, 2350, 1640, 1485, 1415, 1300–1060, 980, 925, 840, 740, 650–600, 540–500.

The absorption at 3300 and 1640 cm$^{-1}$ is considered attributable to water contained in the membrane. This cation exchange membrane had an ion exchange capacity of 0.82 meq/g.dry membrane, an electric resistance of 3.3 Ωcm$^2$ and a transport number of 0.87. This membrane was composed substantially of repeating units having a structure of the formula (301) identified hereinafter. The ratio of p'/q' was about 6.5. No change was observed in these values even after immersing the membrane in an aqueous solution saturated with chlorine at 60° C. for 1000 hours. Likewise, no change was observed even when the membrane was treated in methanol at 65° C. for 48 hours, followed by the removal of the solvent under vacuum at 40° C., and this operation was repeated 5 times.

EXAMPLE 2

A copolymer obtained by copolymerizing CF$_2$=CF$_2$ with

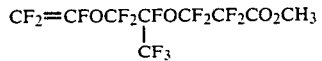

in accordance with a conventional method, was formed into a membrane (thickness: 110 μm; CO$_2$H-based ion exchange capacity: 1.4 meq/g.dry membrane).

This polymer was composed substantially of repeating units of the formula (2) identified hereinafter, wherein W is a methoxy group. The ratio of p'/q' was about 3.1.

This methyl ester-type polymer membrane was treated with dimethyl amine in the same manner as in Example 1 to obtain a corresponding amide-type polymer membrane (conversion: 95%). The infrared absorption spectrum of the membrane thus obtained, was substantially the same as the spectrum of the membrane obtained in Example 1, except for the absorption at about 1000–800 cm$^{-1}$ by the skeletal portion, thus indicating that the desired exchange of the terminal groups proceeded efficiently. The amido-type polymer membrane thus obtained, was not dyed by Crystal Violet or Cresol Red.

This amide-type polymer was composed substantially of repeating units of the formula (102) identified hereinafter. The ratio of p'/q' was about 3.1.

The amide-type polymer membrane was then reduced in the same manner as in Example 1, to obtain an amine-type polymer membrane. The conversion was 95%. The infrared absorption spectrum of the membrane thus obtained, was substantially the same as that of the membrane obtained in Example 1, except for the absorption by the skeletal portion, and the absorption at about 1700 cm$^{-1}$ by amide carbonyl disappeared completely. The obtained membrane was not dyed by Crystal Violet or Cresol Red.

This membrane was composed substantially of repeating units of the formula (202) identified hereinafter. The ratio of p'/q' was about 3.1.

Then, the membrane was immersed in a solution of methyl iodide/methanol (volume ratio of ¼) and reacted at 60° C. for 48 hours. The membrane thereby obtained was washed with methanol and then reacted in a methanol solution of lithium chloride (concentration of 1.28M) at 60° C. for 24 hours. This membrane was heated to 60° C. in methanol, where the desired ammonium chloride-type membrane was obtained. In the dyeing test, the membrane thus obtained, was not dyed by Crystal Violet, and it was dyed red (bluish purple in basic water) with Bromocresol Purple and yellowish orange (reddish purple in basic water) with Cresol Red. Thus, the presence of cation exchange groups was confirmed.

This membrane was composed substantially of repeating units of the formula (302) identified hereinafter. The ratio of p'/q' was 3.1. The membrane had an ion exchange capacity of 1.1 meq/g.dry membrane and an electric resistance of 1.8 Ωcm$^2$. This membrane showed superior durability like the membrane of Example 1.

EXAMPLE 3

A film [Nafion 415 (tradename) manufactured by Dupont Co.] composed of a copolymer of $CF_2\!=\!CF_2$ with

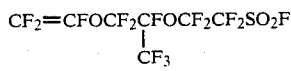

supported with a polytetrafluoroethylene mesh, which copolymer had a sulfonic acid-base ion exchange capacity of 0.91 meq/g.dry polymer, was treated in the same manner as in Example 1, whereby an amide-type polymer membrane was obtained.

Infrared absorption spectrum (cm$^{-1}$) 3300, 2950, 2750, 2380, 1690, 1500–1400, 1320–950, 760–480.

The membrane thus obtained was not dyed with Crystal Violet or Cresol Red.

Except for the mesh portion, this membrane was made of a polymer composed substantially of repeating units of the formula (101) identified hereinafter. The ratio of p'/q' was about 6.5.

The carboxylic acid amide-type polymer membrane supported with the polytetrafluoroethylene mesh thus obtained, was subjected to the same reducing treatment as in Example 1, whereby an amine-type polymer membrane was obtained. In the infrared absorption spectrum, the absorption at about 1700 cm$^{-1}$ disappeared completely.

Infrared absorption spectrum (cm$^{-1}$) 3200, 2950–2790, 2400–2300, 1440, 1390, 1300–920, 720–480.

The obtained membrane was not dyed by Crystal Violet or Cresol Red.

Except for the mesh portion, this membrane was made of a polymer composed substantially of repeating units of the formula (201) identified hereinafter. The ratio of p'/q' was about 6.5.

The amine-type polymer membrane thus obtained was subjected to the same treatment as in Example 1, whereby an ammonium chloride-type polymer membrane was obtained.

Infrared spectrum absorption spectrum (cm$^{-1}$) 3250, 2900, 2800, 2400–2300, 1620, 1470–1400, 1300–900, 750–500.

The absorption at 3250 and 1620 cm$^{-1}$ are considered to be attributable to water in the membrane. When subjected to dyeing treatment with Cresol Red in methanol, the entire membrane except for the supporting material was uniformly dyed yellowish orange.

Except for the mesh portion, the obtained membrane was made of a polymer composed substantially of repeating units of the formula (301). The ratio of p'/q' was about 6.5. This membrane had an electric resistance of 7.2 Ωcm$^2$ and a transport number of 0.90.

This membrane was used for the electrolysis of hydrochloric acid. As a Reference Example, the electrolysis was conducted in the same manner except that instead of this membrane and, a commercially available hydrocarbon type anion exchange membrane was used. The electrolysis was conducted under the following conditions.

Membrane Surface area: 9.6 cm$^2$
Electrodes: Platinum
Electrolytes: Anode/Cathode=6N hydrochloric acid/6N hydrochloric acid
Temperature: room temperature The membrane obtained in this Example has a remarkable feature that in spite of the fact that its ion exchange capacity is smaller than the commercially available hydrocarbon type anion exchange membrane (ion exchange capacity: ca. 1.3 meq/g.dry membrane), its electric resistance is substantially the same as the commercial membrane. Further, no increase of the membrane resistance or no deterioration of the membrane was observed even when the membrane was subjected to the test for an extended period of time under such conditions that chlorine was generated at the anode side and hydrogen was generated at the cathode side.

EXAMPLE 4

A copolymer obtained by copolymerizing $CF_2\!=\!CF_2$ with

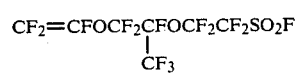

was formed into a membrane (thickness: 100 μm; SO$_3$H-based ion exchange capacity: 0.92 meq/g.dry membrane) and then hydrolyzed. Then, the membrane was treated with 2N HCl, and converted to a sulfonyl chloride form, followed by oxidation treatment to convert the membrane to a carboxylic acid form. The carboxylic acid membrane thus obtained was heated in a mixture of phosphorus pentachloride/phosphorus oxychloride (weight ratio of 1/1.6) at 120° C. for 24 hours. The membrane was further washed in carbon tetrachloride and dried. In the infrared spectrum, this membrane showed a strong absorption by carbonyl at 1800 cm$^{-1}$.

The acid chloride membrane thus obtained was immersed in dried ether, and dimethylamine gas was introduced under cooling with ice, whereupon the membrane was reacted therewith for 6 hours under cooling and 18 hours at room temperature. The membrane was washed with a mixed solution of a 1.5% sodium bicarbonate aqueous solution/methanol at 80° C. for 5 hours and dried under reduced pressure over night. A colorless transparent membrane was thereby obtained. In its infrared spectrum, absorption by C—H was observed at 2930 and 1420 cm$^{-1}$, and absorption by amide carbonyl was observed at 1700 cm$^{-1}$.

Then, sodium borohydride was dissolved in dried diethylene glycol dimethyl ether under an argon atmosphere, and the membrane obtained as above was immersed therein. A dried diethylene glycol dimethyl ether solution of a boron trifluoride ether complex was added dropwise thereto under cooling with ice. The reaction was conducted for 5 hours under cooling and 18 hours at 100° C., whereupon the absorption at 1700 cm$^{-1}$ in the infrared spectrum disappeared, thus indicating the reduction to an amine-type membrane proceeded completely. The membrane thus obtained was washed with methanol, immersed in a methanol solution of methyl iodide and reacted at 60° C. for 44 hours. The membrane thereby obtained was washed with methanol and then reacted in a methanol solution of lithium chloride at 60° C. for 24 hours. The membrane was heated to 60° C. in methanol, whereby a membrane having the desired quaternary ammonium chloride groups was obtained. In the dyeing tests, the obtained membrane was dyed bluish purple with Bromocresol Purple and reddish purple with Cresol Red. Thus, the presence of anion exchange groups was confirmed.

Infrared spectrum absorption (cm$^{-1}$) 1741, 1477, 1413, 1205, 1147, 979, 933, 842, 740.

The anion exchange membrane thus obtained had an ion exchange capacity of 0.86 meq/g.dry membrane (no change of the equivalent weight was taken into account), an electric resistance of 3.2 $\Omega$cm$^2$ and a transport number of 0.86. No change was observed in these values even when the membrane was immersed in an aqueous solution saturated with chlorine at 60° C. for 1000 hours.

EXAMPLE 5

The same membrane as used as the starting material in Example 2, was hydrolyzed and treated with 2N HCl to convert the membrane to a carboxylic acid form (wherein W in the formula (2) was a hydroxyl group).

By using the membrane thus obtained and dimethylamine, an anion exchange membrane having the desired quaternary ammonium chloride groups was obtained in the same manner as in Example 4. This membrane was made of a polymer composed substantially of repeating units of the formula (302) identified hereinafter.

The membrane had an ion exchange capacity of 1.3 meq/g.dry membrane (no change of the equivalent weight was taken into account), an electric resistance of 3.0 $\Omega$cm$^2$ and a transport number of 0.84. The same results as in Example 4 were obtained also with respect to the resistance to chlorine.

EXAMPLE 6

A copolymer obtained by copolymerizing CF$_2$=CF$_2$ with

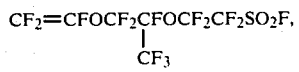

was formed into a tube (internal diameter: 0.625 mm; outer diameter: 0.875 mm; SO$_3$H-based ion exchange capacity: 0.92 meq/g.dry resin) and then hydrolyzed. Then, the tubular polymer was treated with 2N hydrochloric acid and converted to a sulfonyl chloride form. The polymer was then treated with hydrogen iodide and immersed in methanol to convert the tubular polymer to a carboxylic acid methyl ester form. The pendant chains of the tubular ester-type polymer obtained by the series of operations were converted to

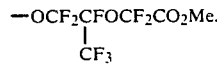

This tubular ester-type polymer was heated in a mixture of phosphorus pentachloride/phosphorus oxychloride (weight ratio of 1/1.6) at 120° C. for 23 hours and then washed in carbon tetrachloride and dried, whereby a tubular mixture-type polymer was obtained wherein the majority of the terminal groups were ester groups and some of the terminal groups were acid chloride groups. This polymer was composed substantially of repeating units of the formula (101) identified hereinafter, wherein W was mostly a methoxy group and partly a chlorine atom. The ratio of p'/q' was about 6.4.

This tubular mixture-type polymer was immersed in diethyl ether, whereby the inside of the tube was substituted by dried diethyl ether. Dimethyl amine gas was introduced thereto (to the concentration of 1.3M) under cooling with ice. Then, the reaction was conducted for 6 hours under cooling and 19 hours at room temperature. Thereafter, the tubular polymer was washed with a mixture of a 3% sodium bicarbonate aqueous solution/methanol (volume ratio of 1/1) at 60° C. for 6 hours and dried under reduced pressure over night. The infrared absorption spectrum of the tubular amide-type polymer thereby obtained was found to be substantially the same as the spectrum of the amide-type membrane obtained in Example 1. The conversion was 90%. The tubular polymer thus obtained was cut into rings and examined for the dyeability with Crystal Violet and Cresol Red. The polymer was not dyed at all.

The amide-type polymer of this membrane was composed substantially of repeating units of the formula (101) identified hereinafter. The ratio of p'/q' was about 6.4.

The tubular amide-type polymer was reduced to a tubular amine-type polymer in the same manner as in Example 26 hereinafter mentioned.

The tubular amine-type polymer thus obtained was immersed in a solution of methyl iodide in methanol (volume ratio of ¼) and reacted at 60° C. for 50 hours. The tubular polymer thereby obtained was washed with methanol and reacted in a methanol solution of lithium chloride (concentration of 1.28M) at 60° C. for 24 hours.

This tubular polymer was heated to 60° C. in methanol, whereby the desired tubular ammonium chloride-type polymer was obtained. In the dyeing test, the obtained tubular polymer was dyed red with Bromocresol Purple and yellowish orange with Cresol Red (each in methanol). Thus, the presence of anion exchange groups was confirmed.

This membrane was made of a polymer having repeating units of the formula (301) identified hereinafter. The ratio of p'/q' was about 6.4.

The tubular anion exchanger thereby obtained had an ion exchange capacity of 0.80 meq/g.dry resin. No change was observed in this value even when the anion exchanger was immersed in an aqueous solution saturated with chlorine at 60° C. for 100 hours. Likewise, no change was observed even when the exchanger was treated in methanol at 65° C. for 48 hours, followed by the removal of the solvent under vacuum at 40° C., and this operation was repeated 5 times.

EXAMPLE 7

A copolymer powder [Nafion 511 (tradename) manufactured by Dupont Co.; $SO_3H$-based ion exchange capacity: 0.91 meq/g.dry resin; potassium sulfonate-type] obtained by the copolymerization of $CF_2=CF_2$ with

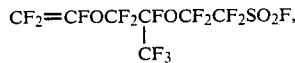

followed by saponification, was hydrorized with 5N hydrochloric acid and then treated with phosphorus pentachloride to convert it to a sulfonyl chloride form. Then, it was subjected to hydrogen iodide treatment to convert it to a carboxylic acid form. Then, it was immersed in methanol, whereby the majority of the carboxyl groups were converted to methoxycarbonyl groups. It was further treated with methyl orthoformate to obtain a powder methyl ester-type polymer.

Infrared absorption spectrum ($cm^{-1}$) 2970–2860, 1800, 1480–1415, 1280–1200, 1175–1110, 980, 840, 780, 740, 635, 555, 510.

This powder polymer was composed substantially of repeating units of the formula (1) identified hereinafter, wherein W was a methoxy group. The ratio of p'/q' was about 6.6.

This powder methyl ester-type polymer was treated in dried tetrahydrofuran in the same manner as in Example 1, whereby a powder amide-type polymer was obtained. This polymer was not dyed with Crystal Violet or Cresol Red. The conversion obtained from the elemental analysis was 85%. The obtained powder was formed into a KBr disc and examined for the infrared absorption spectrum, whereby an absorption attributable to amide carbonyl was observed at about 1700 $cm^{-1}$.

Infrared absorption spectrum ($cm^{-1}$) 2960, 1710, 1410, 1280–1200, 1170–1130, 1070, 980, 920, 800, 780, 740, 640, 550, 510.

This polymer was composed substantially of repeating units of the formula (101) identified hereinafter. The ratio of p'/q' was about 6.6.

The powder amide-type polymer thus obtained was reduced with diboran in the same manner as in Example 1 and then filtered to obtain a powder amine-type polymer. This powder polymer was not dyeable with Crystal Violet and Cresol Red. The conversion was 79%. The obtained powder was formed into a KBr disc and examined for the infrared absorption spectrum, whereby the absorption by amido carbonyl observed at about 1700 $cm^{-1}$ was found to have completely disappeared.

Infrared absorption spectrum ($cm^{-1}$) 3020–2780, 1500–1460, 1260–1200, 1170–1120, 1070, 980, 930, 865, 835, 735, 635, 555, 510.

This amine-type polymer was composed substantially of repeating units of the formula (201) identified hereinafter. The ratio of p'/q' was about 6.6.

The powder amine-type polymer thus obtained was introduced into a solution of methyl iodide in methanol (volume ratio of ¼) and reacted at 60° C. for 50 hours. The powder polymer thus obtained was washed with methanol and reacted in a methanol solution of lithium chloride (concentration of 1.28M) at 60° C. for 24 hours. This powder polymer was heated to 60° C. in methanol, whereby the desired powder ammonium chloride-type polymer was obtained. In the dyeing test, the powder polymer thus obtained was dyed reddish purple by Bromocresol Purple and yellow by Cresol Red (each in methanol). Thus, the presence of anion exchange groups was confirmed.

Infrared absorption spectrum ($cm^{-1}$) 3040–2820, 1530–1460, 1280–1200, 1170–1100, 980, 930, 840, 740, 635, 550, 510.

This powder polymer was composed substantially of repeating units of the formula (301) identified hereinafter. The ratio of p'/q' was about 6.6.

The powder anion exchanger thereby obtained had an ion exchange capacity of 0.80 meq/g.dry resin. No change was observed in this value even when the anion exchanger was immersed in an aqueous solution saturated with chlorine, at 60° C. for 100 hours. Likewise, no change was observed even when the anion exchanger was treated in methanol at 65° C. for 48 hours, followed by the removal of the solvent under vacuum at 40° C., and this operation was repeated 5 times.

EXAMPLE 8

A mixture-type polymer membrane (9 $cm^2$) obtained in the same manner as in Examples 9 to 12, was immersed in 30 ml of dried tetrahydrofuran, and after an addition of 4 ml of pyrrolidine, the solution was heated for refluxing under an argon atmosphere for 44 hours. Then, the membrane was taken out and dried under reduced pressure at 60° C. for 20 hours, whereby an amide-type polymer membrane was obtained.

Infrared absorption spectrum ($cm^{-1}$) 3400, 2970, 2890, 2780, 2600, 2360, 1710–1680, 1440, 1340–1030, 980, 930, 915, 800–480.

This membrane was composed mainly of repeating units of the formula (103) identified hereinafter. The ratio of p'/q' was about 7.6.

The membrane thus obtained was then immersed in 200 ml of dried tetrahydrofuran, and 10 g of sodium borohydride was added thereto. Then, a solution of 20 ml of boron trifluoride ethyl ether complex in 5 ml of tetrahydrofuran was added dropwise in 20 minutes, and the mixture was stirred for 1.5 hours. Thereafter, the mixture was heated for refluxing for 65 hours, and then the membrane was taken out and washed in methanol under heating for refluxing for 8 hours. The membrane was taken out and dried under reduced pressure at 60° C. for 20 hours, whereby an amine-type polymer membrane was obtained. From the infrared spectrum of this membrane, it was found that the absorption at about 1700 cm$^{-1}$ attributable to amide carbonyl disappeared and the reduction to the amine-type membrane proceeded completely. The conversion calculated from the nitrogen value in its elementary analysis, was 90%. The amine-type polymer membrane thus obtained was not dyeable with Crystal Violet, Cresol Red, Thymol Blue and Bromothymol Blue.

Infrared absorption spectrum (cm$^{-1}$) 3230, 2980–2760, 2370, 1465, 1430, 1410, 1350–1020, 980, 920, 770–480.

This membrane was made of a copolymer composed essentially of repeating units of the formula (203) identified hereinafter. The ratio of p'/q' was about 7.6.

The amine-type polymer membrane thus obtained was immersed in a solution of methyl iodide in dimethylformamide (volume ratio of ¼) and reacted at 60° C. for 72 hours. The membrane thereby obtained was washed with methanol and then reacted in a methanol solution of lithium chloride (concentration of 1.28M) at 60° C. for 24 hours. This membrane was heated to 60° C. in methanol, whereby a quaternary ammonium chloride-type polymer membrane was obtained. In the dyeing test, the membrane thus obtained was not dyeable with Crystal Violet, and it was dyed yellow (dark red in basic water) by Cresol Red, orange by Bromothymol Blue and yellowish orange by Thymol Blue. Thus, the presence of anion exchange groups was confirmed.

Infrared absorption spectrum (cm$^{-1}$) 3400, 3000–2930, 2830, 2360, 2120, 1630, 1480, 1460, 1360–950, 930, 840, 780–480.

The absorption at 3400 and 1630 cm$^{-1}$ is considered to be attributable to water contained in the membrane.

This membrane was made of a copolymer composed substantially of repeating units of the formula (303) identified hereinafter. The ratio of p'/q' was about 7.6.

This anion exchange membrane had an ion exchange capacity of 0.72 meq/g.dry membrane, an electric resistance of 5.4 Ωcm$^2$ and a transport number of 0.88. This membrane showed superior resistance to chlorine like the membrane obtained in Example 1.

EXAMPLES 9 to 12

A copolymer film [Nafion 125 (tradename) manufactured by Dupont Co.; thickness 125 μm; sulfonic acid-based ion exchange capacity: 0.83 meq/g.dry film] obtained by the copolymerization of $CF_2=CF_2$ with

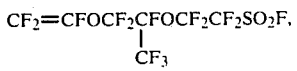

was treated with 2N hydrochloric acid and then converted to a sulfonyl chloride form, followed by hydrogen iodide treatment and alkali washing to convert it to a sodium carboxylate form. The pendant chains of this membrane-form copolymer had a structure of

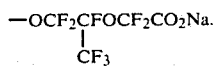

This membrane was treated with a mixture of 8N hydrochloric acid/methanol (volume ratio of 1/1) for hydrolysis and esterification, and then heated in a mixture of phosphorus pentachloride/phosphorus oxychloride (weight ratio of 1/1.6) at 120° C. for 24 hours. Thereafter, it was washed in carbon tetrachloride and then dried. In the infrared absorption spectrum, the membrane thereby obtained showed strong absorption at 1800 cm$^{-1}$ attributable to carbonyl. Further, absorption was observed in the vicinity of 2980, 2880 and 1440 cm$^{-1}$, which is considered to be attributable to the absorption by C—H. Thus, it was found to be a mixture-type polymer membrane wherein the terminal groups of the pendant chains were mostly —CO$_2$Me groups and partly —COCl groups.

This mixture-type polymer membrane was composed substantially of repeating units of the formula (101) identified hereinafter, wherein W is a methoxy group and a chlorine atom. The ratio of p'/q' was about 7.6.

Membranes having various surface areas prepared in the above-mentioned manner, were amidated in the same manner as in Example 8 by using various amines as identified in Table 1, and then subjected to reduction and conversion to quaternary ammonium forms in the same manner as in Example 18. The structures and properties of the membranes thereby obtained are shown in Table 1.

TABLE 1

| Example Nos. | Surface areas of the membranes | Amidation Amines | Amidation Reaction time (hr) | Conversion after reduction (%) | Amide-type membranes | Amine-type membranes | Quaternary ammonium type membranes | Dyeing tests *1 | | Final membranes Ion exchange capacity (meq/g. dry film) | Final membranes Electric resistances (Ωcm$^2$) | Final membranes Transport numbers | Durability |
|---|---|---|---|---|---|---|---|---|---|---|---|---|---|
| 9 | 16 cm$^2$ | Aniline (5.4 ml) | 120 | 71 | 104 | 204 | 304 | CV: CR: TB: | Not dyeable Yellow Orange | 0.50 | 26.2 | 0.91 | Same chlorine resistance as in Example 1 |
| 10 | 9 cm$^2$ | Propyl amine (4.0 ml) | 44 | 77 | 105 | 205 | 305 | CV: CR: TB: BTB: BTB(B): | Not dyeable Yellow Yellowish orange Orange Dark blue | 0.61 | 12.5 | 0.90 | Same chlorine resistance as in Example 1 |
| 11 | 16 cm$^2$ | Diethyl amine (4.96 ml) | 120 | 60 | 106 | 206 | 306 | CV: CR: TB: | Not dyeable Yellow Orange | 0.46 | 33.8 | 0.91 | Same chlorine resistance as in Example 1 |

TABLE 1-continued

| | | Main structures of copolymers ($p'/q' \approx 2.6$) | | | | | | | Final membranes | | | |
|---|---|---|---|---|---|---|---|---|---|---|---|---|
| Example Nos. | Surface areas of the membranes | Amidation Amines | Reaction time (hr) | Conversion after reduction (%) | Amide-type membranes | Amine-type membranes | Quaternary ammonium type membranes | | Dyeing tests *1 | Ion exchange capacity (meq/g. dry film) | Electric resistances ($\Omega cm^2$) | Transport numbers | Durability |
| 12 | 18 $cm^2$ | Ammonia gas (17.4 g) | 25 | 61 | 107 | 207 | 301 | CV: CR: TB: CR(B): | Not dyeable Yellow Yellowish orange Red | 0.48 | 28.1 | 0.91 | Same chlorine resistance as in Example 1 |

*1 CV ... Crystal Violet
CR ... Cresol Red
TB ... Thymol Blue
BTB ... Bromothymol Blue
(B) ... Basic

EXAMPLE 13

The same film (surface area: 8 $cm^2$) as used as the starting material in Example 3, was treated in the same manner as in Example 1 to convert it to a sodium carboxylate form. This membrane was treated with a 3.24N hydrochloric acid aqueous solution, then washed with water and dried under reduced pressure to obtain a carboxylic acid-type polymer membrane. The resulting membrane was not dyeable with Crystal Violet. This membrane was immersed in 32 ml of acetonitrile and, after the addition of 3.72 ml of triethylamine, 2.22 ml of n-propylamine and 3.54 ml trimethylchlorosilane, heated under an argon atmosphere for 30 minutes at room temperature and 73 hours at 80° C. The membrane was taken out, washed with ether and dried under reduced pressure at 60° C. for 20 hours, whereby an amide-type polymer was obtained.

Infrared absorption spectrum ($cm^{-1}$) 3330, 3100, 2970, 2900, 2350, 1720, 1530, 1440, 1390–1010, 980, 900–440.

Except for the mesh portion, this membrane was made of a copolymer composed substantially of repeating units of the formula (108) identified hereinafter. The ratio of $p'/q'$ was about 6.5.

Under an argon atmosphere, the membrane thus obtained was immersed in 550 ml of anhydrous tetrahydrofuran, and 9 g of sodium borohydride was added. Then, a solution of 18 ml of boron trifluoride in 15 ml of tetrahydrofuran was added dropwise in 40 minutes and stirred for 1.5 hours under cooling with ice water. Then, the mixture was held at room temperature for 30 minutes and then refluxed for 21 hours. The membrane was taken out and washed in methanol under reflux for 21 hours. The membrane was taken out and dried under reduced pressure at 60° C. for 20 hours, whereby an amine-type polymer membrane was obtained. In the infrared absorption spectrum of this membrane, the absorption at 1720 $cm^{-1}$ attributable to amide carbonyl disappeared, thus indicating that the reduction to the amine-type membrane proceeded completely. This membrane was not dyeable with Crystal Violet, but it was dyed yellow by Bromothymol Blue.

Infrared absorption spectrum ($cm^{-1}$) 3600–3100, 2950, 2900, 2370, 1460, 1420–900, 900–440.

Except for the mesh portion, this membrane was made of a copolymer composed substantially of repeating units of the formula (208) identified hereinafter. The ratio of $p'/q'$ was about 6.5.

The membrane thus obtained was immersed in a solution of 60 ml of methyl iodide in 240 ml of dimethylformamide, and heated at 60° C. for 72 hours, whereby an ammonium iodide-type polymer membrane was obtained.

Then, this membrane was immersed in 300 ml of a 10% methanol solution of lithium chloride and heated at 60° C. for 25 hours (the solution was replaced at an intermediate point during the operation). Then, the membrane was washed in methanol at 60° C. for 30 hours, whereby an ammonium chloride-type polymer membrane was obtained.

This membrane was not dyeable with Crystal Violet, but it was dyed yellow (dark red in basic water) with Cresol Red and orange (blue in basic water) with Bromothymol Blue. Thus, the membrane was found to have ion exchange groups.

Infrared absorption spectrum ($cm^{-1}$) 3400–2800, 2360, 1460–1410, 1350–940, 840–480.

Except for the mesh portion, this membrane was made of a copolymer composed substantially of repeating units of the formula (305) identified hereinafter. The ratio of $p'/q'$ was about 6.5.

The membrane thus obtained had an electric resistance of 10.0 $\Omega cm^2$ and a transport number of 0.90. This membrane also exhibited superior durability.

EXAMPLE 14

A part of the amine-type polymer membrane obtained in the first part of the operation of Example 1, was immersed in a solution of 2 ml of ethyl iodide in 8 ml of methanol and heated at 60° C. for 72 hours, whereby an ammonium iodide-type polymer membrane was obtained. This membrane was made of a copolymer composed substantially of repeating units of the formula (307) identified hereinafter. The ratio of $p'/q'$ was about 6.5. This membrane was immersed in a 10% methanol solution of lithium chloride, and heated at 60° C. for 25 hours (the solution was replaced at an intermediate point during the operation). Then, the membrane was washed in methanol at 60° C. for 18 hours, whereby an ammonium chloride type polymer was obtained. This membrane had a structure substantially similar to the formula (307) wherein the iodine ion was replaced by a chlorine ion.

This membrane was not dyeable with Crystal Violet, but it was dyed yellow with Cresol Red and blue with basic Bromothymol Blue.

The membrane thus obtained had an ion exchange capacity of 0.82 meq/g.dry membrane, an electric resistance of 5.6 $\Omega cm^2$ and a transport number of 0.88. This membrane showed superior resistance to chlorine like the membrane obtained in Example 1.

Infrared absorption spectrum ($cm^{-1}$) 3400, 3040, 2970, 2850, 2830, 2800, 2360, 1630, 1480, 1420, 1340–1060, 980, 930, 840, 740–500.

The absorption at 3400 and 1630 $cm^{-1}$ is considered to be attributable to water in the membrane.

This membrane was made of a copolymer composed substantially of repeating units of the formula (308). The ratio of p'/q' was about 6.5.

EXAMPLE 15

The same membrane as used in Examples 9 to 12 was treated in the same manner as in those Examples to convert it to a sodium carboxylate-type membrane. This membrane was treated with a 3.24N hydrochloric acid aqueous solution, then washed with water and dried under reduced pressure to obtain a carboxylic acid-type polymer membrane. In the infrared absorption spectrum, this membrane showed strong absorption by carbonyl at 1780 $cm^{-1}$. Further, it was dyed blue with Crystal Violet.

This membrane was made of a copolymer composed substantially of repeating units of the formula (1) identified hereinafter, wherein W was a hydroxyl group. The ratio of p'/q' was about 7.6.

The carboxylic acid-type polymer membrane (9 $cm^2$) thus obtained was immersed in 32 ml of anhydrous acetonitrile and, after the addition of 3.72 ml of triethyl amine, 1.62 ml of ethanol amine and 7.1 ml of trimethylchlorosilane, heated under an argon atmosphere at 80° C. for 76 hours. The membrane was taken out, washed with methanol and dried under reduced pressure at 60° C. for 24 hours, whereby an amide-type polymer membrane was obtained.

Infrared absorption spectrum ($cm^{-1}$) 3340, 3100, 2950, 2350, 1720, 1535, 1430, 1350–930, 880–480.

This membrane was made of a copolymer composed essentially of repeating units of the formula (109) identified hereinafter. The ratio of p'/q' was about 7.6.

Under an argon atmosphere, the membrane thus obtained was immersed in 170 ml of anhydrous tetrahydrofuran, and 3 g of sodium borohydride was added thereto. Then, a solution of 6 ml of boron trifluoride ethyl ether complex in 10 ml of tetrahydrofuran was added dropwise in 30 minutes under cooling with ice water and stirred for 1.5 hours. Then, the solution was held at room temperature for 30 minutes and further heated for 20 hours under reflux. The membrane was taken out and dried under reduced pressure at 60° C. for 24 hours, whereby an amine-type polymer membrane was obtained. In the infrared absorption spectrum of this membrane, the absorption at 1720 $cm^{-1}$ attributable to amide carbonyl disappeared, thus indicating that the reduction to the amine-type membrane proceeded completely. The conversion as calculated from the values obtained by the elementary analysis, was about 82%. This membrane was not dyeable with Crystal Violet, basic Cresol Red, basic Bromothymol Blue or basic Thymol Blue, but it was dyed yellow by Cresol Red, orange by Thymol Blue and yellowish orange by Bromothymol Blue.

Infrared absorption spectrum ($cm^{-1}$) 3550–3175, 3000–2820, 2350, 1440, 1360–950, 860–500.

This membrane was made of a copolymer composed substantially of repeating units of the formula (209) identified hereinafter. The ratio of p'/q' was about 7.6.

The membrane thus obtained was immersed in a solution of 25 ml of methyl iodide in 100 ml of dimethylformamide, and heated at 60° C. for 120 hours, whereby an ammonium iodide-type polymer membrane was obtained. Then, this membrane was immersed in 125 ml of a 10% methanol solution of lithium chloride and heated at 60° C. for 24 hours (the solution was replaced at an intermediate point during the operation). Then, the membrane was washed in methanol at 60° C. for 7.5 hours, whereby an ammonium chloride-type polymer membrane was obtained. This membrane was not dyeable with Crystal Violet, but it was dyed clear yellow by Cresol Red, orange by Thymol Blue, black by Bromothymol Blue, light blue by basic Bromothymol Blue and dark red by basic Cresol Red.

Infrared absorption spectrum ($cm^{-1}$) 3600–3125, 3000, 2350, 1630, 1480, 1350–940, 850–500.

The membrane thus obtained had an ion exchange capacity of 0.70 meq/g.dry membrane, an electric resistance of 11.9 $\Omega cm^2$ and a transport number of 0.90.

This membrane was made of a copolymer composed substantially of repeating units of the formula (309) identified hereinafter. The ratio of p'/q' was about 7.6.

This membrane showed superior chemical resistance and solvent resistance.

EXAMPLE 16

Under an argon atmosphere, a carboxylic acid-type polymer membrane (42 $cm^2$) obtained in the same manner as in Example 15, was immersed in 150 ml of anhydrous dimethoxyethane and, after the addition of 18.6 ml (135 mmol) of triethylamine, 15 ml (135 mmol) of N-methylpiperazine and 17.8 ml (140 mmol) of trimethylchlorosilane, heated and stirred at 90° C. for 66 hours. The membrane was taken out, washed with methanol and dried under reduced pressure at 60° C. for 24 hours, whereby light brown opaque amido-type polymer membrane was obtained. In the infrared absorption spectrum of this membrane, the absorption at 1780 $cm^{-1}$ attributable to a carboxylic acid disappeared, and the absorption by C—H was observed at 3000–2800 and 1450 $cm^{-1}$ and strong absorption attributable to amide carbonyl was observed at 1700 $cm^{-1}$. This membrane was made of a copolymer composed substantially of repeating units of the formula (110) identified hereinafter. The ratio of p'/q' was about 7.6.

The amide-type membrane thus obtained was immersed in 275 ml of anhydrous tetrahydrofuran, and 7.5 g of sodium borohydride was added. Then, a solution of 15 ml of a boron trifluoride ethyl ether complex in 25 ml of tetrahydrofuran was dropwise added in 30 minutes under cooling with ice and stirred for 1.5 hours. The solution was stirred for 30 minutes at room temperature and further heated for 17 hours under reflux. The membrane was taken out, washed in methanol under reflux for 20 hours, and dried under reduced pressure at 60° C. for 24 hours, whereby an amine-type polymer membrane was obtained. From the values obtained by the elementary analysis of the membrane, the conversion was found to be about 87%. This membrane was made of a copolymer composed substantially of the formula (210) identified hereinafter. The ratio of p'/q' was about 7.6.

The membrane thus obtained was immersed in a solution of 50 ml of methyl iodide in 200 ml of methanol and heated at 60° C. for 72 hours, whereby quaternary ammonium salt-type polymer membrane was obtained. This membrane was made of a copolymer composed substantially of repeating units of the formula (310) identified hereinafter. The ratio of p'/q' was about 7.6. Then, this membrane was immersed in 250 ml of a 10% methanol solution of lithium chloride and heated at 60° C. for 24 hours (the solution was replaced at an intermediate point during the operation). Then, the membrane was washed in methanol at 60° C. for 7 hours, whereby an ammonium chloride-type polymer membrane wherein the iodine ion was replaced by a chlorine ion (i.e. a copolymer membrane composed substantially of repeating units of the formula (311) identified hereinafter) was obtained. This membrane was not dyeable with Crystal Violet, but it was dyed yellow by Cresol Red, dark red by basic Cresol Red and dark blue by basic Thymol Blue.

Infrared absorption spectrum (cm$^{-1}$) 3400, 3030, 2950, 2870, 2370, 1630, 1460-1485, 1380-1030, 1020-910, 870-460.

The membrane thus obtained had an ion exchange capacity of 0.71 meq/g.dry membrane, an electric resistance of 10.5 $\Omega$cm$^2$ and a transport number of 0.88. This membrane exhibited superior durability particularly under a strong basic condition. For instance, even when heated in ethylenediamine in the presence of ethylenediamine hydrochloride, at 50° C. for 100 hours, no change was observed in the above values. Whereas, a commercially available hydrocarbon-type anion exchange membrane immediately turned black under the above condition, whereupon the membrane was destroyed.

EXAMPLE 17

A carboxylic acid-type polymer membrane (42 cm$^2$) obtained in the same manner as in Example 13, was immersed in 170 ml of anhydrous dimethoxyethane and, after the addition of 12.4 ml of triethylamine, 10 ml of N-methylpiperazine and 11.4 ml of trimethylchlorosilane, heated under an argon atmosphere at 90° C. for 68 hours. The membrane was taken out, washed with ether and dried under reduced pressure at 60° C. for 27 hours, whereby an amide-type polymer membrane was obtained.

Except for the mesh portion, this membrane was made of a copolymer composed substantially of repeating units of the formula (110) identified hereinafter. The ratio of p'/q' was about 6.5.

Under an argon atmosphere, the amide-type polymer membrane thus obtained, was immersed in 300 ml of anhydrous tetrahydrofuran, and 4.5 g of sodium borohydride was added thereto. Then, 9 ml of a boron trifluoride ethyl ether complex was added dropwise in 35 minutes under cooling with ice water and stirred for 1.5 hours. Then, the solution was stirred at room temperature for 30 minutes and further refluxed under heating for 17 hours. After cooling, the membrane was taken out and washed with methanol under reflux for 22 hours, whereby an amine-type polymer membrane was obtained.

Infrared absorption spectrum (cm$^{-1}$) 2950, 2800, 2380, 1440, 1380-900, 880-460.

The absorption in the vicinity of 1700 cm$^{-1}$ disappeared, thus indicating that the reduction proceeded completely. This membrane was not dyeable with Crystal Violet or basic Thymol Blue, but it was dyed yellow by Cresol Red and orange by Thymol Blue.

Except for the mesh portion, this membrane was made of a copolymer composed substantially of repeating units of the formula (210) identified hereinafter. The ratio of p'/q' was about 6.5.

The amine-type polymer membrane thus obtained, was immersed in 200 ml of methanol and, after the addition of 50 ml of methyl iodide, heated at 60° C. for 48 hours. The membrane was taken out, then immersed in 250 ml of a 10% methanol solution of lithium chloride and heated at 60° C. for 24 hours (the solution was replaced at an intermediate point of this operation). The membrane was taken out and washed with methanol at 60° C. for 8 hours, whereby an ammonium chloride-type polymer membrane was obtained.

Infrared absorption spectrum (cm$^{-1}$) 3600-3100, 3050-2750, 2350, 1620, 1500-1380, 1370-890, 880-400.

This membrane was not dyeable with Crystal Violet, but it was dyed yellow by Cresol Red and dark blue by basic Thymol Blue.

The membrane thus obtained had an electric resistance of 12 $\Omega$cm$^2$ and transport number of 0.89. This membrane showed superior resistance to base like the membrane obtained in Example 16.

Except for the mesh portion, this membrane was made of a copolymer composed substantially of repeating units of the formula (311) identified hereinafter. The ratio of p'/q' was about 6.5.

EXAMPLE 18

A carboxylic acid-type membrane similar to the one used in Example 4, was converted to an acid chloride-type membrane in the same manner as in Example 4. The acid chloride-type membrane was immersed in a dried ether solution of N-methylpiperazine, and allowed to stand at room temperature for 64 hours. Then, it was heated in a 1% sodium bicarbonate aqueous solution at 80° C. for 6 hours and then dried under vacuum at 50° C., whereby a colorless membrane was obtained. The membrane was not dyeable with Crystal Violet. In the infrared spectrum, the absorption at 1800 cm$^{-1}$ disappeared, and strong absorption was observed anew at 1690 cm$^{-1}$, which is considered to be attributable to carbonyl in the carboxylic acid amide.

The membrane thus obtained was then immersed in a dried diethylene glycol dimethyl ether solution of sodium borohydride, and under an argon atmosphere, a dried diethylene glycol dimethyl ether solution of a boron trifluoride ether complex was dropwise added under cooling with ice. The reaction was conducted for 5 hours under cooling and for further 18 hours at 100° C., whereby the reduction proceeded completely.

The diamine-type membrane thus obtained, was washed with methanol, and reacted with methyl iodide in methanol at 0° C. for 2 days. Further, the membrane was washed with methanol, and then treated with a methanol solution of lithium chloride at 0° C. for 2 days, whereby it was again washed with methanol under heating to obtain an anion exchange membrane having quaternary ammonium chloride groups. In the infrared spectrum, the membrane thus obtained showed an absorption at 3030, 2950, 2870, 1485, 980 and 940 cm$^{-1}$. The membrane was homogeneously dyed by Bromocresol Purple or Cresol Red. Thus, the presence of anion exchange groups was confirmed. This membrane was made of a copolymer composed substantially of repeating units of the formula (311) identified hereinafter. The membrane had an ion exchange capacity of 0.85 meq/g.dry membrane (no change of the equivalent weight was taken into account), an electric resistance of 3.9 $\Omega cm^2$ and a transport number of 0.84. This membrane showed superior durability particularly under a strong basic condition. For instance, no change was observed in the above-mentioned values, even when it was heated in ethylenediamine at 50° C. for 100 hours. Whereas, a commercially available hydrocarbon-type anion exchange membrane immediately turned black under this condition, and the membrane was destroyed.

EXAMPLE 19

The same film as used as the starting material in Example 2, was immersed in a tetrahydrofuran solution of N-methylpiperazine and reacted under reflux for 24 hours. Then, it was treated in a 1% sodium bicarbonate aqueous solution at 80° C. for 5 hours and then dried under vacuum at 50° C.

The infrared spectrum of the membrane thus obtained was substantially the same as the spectrum of the aminecarboxylic amide-type membrane obtained in Example 18.

The aminocarboxylic acid amide-type membrane was subjected to the reduction, the alkylation by means of methyl iodide and the counter ion exchange by means of lithium chloride in the same manner as in Example 18, whereby an anion exchange membrane having the desired quaternary ammonium chloride groups was obtained. The infrared spectrum of the membrane thus obtained, was substantially the same as the spectrum of the membrane obtained in Example 18. Further, the membrane had similar dyeability. This membrane was made of a copolymer composed substantially of repeating units of the formula (312) identified hereinafter. The membrane had an ion exchange capacity of 1.3 meq/q.dry membrane (no change of the equivalent weight was taken into account), an electric resistance of 3.0 $\Omega cm^2$ and a transport number of 0.86. This membrane showed superior resistance to base like the membrane obtained in Example 18.

EXAMPLE 20

A tubular carboxylic acid-type membrane similar to the one used in Example 6 was converted to a tubular acid chloride-type membrane in the same manner as in Example 4. The tubular acid chloride-type membrane was immersed in a dried ether solution of N-methylpiperazine and allowed to stand at room temperature for 64 hours. The membrane was heated in a 1% sodium bicarbonate aqueous solution at 80° C. for 6 hours, and then dried under vacuum at 50° C., whereby a colorless tubular membrane was obtained. The tubular membrane was not dyed by Crystal Violet.

The tubular membrane thus obtained was immersed in a dried diethylene glycol dimethyl ether solution of sodium borohydride, and under an argon atmosphere, a dried diethylene glycol dimethyl ether solution of boron trifluoride ether complex was dropwise added thereto under cooling with ice. The reaction was conducted for 5 hours under cooling and further 18 hours at 100° C., whereby the reduction proceeded completely.

The tubular diamine-type membrane thus obtained, was washed with methanol and then reacted with methyl iodide in methanol at 0° C. for 2 days. Further, it was washed with methanol and then reacted in a methanol solution of lithium chloride at 0° C. for 2 days, whereupon it was washed again with methanol under heating to obtain a tubular anion exchange membrane having the desired quaternary ammonium chloride groups. This membrane was homogeneously dyed by Bromocresol Purple and Cresol Red. Thus, the presence of anion exchange groups was confirmed.

This membrane was made of a copolymer composed substantially of repeating units of the formula (311) identified hereinafter. The ratio of p'/q' was about 6.4. The tubular anion exchange membrane had an ion exchange capacity of 0.80 meq/g.dry resin (no change of the equivalent weight was taken into account).

EXAMPLE 21

A carboxylic acid-type polymer membrane (3.6 cm$^2$) obtained in the same manner as in Example 15, was immersed in 10 ml of n-butyl alcohol and, after allowing it to absorb 1.73 g of hydrogen chloride at room temperature, heated at 65° C. for 65 hours. The membrane was taken out and dried under reduced pressure at 60° C. for 24 hours, whereby a n-butyl ester-type polymer membrane was obtained. This membrane showed strong absorption by carbonyl at 1790 cm$^{-1}$. Further, this membrane was not dyeable with Crystal Violet.

This membrane was made of a copolymer composed substantially of repeating units of the formula (1) identified hereinafter, wherein W was a n-butoxy group. The ratio of p'/q' was about 7.6.

The n-butylester-type polymer membrane (1.7 cm$^2$) thus obtained was immersed in 15 ml of anhydrous tetrahydrofuran, and 0.5 ml of N,N,N'-trimethylethylenediamine was added thereto. Under an argon atmosphere, the mixture was refluxed 74 hours. The membrane was taken out and dried under reduced pressure at 60° C. for 20 hours, whereby a light brown opaque amide-type polymer membrane was obtained.

Infrared absorption spectrum (cm$^{-1}$) 3400, 2970, 2880, 2850, 2800, 2400, 1700, 1460, 1420, 1370–1020, 980, 940, 850, 820–480.

The absorption at 1790 cm$^{-1}$ attributable to the ester diappeared. Absorption by C—H was observed at 3000–2800 and 1460 cm$^{-1}$, and strong absorption attributable to amide carbonyl was observed at 1700 cm$^{-1}$.

This membrane was made of a copolymer composed substantially of repeating units of the formula (111) identified hereinafter. The ratio of p'/q' was about 7.6.

The amide-type membrane thus obtained was reduced in the same manner as in Example 16, whereby a colorless transparent amine-type polymer was obtained. In the infrared absorption spectrum of this membrane, the absorption at 1700 cm$^{-1}$ attributable to amide carbonyl disappeared, thus indicating that the reduction to the amine-type membrane proceeded completely. The conversion from the ester was calculated from the values obtained by the elementary analysis and was found to be about 70%. This membrane was not dyeable with Crystal Violet or basic Thymol Blue, but it was dyed yellow by Cresol Red and orange by Thymol Blue.

Infrared absorption spectrum (cm$^{-1}$) 3000–2800, 2380, 1460, 1380–920, 880–460.

This membrane was made of a copolymer composed substantially of repeating untis of the formula (211) identified hereinafter. The ratio of p'/q' was about 7.6.

EXAMPLE 22

A carboxylic acid-type polymer membrane (42 cm$^2$) obtained in the same manner as in Example 15, was immersed in 160 ml of anhydrous dimethoxyethane and, after the addition of 14 ml of triethylamine, 11.3 ml of N,N,N'-trimethylethylenediamine and 13.3 ml of trimethylchlorosilane, heated under an argon atmosphere at 90° C. for 66 hours, whereby an amide-type polymer membrane was obtained.

This membrane was made of a copolymer composed substantially of repeating units of the formula (111) identified hereinafter. The ratio of p'/q' was about 7.6.

This amide-type polymer membrane was reduced in the same manner as in Example 16, whereby an amine-type polymer membrane was obtained. The conversion was about 91%. The infrared absorption spectrum and the dyeability of the membrane thus obtained were substantially the same as those obtained in Example 21.

This membrane was made of a copolymer composed substantially of repeating units of the formula (211) identified hereinafter. The ratio of p'/q' was about 7.6.

The membrane thus obtained was immersed in a solution of 50 ml of methyl iodide in 200 ml of methanol and heated at 60° C. for 48 hours, whereby an ammonium iodide-type polymer membrane was obtained.

This membrane was made of a copolymer composed substantially of repeating units of the formula (313) identified hereinafter. The ratio of p'/q' was about 7.6.

This membrane was immersed in 250 ml of a 10% methanol solution of lithium chloride and heated at 60° C. for 24 hours (the solution was renewed at an intermediate point during the operation). Then, the membrane was immersed in methanol and washed therein at 60° C. for 8 hours, whereby an ammonium chloride-type polymer membrane was obtained. This membrane was not dyeable with Crystal Violet, but it was dyed yellow by Cresol Red and blue by basic Thymol Blue.

The membrane thus obtained had an ion exchange capacity of 0.73 meq/g.dry membrane, an electric resistance of 6.5 $\Omega cm^2$ and a transport number of 0.87. This membrane showed superior resistance to base like the membrane obtained in Example 16.

Infrared absorption spectrum ($cm^{-1}$) 3400, 3000, 2950, 2370, 1630, 1470, 1360-1020, 1010-910, 860, 840-480.

This membrane was made of a copolymer composed substantially of repeating untis of the formula (314) identified hereinafter. The ratio of p'/q' was about 7.6.

EXAMPLE 23

A carboxylic acid-type polymer membrane (42 cm$^2$) obtained in the same manner as in Example 13, was immersed in 165 ml of anhydrous dimethoxyethane and, after the addition of 9.3 ml of triethylamine, 7.5 ml of N,N,N'-trimethylethylenediamine and 8.55 ml of trimethylchlorosilane, heated under an argon atmosphere at 90° C. for 48 hours. The membrane was taken out, washed with ether and dried under reduced pressure at 60° C. for 24 hours, whereby an amide-type polymer membrane was obtained.

Infrared absorption spectrum ($cm^{-1}$) 3400, 2950, 2780, 1670, 1440, 1370-900, 880-400.

Except for the mesh portion, this membrane was made of a copolymer composed substantially of repeating units of the formula (111) identified hereinafter. The ratio of p'/q' was about 6.5.

The membrane thus obtained was reduced in the same manner as in Example 17, whereby an amine-type polymer membrane was obtained.

Infrared absorption spectrum ($cm^{-1}$) 3050-2700, 2370, 1430, 1380-900, 860-400.

The absorption in the vicinity of 1700 cm$^{-1}$ disappeared, thus indicating that the reduction proceeded completely. This membrane was not dyeable with Crystal Violet and basic Thymol Blue, but it was dyed yellow by Cresol Red and orange by Thymol Blue.

This membrane was made of a copolymer composed substantially of repeating units of the formula (211) identified hereinafter. The ratio of p'/q' was about 6.5.

The amine-type polymer membrane thus obtained was treated in the same manner as in Example 22, whereby an ammonium chloride-type polymer membrane was obtained.

Infrared absorption spectrum ($cm^{-1}$) 3650-3100, 3100-2700, 2350, 1620, 1510-1380, 1370-900, 880-400.

The dyeability of this membrane was the same as in Example 21.

The membrane thus obtained had an electric resistance of 7.7 $\Omega cm^2$ and a transport number of 0.87. This membrane showed superior resistance to base like the membrane obtained in Example 16.

Except for the mesh portion, this membrane was made of a copolymer composed substantially of repeating units of the formula (314) identified hereinafter. The ratio of p'/q' was about 6.5.

EXAMPLE 24

A copolymer obtained by the copolymerization of

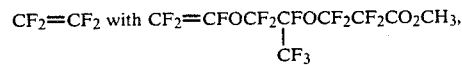

was formed into a membrane (thickness: 50 μm; SO$_3$H-based ion exchange capacity: 0.95 meq/g.dry membrane) and then saponified to obtain a sodium salt-type membrane. This membrane was further treated with concentrated hydrochloric acid/methanol (3/1) and then subjected to heat treatment in 3.24N hydrochloric acid. Then, the membrane was taken out, washed with water and dried under reduced pressure to obtain a carboxylic acid-type membrane. This membrane was made of a copolymer composed substantially of repeating units of the formula (2) identified hereinafter, wherein W was a hydroxyl group. The ratio of p'/q' was about 6.4.

The carboxylic acid-type membrane (42 cm$^2$) thus obtained was immersed in 160 ml of anhydrous dimethoxyethane and, after the addition of 9.3 ml of triethylamine, 7.5 ml of N,N,N'-trimethylethylenediamine and 8.55 ml of trimethylchlorosilane, heated under an argon atmosphere at 90° C. for 72 hours. The membrane was taken out and dried under reduced pressure at 60° C. for 24 hours, whereby an amido-type polymer membrane was obtained.

Infrared absorption spectrum ($cm^{-1}$) 3400, 2960, 2840, 2780, 2450, 1680, 1470, 1415, 1360-1080, 1010, 975, 845, 800, 630.

This membrane was made of a copolymer composed substantially of repeating units of the formula (112) identified hereinafter. The ratio of p'/q' was about 6.4.

The amide-type polymer membrane thus obtained, was then reduced in the same manner as in Example 17, whereby an amine-type polymer membrane was obtained (conversion: 88%).

Infrared absorption spectrum ($cm^{-1}$) 3150, 2970, 2880, 2830, 2800, 2390, 1465, 1380-990, 980, 810, 770, 630.

The absorption in the vicinity of 1680 cm$^{-1}$ disappeared, thus indicating that the reduction proceeded completely.

The membrane was made of a copolymer composed substantially of repeating units of the formula (212) identified hereinafter. The ratio of p'/q' was about 6.4.

The amine-type polymer membrane thus obtained was treated in the same manner as in Example 22, whereby an ammonium chloride-type polymer membrane was obtained.

Infrared absorption spectrum (cm$^{-1}$) 3650–3100, 3030, 2970, 2870, 2350, 1630, 1485, 1380–1060, 1010, 980, 920, 865, 810, 630.

The dyeability of this membrane was the same as the membrane obtained in Example 21. The membrane had an ion exchange capacity of 0.74 meq/g.dry membrane, an electric resistance of 2.2 $\Omega$cm$^2$ and a transport number of 0.85. This membrane showed superior resistance to base like the membrane obtained in Example 16.

This membrane was made of a copolymer composed substantially of repeating units of the formula (315) identified hereinafter. The ratio of p'/q' was about 6.4.

EXAMPLE 25

A methyl ester-type membrane similar to the one used in Example 4, was immersed in a dry ether solution of N,N,N'-trimethylethylenediamine and reacted at room temeprature for 20 hours. The membrane was washed with ether and dried under reduced pressure, whereby a colorless membrane was obtained. In the infrared spectrum, absorption by C—H was observed at 3000, 2925 and 2850 cm$^{-1}$, and absorption by carbonyl was observed at 1700 cm$^{-1}$. This membrane was not dyeable with Crystal Violet. This membrane was subjected to the same operation (reduction, alkylation and counter ion exchange) as in Example 4, whereby a quaternary ammonium chloride-type anion exchange membrane was obtained. The membrane thus obtained showed infrared absorption by C—H at 3000–2900 cm$^{-1}$ and it was homogeneously dyed by Cresol Red. This membrane was made of a copolymer composed substantially of repeating units of the formula (313) identified hereinafter. The ratio of p'/q' was about 6.4.

The membrane had an ion exchange capacity of 1.2 meq/g.dry membrane (no change of the equivalent weight was taken into account), an electric resistance of 3.5 $\Omega$cm$^2$ and a transport number of 0.86. The resistance to base was substantially the same as in Example 18.

EXAMPLE 26

The same copolymer as used as the starting material in Example 6, was formed into a tube in the same manner as in Example 6, then saponified. The tubular membrane was further treated with 2N hydrochloric acid in accordance with the conventional method, then converted to a sulfonyl chloride-form, and then subjected to hydrogen iodide treatment, followed by washing with alkali, whereby a sodium carboxylate-type membrane was obtained. This membrane was treated with 3.24N hydrochloric aqueous solution, then washed with water and dried under reduced pressure, whereby a tubular carboxylic acid-type copolymer was obtained. This copolymer was composed substantially of repeating units of the formula (1) identified hereinafter, wherein W was a hydroxyl group. The ratio of p'/q' was about 6.4.

The tubular carboxylic acid-type polymer (50 cm) thus obtained was immersed in 165 ml of anhydrous dimethoxyethane to fill the tube with the solvent and, after the addition of 9.3 ml of triethylamine, 7.5 ml of N,N,N'-trimethylethylenediamine and 8.55 ml of trimethylchlorosilane, heated under an argon atmosphere at 90° C. for 48 hours, whereby an amide-type polymer was obtained. The infrared absorption spectrum of the tubular amide-type polymer was substantially the same as the spectrum of the amide-type polymer membrane obtained in Example 21. The conversion was 83%. The tubular polymer thus obtained was cut into rings and subjected to dyeability test. The polymer was not dyeable with Crystal Violet.

The tubular amide-type polymer was composed substantially of repeating units of the formula (111) identified hereinafter. The ratio of p'/q' was about 6.4.

The tubular amide-type polymer thus obtained was immersed in a dried ethylene glycol dimethyl ether under an argon atmosphere, so that inside of the tube was filled with diethylene glycol dimethyl ether. Then, sodium borohydride was added to a concentration of 0.53 mol, thoroughly mixed and then cooled, whereupon a dried diethylene glycol dimethyl ether solution of a boron trifluoride ether complex (0.62 mol per mol of sodium borohydride), was dropwise added under cooling with ice. The reaction was conducted for 2.5 hours under cooling and further 21 hours at 100° C. The tubular amine-type polymer thus obtained, was washed with methanol, then dried and examined for the infrared absorption spectrum. The infrared absorption spectrum was substantially the same as the spectrum of the amine-type polymer membrane obtained in Example 21. The conversion was 78%. The tubular polymer thus obtained was cut into rings and tested for the dyeability. The dyeability was substantially the same as the amine-type polymer membrane obtained in Example 21.

This amine-type polymer was composed substantially of repeating units of the formula (211) identified hereinafter. The ratio of p'/q' was about 6.4.

The tubular amine-type polymer was immersed in a solution of methyl iodide in methanol (volume ratio of ¼) and reacted at 60° C. for 50 hours. The tubular polymer thereby obtained, was washed with methanol and then reacted in a methanol solution of lithium chloride (concentration of 1.28M). This tubular polymer was heated in methanol to 60° C., whereby a tubular ammonium chloride-type polymer was obtained. The tubular polymer thus obtained, was not dyeable with Crystal Violet, but it was dyed dark blue by basic Thymol Blue and yellow by Cresol Red. Thus, the presence of anion exchange groups was confirmed.

The tubular anion exchanger thus obtained had an ion exchange capacity of 0.69 meq/g.dry resin. No change was observed in the value even when the anion exchanger was treated in methanol at 65° C. for 48 hours, followed by the removal of the solvent under vacuum at 40° C., and this operation was repeated 5 times.

This tube was made of a copolymer composed substantially of repeating units of the formula (314) identified hereinafter. The ratio of p'/q' was about 6.4.

EXAMPLE 27

The same copolymer powder as used as the starting material in Example 7, was treated in the same manner as in Example 7 to convert it to a sulfonyl chloride-form. Then, the powder was subjected to hydrogen iodide treatment and washing with alkali to convert it to a sodium carboxylate-form. Thereafter, the powder was treated with 3.24N hydrochloric acid, then washed with water and dried under reduced pressure, whereby a powder carboxylic acid-type polymer was obtained. This powder polymer was formed into a KBr disc and examined for the infrared absorption spectrum. The polymer showed absorption by carbonyl in the vicinity of 1780 cm$^{-1}$, and it was dyed blue by Crystal Violet.

This powder was made of a copolymer composed substantially of repeating units of the formula (1) identified hereinafter, wherein W was a hydroxyl group. The ratio of p'/q' was about 6.6.

The powder carboxylic acid-type polymer (1.0 g) thus obtained, was immersed in 165 ml of anhydrous dimethoxyethane and, after the addition of 9.3 ml of triethylamine, 7.5 ml of N,N,N'-trimethylethylenediamine and 8.55 ml of trimethylchlorosilane, heated under an argon atmosphere at 90° C. for 48 hours, whereby an amide-type polymer was obtained.

The powder thereby obtained was formed into a KBr disc and examined for the infrared absorption spectrum. Absorption attributable to amide carbonyl was observed at about 1700 cm$^{-1}$. The conversion was 76%. The powder polymer thus obtained, was not dyed by Crystal Violet at all.

The amide-type polymer constituting this powder, was composed substantially of repeating units of the formula (111) identified hereinafter. The ratio of p'/q' was about 6.6.

The powder amide-type polymer thus obtained, was immersed in 55 ml of anhydrous tetrahydrofuran under an argon atmosphere, and 1.5 g of sodium borohydride was added. Then, a solution of 3 ml of boron trifluoride ethyl ether complex in 5 ml of tetrahydrofuran was dropwise added in 30 minutes under cooling with ice water and stirred for 1.5 hours. Thereafter, the mixture was stirred at room temperature for 30 minutes and then refluxed under heating for 17 hours. The polymer powder was separated and washed in methanol under reflux for 20 hours. After cooling, the mixture was filtered to collect a powder amine-type polymer. The conversion was 74%. The powder thus obtained was formed into a KBr disc and examined for the infrared absorption spectrum. The absorption at about 1700 cm$^{-1}$ attributable to amide carbonyl disappeared completely.

This powder was not dyeable with Crystal Violet or basic Thymol Blue, but it was dyed yellow with Cresol Red and orange by Thymol Blue.

This amine-type polymer was composed substantially of repeating units of the formula (211) identified hereinafter. The ratio of p'/q' was about 6.6.

The powder amine-type polymer thus obtained was subjected to conversion to a quaternary ammonium form and counter ion exchange in the same manner as in Example 7, whereby a desired powder ammonium chloride-type polymer was obtained. The powder polymer thus obtained was not dyeable with Crystal Violet, but it was dyed dark blue by basic Thymol Blue and yellow by Cresol Red. Thus, the presence of anion exchange groups was confirmed.

The powder anion exchanger thus obtained, had a ion exchange capacity of 0.64 meq/g.dry resin. No change was observed in the value even when the anion exchanger was treated in methanol at 65° C. for 48 hours, followed by the removal of the solvent under vacuum at 40° C., and this operation was repeated 5 times.

This powder was made of a copolymer composed substantially of repeating units of the formula (314) identified hereinafter. The ratio of p'/q' was about 6.6.

EXAMPLE 28

A carboxylic acid-type polymer membrane (42 cm$^2$) obtained in the same manner as in Example 13, was immersed in 150 ml of anhydrous acetonirile and, after the addition of 16.43 ml of triethylamine, 13.1 ml of N,N-dimethylethylenediamine and 15.8 ml of trimethylchlorosilane, heated under an argon atmosphere at room temperature for 30 minutes and further at 80° C. for 70 hours. The membrane was taken out, washed with ether and dried under reduced pressure at 60° C. for 20 hours, whereby an amide-type polymer membrane was obtained.

Infrared absorption spectrum (cm$^{-1}$) 3320, 2930, 2800, 2350, 1710, 1580–1410, 1400–900, 900–440.

Except for the mesh portion, this membrane was made of a copolymer composed substantially of repeating units of the formula (113) identified hereinafter. The ratio of p'/q' was about 6.5.

Under an argon atmosphere, the membrane thus obtained, was immersed in 450 ml of anhydrous tetrahydrofuran, and 8 g of sodium borohydride was added. Then, a solution of 16 ml of boron trifluoride ethyl ether complex in 15 ml of tetrahydrofuran, was added dropwise in 40 minutes under cooling with ice water and stirred for 1.2 hours. Then, the mixture was stirred at room temperature for 30 minutes and refluxed under heating for 19 hours. The membrane was taken out, washed in methanol under reflux for 22 hours and then dried under reduced pressure at 60° C. for 24 hours, whereby an amine-type polymer membrane was obtained.

3360, 3000–2700, 2350, 1450, 1400–900, 880–440

The absorption at 1710 cm$^{-1}$ attributable to amide carbonyl disappeared, thus indicating that the reduction to the amine-type membrane proceeded completely.

This membrane was dyed orange by Cresol Red, yellowish orange by Thymol Blue and blackish green by Bromothymol Blue, and it was not dyeable under the respective basic conditions.

Except for the mesh portion, this membrane was made of a copolymer composed substantially of repeating units of the formula (213) identified hereinafter. The ratio of p'/q' was about 6.5.

The membrane thus obtained was immersed in a solution of 50 ml of methyl iodide in 200 ml of methanol and heated at 60° C. for 72 hours, whereby an ammonium iodide-type polymer membrane was obtained. Then, this membrane was immersed in 250 ml of a methanol solution containing 10% of lithium chloride and heated at 60° C. for 24 hours (the solution was replaced at an intermediate point during the operation).

Thereafter, the membrane was washed in methanol at 60° C. for 8 hours, whereby an ammonium chloride-type polymer membrane was obtained.

Infrared absorption spectrum (cm$^{-1}$) 3700–3100, 3050–2750, 2350, 1620, 1510–1380, 1370–880, 870–440.

This membrane was dyed yellow by Cresol Red, red by basic Cresol Red, yellowish orange by Thymol Blue, bluish green by basic Thymol Blue, dark orange by Bromothymol Blue and black by basic Bromothymol Blue.

The membrane had an electric resistance of 9 Ωcm$^2$ and a transport number of 0.88. This membrane showed superior resistance to base like the membrane obtained in Example 16.

Except for the mesh portion, this membrane was made of a copolymer composed substantially of repeating units of the formula (314) identified hereinafter. The ratio of p'/q' was about 6.5.

EXAMPLE 29

A carboxylic acid-type polymer membrane (14 cm$^2$) obtained in the same manner as in Example 15, was mixed with 3.4 ml of 1-(2-aminoethyl)pyrrolidine, 32 ml of anhdyrous acetonitrile, 3.7 ml of trimethylamine and 3.5 ml of trimethylchlorosilane, and heated under an argon atmosphere at 80° C. for 96 hours. The membrane was taken out, washed with ether and then dried under reduced pressure at 60° C. for 22 hours, whereby an amide-type polymer membrane was obtained.

Infrared absorption spectrum (cm$^{-1}$) 3350, 3000–2770, 2350, 1720, 1530, 1440, 1360–1020, 980, 840, 795–480.

This membrane was made of a copolymer composed substantially of repeating units of the formula (114) identified hereinafter. The ratio of p'/q' was about 7.6.

The membrane thus obtained was immersed in 170 ml of anhydrous tetrahydrofuran under an argon atmosphere, and 3.0 g of sodium borohydride was added. Then, a solution of 6 ml of boron trifluoride ethyl ether complex in 10 ml of tetrahydrofuran, was added dropwise in 30 minutes under cooling with ice water and stirred for 1.5 hours. Then, the mixture was stirred at room temperature for 30 minutes and further refluxed under heating for 20 hours. The membrane was taken out and washed in methanol under reflux for 20 hours. The membrane was taken out and dried under reduced pressure at 60° C. for 24 hours, whereby an amine-type polymer membrane was obtained. In the infrared absorption spectrum of this membrane, the absorption at 1720 cm$^{-1}$ attributable to amide carbonyl disappeared, thus indicating that the reduction to the amine-type membrane proceeded completely. The conversion was about 91%. This membrane was not dyeable with Crystal Violet, basic Thymol Blue or basic Bromothymol Blue, but it was dyed yellow by Cresol Red, light yellow by basic Cresol Red, orange by Thymol Blue and dark blue by Bromothymol Blue.

Infrared absorption spectrum (cm$^{-1}$) 3350, 2920, 2800, 2350, 1460, 1350–950, 860–485.

This membrane was made of a copolymer composed subantially of repeating units of the formula (214) identified hereinafter. The ratio of p'/q' was about 7.6. The membrane thus obtained was immersed in a solution of 20 ml of methyl iodide in 80 ml of methanol and heated at 60° C. for 72 hours, whereby an ammonium iodide-type polymer membrane was obtained. Then, this membrane was immersed in 100 ml of a 10% methanol solution of lithium chloride and heated at 60° C. for 20 hours (the solution was replaced at an intermediate point of this operation). Thereafter, the membrane was immersed in methanol and washed at 60° C. for 8 hours, whereby an ammonium chloride-type polymer membrane was obtained. This membrane was not dyeable with Crystal Violet, but it was dyed clear yellow by Cresol Red, orange by Thymol Blue, yellowish orange by basic Cresol Red, black by basic Bromothymol Blue and greyish blue by basic Thymol Blue.

Infrared absorption spectrum (cm$^{-1}$) 3600–3200, 2970, 2600, 2500, 2100, 1630 (H$_2$O) 1480–1430, 1370–920, 800, 480.

The membrane thus obtained had an ion exchange capacity of 0.70 meq/g.dry membrane, an electric resistance of 5.9 Ωcm$^2$ and a transport number of 0.87. This membrane showed superior resistance to base like the membrane obtained in Example 16.

This membrane was made of a copolymer composed substantially of repeating units of the formula (316) identified hereinafter. The ratio of p'/q' was about 7.6.

EXAMPLE 30

A carboxylic acid-type polymer membrane (42 cm$^2$) obtained in the same manner as in Example 15 was immersed in 160 ml of anhydrous dimethoxyethane and, after the addition of 12.4 ml of triethylamine, 11.3 ml of N,N-dimethyl-1,3-propanediamine and 11.4 ml of trimethylchlorosilane, heated under an argon atmosphere at 90° C. for 72 hours. The membrane was taken out and dried under reduced pressure at 60° C. for 24 hours, whereby an amide-type polymer membrane was obtained.

Infrared absorption spectrum (cm$^{-1}$) 3350, 2960, 2900, 2860, 2810, 1730, 1540, 1470, 1380–1040, 980, 930, 800–500.

This membrane was made of a copolymer composed substantially of repeating units of the formula (115) identified hereinafter. The ratio of p'/q' was about 7.6.

The amide-type polymer membrane thus obtained was immersed in 300 ml of anhydrous tetrahydrofuran under an argon atmosphere, and 4.5 g of sodium borohydride was added thereto. Then, 9 ml of a boron trifluoride ethyl ether complex was dropwise added in 35 minutes under cooling with ice water and stirred for 1.5 hours. Then, the mixture was stirred at room temperature for 30 minutes and further refluxed under heating for 17 hours. After cooling, the membrane was taken out and washed in methanol under reflux for 22 hours, whereby an amine-type polymer membrane was obtained.

Infrared absorption spectrum (cm$^{-1}$) 3320, 2950, 2870, 2840, 2790, 2400, 1470, 1330–1020, 980, 830, 820–480.

The absorption at 1720 cm$^{-1}$ disappeared, thus indicating that the reduction proceeded completely. The conversion was about 80%. This membrane was not dyeable with basic Thymol Blue or basic Bromothymol Blue, but it was dyed yellow by Cresol Red, yellowish orange by Thymol Blue and blue by Bromothymol Blue.

This membrane was made of a copolymer composed substantially of repeating units represented by the formula (215) identified hereinafter. The ratio of p'/q' was 7.6.

The membrane thus obtained was immersed in a solution of 50 ml of methyl iodide in 200 ml of N,N-dimethylformamide and heated at 60° C. for 72 hours, whereby an ammonium iodide-type polymer membrane was obtained. Then, this membrane was immersed in 250 ml of a 10% methanol solution of lithium chloride and heated at 60° C. for 28 hours (the solution was replaced at an intermediate point of this operation). Thereafter, the membrane was immersed in methanol and washed at 60° C. for 19 hours, whereby an ammonium chloride-type polymer membrane was obtained. This membrane was not dyeable with basic Thymol Blue, but it was dyed yellow by Cresol Red, orange by Thymol Blue and Bromothymol Blue and dark red by basic Cresol Red.

Infrared absorption spectrum (cm$^{-1}$) 3400, 3020, 2950, 2820, 2400, 1630, 1470, 1380–1020, 970, 895, 840, 820–470.

This membrane was made of a copolymer composed substantially of repeating units of the formula (317) identified hereinafter. The ratio of p'/q' was about 7.6. The membrane thus obtained had an ion exchange capacity of 1.15 meq/g.dry membrane, an electric resistance of 1.7 Ωcm² and a transport number of 0.85.

EXAMPLE 31

A carboxylic acid-type polymer membrane (12 cm²) obtained in the same manner as in Example 15, was immersed in 40 ml of methyl orthoformate and heated at 70° C. for 2.5 hours. The membrane was taken out and dried under reduced pressure at 60° C. for 19 hours, whereby a methyl ester-type polymer membrane was obtained. In the infrared absorption spectrum, this membrane showed strong absorption by carbonyl at 1780 cm$^{-1}$. Further, dyeability of this membrane was examined with use of Crystal Violet, whereby it was found that the membrane was not dyeable.

This membrane was made of a copolymer composed substantially of repeating units of the formula (1) identified hereinafter, wherein W was a methoxy group. The ratio of p'/q' was about 7.6.

The methyl ester-type polymer membrane (42 cm²) thus obtained, was immersed in 160 ml of anhydrous dimethoxyethane and, after the addition of 12.4 ml of triethylamine, 11.3 ml of N,N'-dimethyl-1,3-propanediamine and 11.4 ml of trimethylchlorosilane, heated under an argon atmosphere at 90° C. for 72 hours. The membrane was taken out and dried under reduced pressure at 60° C. for 24 hours, whereby an amide-type polymer membrane was obtained. The infrared absorption spectrum of this membrane was substantially the same as the spectrum of the amide-type membrane obtained in Example 30.

This membrane was made of a copolymer composed substantially of repeating units of the formula (115) identified hereinafter. The ratio of p'/q' was about 7.6.

The amide-type polymer membrane thus obtained was immersed in 300 ml of anhydrous tetrahydrofuran under an agron atmosphere, and 4.5 g of sodium borohydride was added. Then, 9 ml of a boron trifluoride ethyl ether complex was added dropwise in 35 minutes under cooling with ice water, and stirred for 1.5 hours. Thereafter, the mixture was stirred at room temperature for 30 minutes and further refluxed under heating for 17 hours. After cooling, the membrane was taken out and washed in methanol under reflux for 22 hours, whereby an amine-type polymer membrane was obtained. The infrared absorption spectrum of this membrane was substantially the same as the spectrum of the amine-type membrane obtained in Example 30.

The absorption at 1720 cm$^{-1}$ disappeared, thus indicating that the reduction proceeded completely. The conversion was about 78%. This membrane was not dyeable with basic Thymol Blue or basic Bromothymol Blue, but it was dyed yellow by Cresol Red, yellowish orange by Thymol Blue and blue by Bromothymol Blue.

This membrane was made of a copolymer composed substantially of repeating units of the formula (215) identified hereinafter. The ratio of p'/q' was about 7.6.

EXAMPLE 32

To a carboxylic acid-type polymer membrane (10 cm²) obtained in the same manner as in Example 15 were added 4.3 ml of N,N-diethyl-1,3-diaminopropane, 32 ml of anhydrous acetonitrile, 3.7 ml of triethylamine and 3.5 ml of trimethylchlorosilane, and under an argon atmosphere, the mixture was heated at 80° C. for 96 hours. The membrane was taken out, washed with ether and then dried under reduced pressure at 60° C. for 22 hours, whereby an amide-type polymer membrane was obtained.

Infrared absorption spectrum (cm$^{-1}$) 3350, 2900, 2350, 1720, 1520, 1455, 1380–1010, 975, 920, 840, 780–480.

This membrane was made of a copolymer composed substantially of repeating untis of the formula (116) identified hereinafter. The ratio of p'/q' was about 7.6.

The membrane thus obtained, was immersed in 170 ml of anhydrous tetrahydrofuran under an argon atmosphere, and 3.0 g of sodium borohydride was added. Then, a solution of 6 ml of a boron trifluoride ethyl ether complex in 10 ml of tetrahydrofuran, was added dropwise in 30 minutes under cooling with ice water and stirred for 1.5 hours. Thereafter, the mixture was stirred at room temperature for 30 minutes and further refluxed under heating for 20 hours. The membrane was taken out and washed in methanol under reflux for 20 hours. The membrane was taken out and dried under reduced pressure at 60° C. for 24 hours, whereby an amine-type polymer membrane was obtained. In the infrared absorption spectrum of this membrane, the absorption at 1720 cm$^{-1}$ attributable to amide carbonyl disappeared, thus indicating that the reduction to the amine-type membrane proceeded completely. The conversion was about 93%. This membrane was not dyeable with Crystal Violet, basic Thymol Blue or basic Bromothymol Blue, but it was dyed yellow by Cresol Red, light yellow by basic Cresol Red, yellowish orange by Thymol Blue and dark blue by Bromothymol Blue.

Infrared absorption Spectrum (cm$^{-1}$) 3300, 2900, 2350, 1460, 1380–940, 790–490.

This membrane was made of a copolymer composed substantially of repeating units of the formula (216) identified hereinafter. The ratio of p'/q' was about 7.6.

EXAMPLES 33 to 36

An amine membrane obtained by repeating the first part of the operation of Example 30 and amine membranes obtained in the same manner as in Examples 31 and 32, were respectively subjected to conversion to the quaternary ammonium form and counter ion exchange in the same manner as in Example 30 except that the alkylating agents and the conditions for the conversion to quaternary ammonium form, as identified in Table 2, were employed. The properties of the membranes thereby obtained were examined. The results thereby obtained are shown in Table 2 together with the structures of the membranes.

TABLE 2

| Example Nos. | Starting membrane | Conversion to quaternary ammonium form | | | | Final membrane | | | | | |
|---|---|---|---|---|---|---|---|---|---|---|---|
| | | Alkylating agent | Solvent | Temp. (°C.) | Time (hr) | Main structures of copolymers | Dyeing tests *1 | Ion exchange capacity (meq/g. dry film) | Electric resistance ($\Omega \cdot cm^2$) | Transport number | Durability |
| 33 | Amine-type membrane as obtained in Example 30 | Ethyl iodide (2 ml) | Methanol (8 ml) | 60 | 72 | Formula (318) p'/q': 7.6 | CR(b): Deep red BTB(b): Deep blue | 0.90 | 4.0 | 0.86 | — |
| 34 | Amine-type membrane as obtained in Example 30 | Butyl iodide (2 ml) | Methanol (8 ml) | 60 | 72 | Formula (319) p'/q': 7.6 | CR(b): Red BTB(b): Deep blue | — | 5.5 | 0.87 | — |
| 35 | Amine-type membrane as obtained in Example 31 | Methyl iodide (50 ml) | Dimethylformamide (200 ml) | 60 | 72 | Formula (317) p'/q': 7.6 | CR: Yellow TB, BTB: Orange CR(b): Dark red | 1.10 | 2.0 | 0.85 | — |
| 36 | Amine-type membrane as obtained in Example 32 | Methyl iodide (20 ml) | Methanol (80 ml) | 60 | 72 | Formula (320) p'/q': 7.6 | CV: Not dyeable CR: Yellow TB: Orange BTB: Yellowish orange. CR(b): Dark red BTB: Blue TB(b): Light green | — | 4.3 | 0.86 | Superior chlorine resistance |

*1: CV ... Crystal Violet
CR ... Cresol Red
TB ... Thymol Blue
BTB ... Bromothymol Blue
(B) .. Basic

EXAMPLE 37

A carboxylic acid-type polymer membrane (42 cm$^2$) obtained in the same manner as in Example 15, was immersed in 56 ml of anhydrous triethylamine and heated at 60° C. for 3 hours. The membrane was taken out and dried under reduced pressure at 60° C. for 24 hours, whereby a triethylamine carboxylate-type polymer membrane was obtained. In the infrared absorption spectrum, the membrane showed strong absorption at 1680 cm$^{-1}$.

This membrane was made of a copolymer composed substantially of repeating untis of the formula (1) identified hereinafter, wherein W was a hydroxyl group with its hydrogen atom substituted by a triethyl ammonium group. The ratio of p'/q' was about 7.6.

The triethyl amine carboxylate-type polymer membrane thus obtained, was immersed in 160 ml of anhydrous dimethoxyethane and, after the addition of 12.4 ml of triethylamine, 11.3 ml of N,N-dimethyl-1,3-propanediamine and 11.4 ml of trimethylchlorosilane, heated under an argon atmosphere at 90° C. for 72 hours. The membrane was taken out and dried under reduced pressure at 60° C. for 24 hours, whereby an amide-type polymer membrane was obtained. The infrared absorption spectrum of this membrane was substantially the same as the spectrum of the amide-type membrane obtained in Example 30.

This membrane was made of a copolymer composed substantially of repeating units of the formula (115) identified hereinafter. The ratio of p'/q' was about 7.6.

The amide-type polymer membrane thus obtained was immersed in 300 ml of anhydrous tetrahydrofuran under an argon atmosphere, and 4.5 g of sodium borohydride was added. Then, 9 ml of a boron trifluoride ethyl ether complex was added dropwise in 35 minutes under cooling with ice water and stirred for 1.5 hours. Thereafter, the mixture was stirred at room temperature for 30 minutes and further refluxed under heating for 17 hours. After cooling, the membrane was taken out and washed in methanol under reflux for 22 hours, whereby an amine-type polymer membrane was obtained. The infrared absorption spectrum of this membrane was substantially the same as the spectrum of the amine-type membrane obtained in Example 30.

The absorption at 1720 cm$^{-1}$ disappeared, thus indicating that the reduction proceeded completely. The conversion was about 77%. This membrane was not dyeable with basic Thymol Blue or basic Bromothymol Blue, but it was dyed yellow by Cresol Red, yellowish orange by Thymol Blue and dark blue by Bromothymol Blue.

This membrane was made of a copolymer composed substantially of repeating untis of the formula (215) identified hereinafter. The ratio of p'/q' was about 7.6.

The membrane thus obtained was immersed in a solution of 50 ml of methyl iodide in 200 ml of N,N-dimethylformamide and heated at 60° C. for 72 hours, whereby an ammonium iodide-type polymer membrane was obtained. Then, this membrane was immersed in 250 ml of a 10% methanol solution of lithium chloride and heated at 60° C. for 28 hours (the solution was replaced at an intermediate point of this operation). Thereafter, the membrane was immersed in methanol and washed at 60° C. for 19 hours, whereby an ammonium chloride-type polymer membrane was obtained. This membrane was not dyeable with basic Thymol Blue, but it was dyed yellow by Cresol Red, orange by Thymol Blue or Bromothymol Blue and dark red by basic Cresol Red. The infrared absorption spectrum of this membrane was substantially the same of the spectrum of the membrane obtained in Example 30.

Infrared absorption spectrum (cm$^{-1}$) 3400, 3020, 2950, 2820, 2400, 1630, 1470, 1380–1020, 970, 895, 840, 820–470.

This membrane was made of a copolymer composed substantially of repeating units of the formula (317) identified hereinafter. The ratio of p'/q' was about 7.6.

The membrane thus obtained had an electric resistance of 2.2 Ωcm$^2$ and a transport number of 0.85.

EXAMPLE 38

A carboxylic acid-type polymer membrane (42 cm$^2$) obtained in the same manner as in Example 15 was immersed in 170 ml of anhydrous dimethoxyethane and, after the addition of 12.4 ml of triethylamine, 11 ml of N,N,N'-trimethyl-1,3-propanediamine and 11.4 ml of trimethylchlorosilane, heated under an argon atmosphere at 90° C. for 52 hours. The membrane was taken out and dried under reduced pressure at 60° C. for 24 hours, whereby an amide-type polymer membrane was obtained.

Infrared absorption spectrum (cm$^{-1}$) 3380, 3200, 2950, 2880, 2840, 2780, 2400, 1700, 1655, 1530, 1460, 1420, 1360–1020, 980, 845, 800–460.

This membrane was made of a copolymer composed substantially of repeating untis of the formula (117) identified hereinafter. The ratio of p'/q' was about 7.6.

The amido-type polymer membrane thus obtained was reduced in the same manner as in Example 34, whereby an amine-type polymer membrane was obtained.

Infrared absorption spectrum (cm$^{-1}$) 2960, 2880, 2830, 2780, 2400, 1470, 1360–1000, 980, 840, 810–460.

The absorption in the vicinity of 1700 cm$^{-1}$ disappeared, thus indicating that the reduction proceeded completely. The conversion was about 79%. This membrane was not dyeable with basic Cresol Red and basic Thymol Blue, but it was dyed yellow by Cresol Red and orange by Thymol Blue.

This membrane was made of a copolymer composed substantially of repeating units of the formula (217) identified hereinafter. The ratio of p'/q' was about 7.6.

The amine-type polymer membrane thus obtained was treated in the same manner as in Example 37, whereby an ammonium chloride-type polymer membrane was obtained.

Infrared absorption spectrum (cm$^{-1}$) 3350, 3010, 2950, 2810, 2370, 2120, 1630, 1470, 1360–1020, 970, 890, 840, 810–460.

The dyeability of this membrane was the same as in the case of Example 37. This membrane was made of a copolymer composed substantially of repeating units of the formula (317) identified hereinafter. The ratio of p'/q' was 7.6.

The membrane thus obtained had an ion exchange capacity of 0.84 meq/g.dry membrane, an electric resistance of 5.1 Ωcm$^2$ and a transport number of 0.87.

EXAMPLE 39

A n-butyl ester-type polymer membrane (1.7 cm$^2$) obtained in the same manner as in Example 21 was immersed in 15 ml of anhydrous tetrahydrofuran and after the addition of 0.5 ml of N,N,N'-trimethyl-1,3-propanediamine, refluxed under heating under an argon atmosphere for 74 hours. The membrane was taken out and dried under reduced pressure at 60° C. for 20 hours, whereby a light brown opaque amide-type polymer membrane was obtained. The infrared absorption spectrum of this membrane was substantially the same as the spectrum of the membrane obtained in Example 38. Namely, the absorption at 1790 cm$^{-1}$ attributable to the ester disappeared, and absorption by C—H was observed at 3000–2800 and 1460 cm$^{-1}$ and strong absorption attributable to amidocarbonyl was observed at 1700 cm$^{-1}$. The amide-type membrane thus obtained, was reduced in the same manner as in Example 38, whereby a colorless transparent amine-type polymer membrane was obtained. The infrared absorption spectrum of this membrane was substantially the same as the spectrum of the amine-type membrane obtained in Example 38. Namely, the absorption at 1700 cm$^{-1}$ attributable to amidocarbonyl disappeared, thus indicating that the reduction to the amine-type membrane proceeded completely. The conversion was about 70%. This membrane was not dyeable with Crystal Violet or basic Thymol Blue, but it was dyed yellow by Cresol Red and orange by Thymol Blue.

This membrane was made of a copolymer composed substantially of repeating units of the formula (217) identified hereinafter. The ratio of p'/q' was about 7.6.

The amine-type polymer membrane thus obtained was treated in the same manner as in Example 37, whereby an ammonium chloride-type polymer membrane was obtained. The infrared absorption spectrum and the dyeability of this membrane were substantially the same as in the case of Example 37.

This membrane was made of a copolymer composed substantially of repeating units of the formula (317) identified hereinafter. The ratio of p'/q' was about 7.6.

The membrane thus obtained had an electric resistance of 7.2 Ωcm$^2$ and a transport number of 0.87.

EXAMPLE 40

A carboxylic acid-type polymer membrane (42 cm$^2$) obtained in the same manner as in Example 13, was immersed in 160 ml of anhydrous acetonitrile and, after the addition of 15.8 ml of triethylamine, 14.4 ml of N,N-dimethyl-1,3-propanediamine and 14.7 ml of trimethylchlorosilane, heated under an argon atmosphere at 80° C. for 72 hours. The membrane was taken out and dried under reduced pressure at 60° C. for 24 hours, whereby an amide-type polymer membrane was obtained.

Infrared absorption spectrum (cm$^{-1}$) 3600–3000, 3000–2850, 2370, 1700, 1580–1400, 1380–880, 860–400.

Except for the mesh portion, this membrane was made of a copolymer composed substantially of repeating units of the formula (115) identified hereinafter. The ratio of p'/q' was about 6.5.

The amide-type polymer membrane thus obtained was immersed in 300 ml of anhydrous tetrahydrofuran under an argon atmosphere, and 4.5 g of sodium borohydride was added. Then, 10 ml of a boron trifluoride ethyl ether complex was dropwise added in 35 minutes under cooling with ice water and stirred for 1.5 hours. Thereafter, the mixture was stirred at room temperature for 30 minutes and further refluxed under heating for 17 hours. After cooling, the membrane was taken out and washed in methanol under reflux for 22 hours, whereby an amine-type polymer membrane was obtained.

Infrared absorption spectrum (cm$^{-1}$) 3300, 2940, 2870, 2840, 2780, 2380, 1440, 1360–900, 860–400.

The absorption in the vicinity of 1600 cm$^{-1}$ disappeared, thus indicating that the reduction proceeded completely. This membrane was not dyeable with basic Thymol Blue or basic Bromothymol Blue, but it was dyed yellow with Cresol Red, yellowish orange by Thymol Blue and blue by Bromothymol Blue.

Except for the mesh portion, this membrane was made of a copolymer composed essentially of repeating units of the formula (215) identified hereinafter. The ratio of $p'/q'$ was about 6.5.

Then, the membrane thus obtained was immersed in a solution of 50 ml of methyl iodide in 200 ml of N,N-dimethylformamide and heated at 60° C. for 72 hours, whereby an ammonium iodide-type polymer membrane was obtained. Then, the membrane was immersed in 250 ml of a 10% methanol solution of lithium chloride and heated at 60° C. for 28 hours (the solution was replaced at an intermediate point of this procedure). Thereafter, the membrane was immersed in methanol and washed at 60° C. for 19 hours, whereby an ammonium chloride-type polymer membrane was obtained. This membrane was not dyeable with basic Thymol Blue, but it was dyed yellow by Cresol Red, orange by Thymol Blue or Bromothymol Blue and dark red by basic Cresol Red.

Infrared absorption spectrum ($cm^{-1}$) 3600–3100, 3050–2050, 1620, 1520–400.

Except for the mesh portion, this membrane was made of a copolymer composed substantially of repeating units of the formula (317) identified hereinafter. The ratio of $p'/q'$ was about 6.5.

The membrane thus obtained had an electric resistance of 2.7 $\Omega cm^2$ and a transport number of 0.85.

EXAMPLE 41

A carboxylic acid-type polymer membrane (42 $cm^2$) obtained in the same manner as in Example 24, was immersed in 160 ml of anhydrous acetonitrile and, after the addition of 12.4 ml of triethylamine, 11.3 ml of N,N-dimethyl-1,3-propanediamine and 11.4 ml of trimethylchlorosilane, heated under an argon atmosphere at 90° C. for 72 hours. The membrane was taken out and dried under reduced pressure at 60° C. for 24 hours, whereby an amide-type polymer membrane was obtained.

Infrared absorption spectrum ($cm^{-1}$) 3350, 2950, 2860, 2830, 2780, 2380, 1710, 1530, 1465, 1380–1080, 1060, 1035, 1020, 980, 910, 860, 790, 760, 730, 630.

This membrane was made of a copolymer composed substantially of repeating units of the formula (118) identified hereinafter. The ratio of $p'/q'$ was about 6.4.

The amide-type polymer membrane thus obtained was reduced in the same manner as in Example 30, whereby an amine-type polymer membrane was obtained.

Infrared absorption spectrum ($cm^{-1}$) 3310, 2960, 2870, 2830, 2780, 2400, 1725, 1465, 1400–1080, 1040, 975, 630, 550, 510.

The absorption in the vicinity of 1710 $cm^{-1}$ disappeared, thus indicating that the reduction proceeded completely. The dyeability of the membrane was substantially the same as the amine-type membrane obtained in Example 30.

This membrane was made of a copolymer composed substantially of repeating units of the formula (218) identified hereinafter. The ratio of $p'/q'$ was about 6.4.

Then, the amine-type polymer membrane thus obtained was treated in the same manner as in Example 30, whereby an ammonium chloride-type polymer membrane was obtained.

Infrared absorption spectrum ($cm^{-1}$) 3400, 3030, 2970, 2380, 1640, 1490, 1380–1080, 980, 890, 820–460.

The dyeability of the membrane was substantially the same as in the case of Example 30.

The membrane thus obtained, had an electric resistance of 1.2 $\Omega cm^2$ and a transport number of 0.85.

This membrane was made of a copolymer composed substantially of repeating units of the formula (321) identified hereinafter. The ratio of $p'/q'$ was about 6.4.

EXAMPLE 42

A carboxylic acid-type polymer membrane obtained in the same manner as in Example 24 was heated in phosphorus pentachloride/phosphorus oxychloride (weight ratio of 1/1.6) at 120° C. for 24 hours. The membrane was washed in carbon tetrachloride, and then dried. In the infrared spectrum, this membrane showed strong absorption by carbonyl at 1800 $cm^{-1}$.

This membrane was made of a copolymer composed substantially of repeating units of the formula (2) identified hereinafter, wherein W was a chlorine atom. The ratio of $p'/q'$ was about 6.4.

The acid chloride-type polymer membrane (1.7 $cm^2$) thus obtained, was immersed in 15 ml of anhydrous tetrahydrofuran and, after the addition of 0.5 ml of N,N-dimethyl-1,3-propanediamine, refluxed under heating under an argon atmosphere for 74 hours. The membrane was taken out and dried under reduced pressure at 60° C. for 20 hours, whereby a light brown opaque amide-type polymer membrane was obtained. The infrared absorption spectrum of this membrane was substantially the same as the membrane obtained in Example 41. Namely, the absorption at 1800 $cm^{-1}$ attributable to the acid chloride, disappeared. Then, the amide-type membrane thus obtained, was reduced in the same manner as in Example 30, whereby a colorless transparent amine-type polymer membrane was obtained. The infrared absorption spectrum of this membrane was substantially the same as the spectrum of the amine-type membrane obtained in Example 41. Namely, the absorption at 1700 $cm^{-1}$ attributable to amide carbonyl, disappeared, thus indicating that the reduction to the amine-type membrane proceeded completely. The conversion was about 78%. This membrane was not dyeable with Crystal Violet or basic Thymol Blue, but it was dyed yellow by Cresol Red and orange by Thymol Blue.

This membrane was made of a copolymer composed substantially of repeating units of the formula (218) identified hereinafter. The ratio of $p'/p'$ was about 6.4.

Then, the amine-type polymer membrane thus obtained, was treated in the same manner as in Example 30, whereby an ammonium chloride-type polymer membrane was obtained. The infrared absorption spectrum of this membrane was substantially the same as the spectrum of the membrane obtained in Example 41. The dyeability of the membrane was the same in the case of Example 30.

Infrared absorption spectrum ($cm^{-1}$) 3400, 3030, 2970, 2380, 1640, 1490, 1380–1080, 980, 890, 820–460.

The membrane thus obtained had an electric resistance of 1.3 $\Omega cm^2$ and a transport number of 0.85.

This membrane was made of a copolymer composed substantially of repeating units of the formula (321) identified hereinafter. The ratio of $p'/q'$ was about 6.4.

EXAMPLE 43

An amide-type polymer membrane was obtained in the same manner as in Example 36 except that N,N-diethyl-1,3-diaminopropane as the base amine was replaced by 2.9 ml of N-(3-aminopropyl)-2-pipecoline.

Infrared absorption spectrum ($cm^{-1}$) 3280, 2900, 2350, 1720, 1530, 1450, 1380–960, 930, 840–495.

This membrane was made of a copolymer composed substantially of repeating units of the formula (119) identified hereinafter. The ratio of $p'/q'$ was about 7.6.

The membrane thus obtained was reduced in the same manner as in Example 36, whereby an amine-type polymer membrane was obtained. The conversion as calculated from the values obtained by the elementary analysis, was about 84%. The dyeability of the membrane was substantially the same as the amine-type membrane obtained in Example 36.

Infrared absorption spectrum ($cm^{-1}$) 3300, 2880, 2350, 1440, 1370–950, 770–480.

This membrane was made of a copolymer composed substantially of repeating units of the formula (219) identified hereinafter. The ratio of $p'/q'$ was 7.6.

The membrane thus obtained, was then converted to a quaternary ammonium form in the same manner as in Example 36, whereby an ammonium chloride-type polymer membrane was obtained. This membrane was not dyeable with Crystal Violet, but it was dyed yellowish orange by Cresol Red, orange by Thymol Blue, clear yellow by basic Cresol Red, blue basic Bromothymol Blue and yellowish green by basic Thymol Blue.

Infrared absorption spectrum ($cm^{-1}$) 3600–3150, 3020–2850, 2750–2350, 1620 ($H_2O$) 1480–930, 780–490.

The membrane thus obtained, had an electric resistance of 7.2 $\Omega cm^2$ and a transport number of 0.87. This membrane also showed superior durability.

This membrane was made of a copolymer composed substantially of repeating units of the formula (322) identified hereinafter. The ratio of $p'/q'$ was about 7.6.

EXAMPLE 44

A tubular carboxylic acid-type copolymer (50 cm) obtained in the same manner as in Example 26, was immersed in 160 ml of anhydrous acetonitrile to fill the tube with the solvent and, after the addition of 12.4 ml of triethylamine, 11.3 ml of N,N-dimethyl-1,3-propanediamine and 11.4 ml of trimethylchlorosilane, heated under an argon atmosphere at 90° C. for 72 hours. The tube was taken out and dried under reduced pressure at 60° C., whereby a tubular amide-type polymer was obtained. The infrared absorption spectrum of the tubular amide-type polymer thus obtained, was substantially the same as the spectrum of the amide-type membrane obtained in Example 30. The conversion rate was 80%. The tubular polymer thus obtained, was cut into rings and examined for the dyeability with Crystal Violet, whereby it was found that the polymer was not dyeable at all.

The amide-type polymer constituting this tube was composed substantially of repeating units of the formula (115) identified hereinafter. The ratio of $p'/q'$ was about 6.4.

Under an argon atmosphere, the tubular amide-type polymer thus obtained, was immersed in dried diethylene glycol dimethyl ether so that the tube was filled with diethylene glycol dimethyl ether. Then, sodium borohydride was added (a concentration of 0.53M), and the mixture was thoroughly stirred and cooled. Then, a dried diethylene glycol dimethyl ether solution of a boron trifluoride ether complex (0.62 mol per mol of sodium borohydride) was added dropwise under cooling with ice. The reaction was conducted for 2.5 hours under cooling and for further 21 hours at 100° C. The tubular amine-type polymer thereby obtained, was washed with methanol and dried. The infrared absorption spectrum of the polymer was substantially the same as the spectrum of the membrane obtained in Example 30. The conversion was 78%. The tubular polymer thus obtained, was cut into rings and examined for the dyeability, whereby it was found that the polymer had the same dyeability as in the case of Example 30.

This amine-type polymer was composed substantially of repeating units of the formula (215) identified hereinafter. The ratio of $p'/q'$ was about 6.4.

The tubular amine-type polymer was then immersed in a solution of methyl iodide in methanol (volume ratio of ¼) and reacted at 60° C. for 50 hours. The tubular polymer thereby obtained, was washed with methanol and reacted in a methanol solution of lithium chloride (concentration of 1.28 mols) at 60° C. for 24 hours. This tubular polymer was heated in methanol at 60° C., whereby a desired tubular ammonium chloride-type polymer was obtained. The tubular polymer thus obtained was not dyeable with basic Thymol Blue, but was dyed yellow by Cresol Red, orange by Thymol Blue and Bromothymol Blue, and dark red by basic Cresol Red. Thus, the presence of anion exchange groups was confirmed.

The tubular anion exchanger thus obtained had an ion exchange capacity of 1.09 meq/g.dry resin. No change was observed in this value even when the anion exchanger was treated in methanol at 65° C. for 48 hours, followed by the removal of the solvent under vacuum at 40° C., and this operation was repeated 5 times.

This tubular copolymer was composed substantially of repeating units of the formula (317) identified hereinafter. The ratio of $p'/q'$ was about 6.4.

EXAMPLE 45

A powder carboxylic acid-type copolymer (1.0 g) obtained in the same manner as in Example 27 was immersed in 160 ml anhydrous dimethoxyethane and after the addition of 12.4 ml of triethylamine, 11.3 ml of N,N-dimethyl-1,3-propanediamine and 11.4 ml of trimethylchlorosilane, heated under an argon atmosphere at 90° C. for 72 hours. The powder was collected by filtration and dried under reduced pressure at 60° C., whereby a powder amido-type polymer was obtained. The infrared absorption spectrum of the powder amide-type polymer thus obtained, was substantially the same as the amido-type membrane obtained in Example 30. The conversion was 75%. The powder polymer was not dyeable with Crystal Violet.

The amido-type polymer constituting this powder was composed substantially of repeating units of the formula (115) identified hereinafter. The ratio of $p'/q'$ was about 6.6.

The powder amide-type polymer thus obtained, was subjected to the reduction by diborane in the same manner as in Example 30, and the powder was collected by filtration, whereby a powder amine-type polymer was obtained. The conversion was 72%. The powder thus obtained was formed into a KBr disc and examined for the infrared absorption spectrum. The absorption in the vicinity of 1700 $cm^{-1}$ attributable to amide carbonyl, completely disappeared.

This powder was not dyeable with basic Thymol Blue or basic Bromothymol Blue, but it was dyed yellow by Cresol Red, yellowish orange by Thymol Blue and blue by Bromothymol Blue.

This amine-type polymer was composed substantially of repeating units of the formula (215) identified hereinafter. The ratio of p'/q' was about 6.6.

The powder amine-type polymer thus obtained, was immersed in a solution of methyl iodide in methanol (volume ratio of ¼) and reacted at 60° C. for 50 hours. The powder polymer thus obtained, was washed with methanol and reacted in a methanol solution of lithium chloride (concentration of 1.28M) at 60° C. for 24 hours. This powder polymer was heated in methanol at 60° C., whereby a desired powder ammonium chloride-type polymer was obtained. The powder polymer thus obtained, was dyed yellow by neutral Cresol Red, dark red by basic Cresol Red and orange by Thymol Blue or Bromothymol Blue. Thus, the presence of anion exchange groups was confirmed.

The powder anion exchanger thus obtained, had an ion exchange capacity of 0.96 meq/g.dry resin. No change was observed in this value even when the anion exchanger was treated in methanol at 65° C. for 48 hours, followed by the removal of the solvent under vacuum at 40° C., and this operation was repeated 5 times. This membrane was made of a copolymer composed substantially of repeating units of the formula (317) identified hereinafter. The ratio of p'/q' was about 6.6.

EXAMPLE 46

The n-butyl ester-type polymer membrane (3 cm$^2$) obtained in the same manner as in Example 21 was immersed in 20 ml of anhydrous tetrahydrofuran and, after the addition of 1 ml of N-methylpiperadine, refluxed under heating under an argon atmosphere for 75 hours. The membrane was taken out and dried under reduced pressure at 60° C. for 24 hours, whereby a light brown opaque amido-type polymer membrane was obtained. In the infrared absorption spectrum of this membrane, the absorption at 1790 cm$^{-1}$ attributable to ester carbonyl completely disappeared. Absorption by C—H was observed at 3000–2800 and 1450 cm$^{-1}$, and strong absorption attributable to amide carbonyl was observed at 1700 cm$^{-1}$.

Infrared absorption spectrum (cm$^{-1}$) 3410, 2960, 2870, 2820, 2400, 1700, 1615, 1450, 1390–1040, 980, 890, 850, 820–460.

This membrane was made of a copolymer composed substantially of repeating units of the formula (110) identified hereinafter. The ratio of p'/q' was about 7.6.

The membrane thus obtained was immersed in 55 ml of anhydrous tetrahydrofuran under an argon atmosphere, and 1.5 g of sodium borohydride was added. Then, a solution of 3 ml of a boron trifluoride ethyl ether complex in 5 ml of tetrahydrofuran, was dropwise added in 30 minutes under cooling with ice water and stirred for 1.5 hours. Thereafter, the mixture was stirred at room temperature for 30 minutes and further refluxed under heating for 17 hours. The membrane was taken out and washed in methanol under reflux for 20 hours and then dried under reduced pressure at 60° C. for 24 hours, whereby a light brown transparent amine-type polymer membrane was obtained. In the infrared absorption spectrum of this membrane, the absorption at 1700 cm$^{-1}$ attributable to amide carbonyl disappeared, thus indicating that the reduction to the amine-type membrane proceeded completely. The conversion was about 74%. This membrane was not dyeable with Crystal Violet, basic Cresol Red or basic Thymol Blue, but it was dyed yellow by Cresol Red and orange by Thymol Blue.

Infrared absorption spectrum (cm$^{-1}$) 2930, 2880, 2800, 2700, 2350, 1450, 1405, 1370, 1360–1020, 1010, 970, 905, 825, 810–460.

This membrane was made of a copolymer composed substantially of repeating units of the formula (210) identified hereinafter. The ratio of p'/q' was about 7.6.

EXAMPLE 47

A methyl ester-type polymer membrane (2 cm$^2$) obtained in the same manner as in Example 31 was immersed in 20 ml of anhydrous diethyl ether and, after the addition of 1 ml of N-methylpiperazine, refluxed under heating under an argon atmosphere for 21 hours. The membrane was taken out and dried under reduced pressure at 60° C., whereby a colorless translucent amide-type polymer membrane was obtained. The infrared absorption spectrum of this membrane was substantially the same as the amide-type membrane obtained in Example 46. This membrane was made of a copolymer composed substantially of repeating units of the formula (110) identified hereinafter.

The membrane thus obtained, was immersed in 30 ml of anhydrous ethylene glycol dimethyl ether under an argon atmosphere, and 1 g of sodium borohydride was added. Then, a solution of 2 ml of a boron trifluoride ethyl ether complex in 5 ml of diethylene glycol dimethyl ether, was added dropwise in 30 minutes under cooling with ice water and stirred for 3 hours. Thereafter, the mixture was stirred at room temperature for 1 hour and at 100° C. for further 17 hours. Then, the membrane was subjected to the same post-treatment as in Example 46, whereby an amine-type polymer membrane was obtained. The conversion was about 66%. This membrane was made of a copolymer composed substantially of repeating units of the formula (210) identified hereinafter.

EXAMPLES 48 TO 50

The reaction was conducted under the same conditions as in Example 16 except that the reaction was carried out in acetonitrile, toluene or tetrahydrofuran instead of dimethoxyethane, whereby an amine-type polymer membrane was obtained at the conversion as identified in Table 3. The dyeability of each of the membranes thereby obtained, was substantially the same as in the case where dimethoxyethane was used. The reaction conditions in the Table represent the amidation conditions, and the conversion given in the Table was calculated from the values obtained by the elementary analysis of each of the amine-type polymer membranes after the reduction.

TABLE 3

| Example Nos. | Surface area of the starting membrane (cm²) | Amidation conditions | | | | | | Conversion (roughly) (%) |
|---|---|---|---|---|---|---|---|---|
| | | Solvent (ml) | N—methyl-piperazine (mmol) | Triethyl-amine (mmol) | Trimethyl-chlorosilane (mmol) | Temper-ature (°C.) | Time (hr) | |
| 48 | 1.5 | Acetonitrile (15) | 4.5 | 4.5 | 4.5 | 80 | 65 | 74 |
| 49 | 2.0 | Toluene (15) | 4.5 | 4.5 | 4.5 | 80 | 70 | 65 |
| 50 | 1.5 | Tetrahydro-furan (20) | 4.5 | 4.5 | 4.5 | 65 | 68 | 53 |

EXAMPLE 51

A carboxylic acid-type polymer membrane (1.5 cm²) obtained in the same manner as in Example 15 was immersed in 15 ml of anhydrous dimethoxyethane and, after the addition of 0.6 ml of hexamethyldisilazane, 0.5 ml of methylpiperazine and three drops of trimethylchlorosilane, heated under an argon atmosphere at 90° C. for 48 hours, whereby an amido-type polymer membrane was obtained. This membrane was made of a copolymer composed substantially of repeating units of the formula (110) identified hereinafter.

Then, the membrane was reduced in the same manner as in Example 46, whereby an amine-type polymer membrane was obtained. The membrane was made of a copolymer composed substantially of repeating units of the formula (210) identified hereinafter. The conversion was about 49%.

EXAMPLE 52

A carboxylic acid-type polymer membrane (1.5 cm²) obtained in the same manner as in Example 15 was immersed in 3 ml of N-methyl-N'-(trimethylsilyl)peperazine and heated under an argon atmosphere at from 60° to 65° C. for 48 hours, whereby an amido-type polymer membrane was obtained. The membrane was made of a copolymer composed substantially of repeating units of the formula (110) identified hereinafter.

Then, the membrane was reduced in the same manner as in Example 46, whereby an amine-type polymer membrane was obtained. The membrane was made of a copolymer composed substantially of repeating units of the formula (210) identified hereinafter. The conversion was about 53%.

EXAMPLE 53

A carboxylic acid-type polymer membrane (1.5 cm²) obtained in the same manner as in Example 15 was immersed in 15 ml of anhydrous dimethoxyethane and, after the addition of 0.6 ml of N,O-bis(trimethylsilyl)acetoamide and 0.5 ml of N,N,N'-trimethylethylenediamine, heated under an argon atmosphere at 90° C. for 48 hours, whereby an amide-type polymer membrane was obtained. The membrane was made of a copolymer composed substantially of repeating units of the formula (111) identified hereinafter.

Then, the amido-type polymer membrane thus obtained was reduced in the same manner as in Example 46, whereby an amine-type polymer membrane was obtained. The membrane was made of a copolymer composed substantially of repeating units of the formula (211) identified hereinafter. The conversion was about 70%.

EXAMPLE 54

A triethylammonium carboxylate-type polymer membrane obtained by repeating the first part of the operation of Example 37, was immersed in 33 ml of anhydrous dimethoxyethane and, after the addition of 1.86 ml of triethylamine, 1.5 ml of N,N,N'-trimethylethylenediamine and 1.71 ml of trimethylchlorosilane, heated under an argon atmosphere at 90° C. for 64 hours, whereby an amide-type polymer membrane was obtained. The membrane was made of a copolymer composed essentially of repeating units of the formula (111) identified hereinafter.

Then, the membrane was reduced in the same manner as in Example 46, whereby an amine-type polymer membrane was obtained. The conversion was about 85%. The infrared absorption spectrum and the dyeability of the membrane thereby obtained, were substantially the same as those of the membrane obtained in Example 21.

This membrane was made of a copolymer composed substantially of repeating units of the formula (211) identified hereinafter. The ratio of p'/q' was about 7.6.

EXAMPLE 55

A methyl ester-type polymer membrane (1.5 cm²) obtained by repeating the first part of the operation of Example 31, was immersed in 33 ml of anhydrous dimethoxyethane and, after the addition of 1.86 ml of triethyl amine, 1.5 ml of N,N,N'-trimethylethylenediamine and 1.71 ml of trimethylchlorosilane, heated under an argon atmosphere at 90° C. for 64 hours, whereby an amide-type polymer membrane was obtained. The membrane was made of a copolymer composed substantially of repeating units of the formula (111) identified hereinafter.

Then, the membrane was reduced in the same manner as in Example 46, whereby an amine-type polymer membrane was obtained. The conversion was about 84%. The infrared spectrum and the dyeability of the membrane thus obtained, were substantially the same as those of the membrane obtained in Example 21, thus indicating that membrane was made of the same copolymer.

EXAMPLE 56

A carboxylic acid-type polymer membrane (42 cm²) obtained in the same manner as in Example 15 was immersed in 140 ml of anhydrous acetonitrile and, after the addition of 12.4 ml of triethylamine, 13.0 ml of N,N-dimethyl-1,4-butanediamine and 11.4 ml of tirmethylchlorosilane, heated under an argon atmosphere at 80° C. for 80 hours. The membrane was taken out and dried under reduced pressure at 60° C. for 24 hours, whereby an amide-type polymer membrane was obtained.

Infrared absorption spectrum (cm$^{-1}$) 3350, 2970, 2900, 2860, 2810, 1730, 1540, 1480, 1400, 1040, 980, 930, 800–500.

This membrane was made of a copolymer composed substantially of repeating units of the formula (120) identified hereinafter. The ratio of p'/q' was about 7.6.

The amide-type polymer membrane thus obtained was immersed in 300 ml of anhydrous tetrahydrofuran under an argon atmosphere, and 4.5 g of sodium borohydride was added thereto. Then, 9 ml of a boron trifluoride ethyl ether complex was added dropwise in 35 minutes under cooling with ice water and stirred for 2 hours. Then, the mixture was stirred at room temperature for 30 minutes and further refluxed under heating for 20 hours. After cooling, the membrane was taken out and washed in aqueous methanol at 60° C. for 15 hours, whereby an amine-type polymer membrane was obtained.

Infrared absorption spectrum (cm$^{-1}$) 3330, 2950, 2870, 2840, 2790, 2400, 1480, 1350–1020, 980, 830, 820–480.

The absorption at 1720 cm$^{-1}$ disappeared, thus indicating that the reduction proceeded completely. The conversion was about 70%. This membrane was not dyeable with basic Thymol Blue or basic Bromothymol Blue, but it was dyed yellow by Cresol Red, yellowish orange by Thymol Blue and blue by Bromothymol Blue.

This membrane was made of a copolymer composed substantially of repeating units represented by the formula (220) identified hereinafter. The ratio of p'/q' was about 7.6.

The membrane thus obtained was immersed in a solution of 50 ml of methyl iodide in 200 ml of N,N-dimethylformamide and heated at 60° C. for 80 hours, whereby an ammonium iodide-type polymer membrane was obtained. Then, this membrane was immersed in 250 ml of a 10% methanol solution of lithium chloride and heated at 60° C. for 28 hours (the solution was renewed at an intermediate point of this operation). Thereafter, the membrane was immersed in methanol and washed at 60° C. for 19 hours, whereby an ammonium chloride-type polymer membrane was obtained. This membrane was not dyeable with basic Thymol Blue, but it was dyed yellow by Cresol Red, orange by Thymol Blue and Bromothymol Blue and dark red by basic Cresol Red.

Infrared absorption spectrum (cm$^{-1}$) 3400, 3030, 2950, 2820, 2400, 1630, 1480, 1400–1020, 970, 895, 840, 820–470.

This membrane was made of a copolymer composed substantially of repeating units of the formula (323) identified hereinafter. The ratio of p'/q' was about 7.6. The membrane thus obtained had an ion exchange capacity of 0.99 meq/g.dry membrane, an electric resistance of 3.8 Ωcm$^2$ and a transport number of 0.86.

It was observed throughout Examples that physical characteristics including the physical strength, the dimension stability and the flexibility of each starting material perfluorocarbon polymer having the pendant terminal group of formula IV were preserved in the resulting quaternary ammonium-type, amine-type and amide-type fluorocarbon polymers.

REFERENCE EXAMPLE

By using ammonium chloride-type membranes obtained in Examples 30 and 40, electrolysis of hydrochloric acid was conducted. For the purpose of comparison, electrolysis of hydrochloric acid was conducted in the same manner by using a commercially available hydrocarbon-type anion exchange membrane. The conditions for the electrolysis were as follows.

Membrane surface area: 9.6 cm$^2$
Electrode: Platinum
Electrolytes: Anode/Cathode=6N HCl/6N HCl
Current density: 5A/dm$^2$
The results thereby obtained are shown in Table 4.

TABLE 4

| Membranes | Membrane resistance (μ · cm$^2$) | Cell voltage (V) |
|---|---|---|
| Membrane of Example 30 | 1.7 | 1.44 |
| Membrane of Example 40 | 2.7 | 1.48 |
| Commercial membrane | about 2.5 | 1.49 |

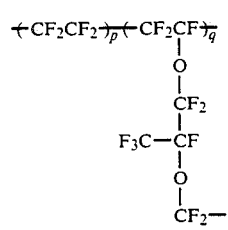 (1)

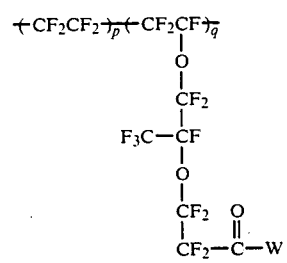 (2)

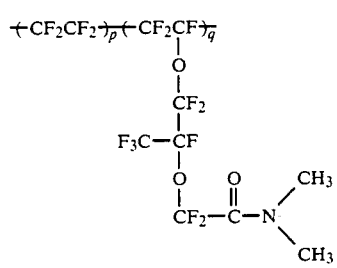 (101)

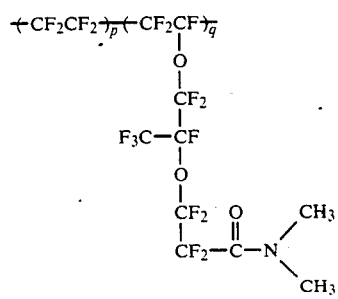 (102)

-continued $$\text{(103)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—N(CH}_2\text{CH}_2\text{)}_2$$

$$\text{(104)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NH—C}_6\text{H}_5$$

$$\text{(105)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NHCH}_2\text{CH}_2\text{CH}_3$$

$$\text{(106)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—N(CH}_2\text{CH}_3\text{)}_2$$

$$\text{(107)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NH}_2$$

$$\text{(108)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NHCH}_2\text{CH}_3$$

$$\text{(109)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NHCH}_2\text{CH}_2\text{OH}$$

$$\text{(110)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—N(CH}_2\text{CH}_2\text{)}_2\text{N—CH}_3$$

$$\text{(111)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—N(CH}_3\text{)CH}_2\text{CH}_2\text{N(CH}_3\text{)}_2$$

$$\text{(112)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—N(CH}_3\text{)CH}_2\text{CH}_2\text{N(CH}_3\text{)}_2$$

$$\text{(113)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NHCH}_2\text{CH}_2\text{N(CH}_3\text{)}_2$$

$$\text{(114)} \quad \text{+(CF}_2\text{CF}_2\text{)}_p\text{(CF}_2\text{CF)}_q\text{—O—CF}_2\text{—CF(CF}_3\text{)—O—CF}_2\text{—C(=O)—NHCH}_2\text{CH}_2\text{N(CH}_2\text{CH}_2\text{)}_2$$

-continued
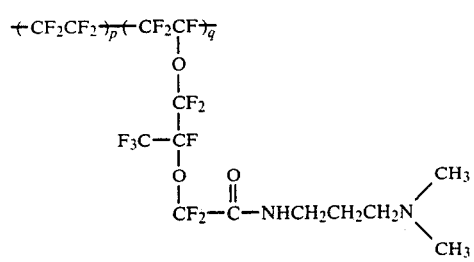 (115)
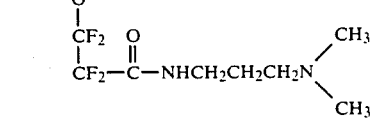 (116)
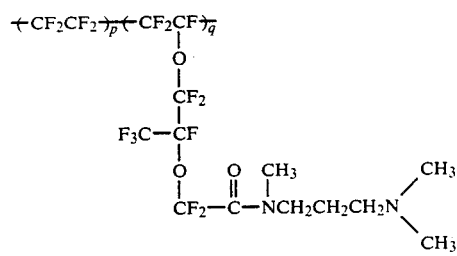 (117)
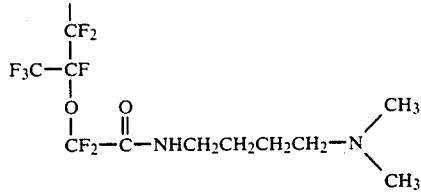 (118)
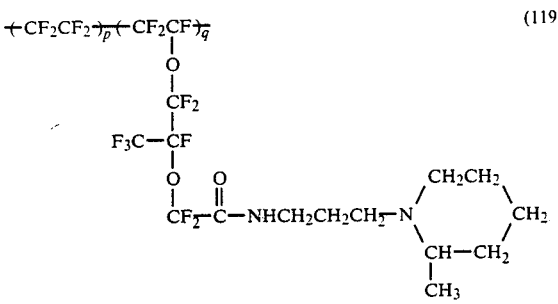 (119)
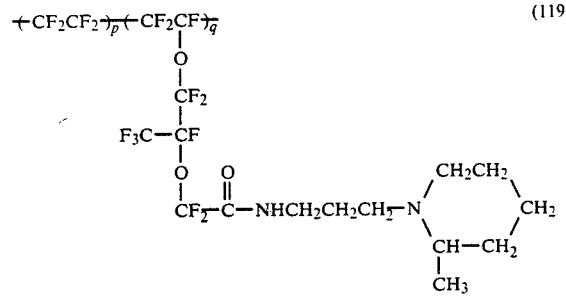 (120)
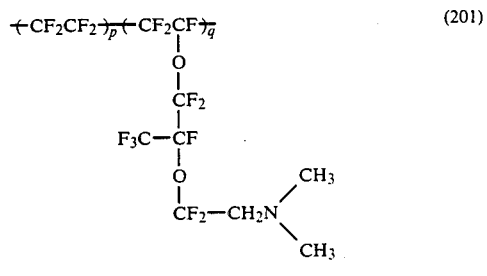 (201)
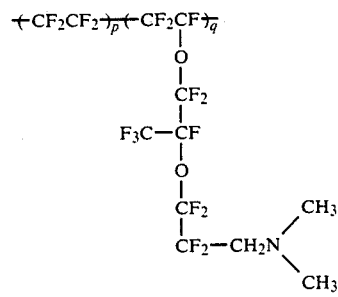 (202)
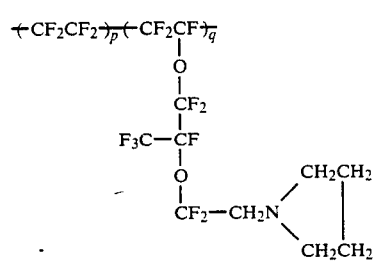 (203)
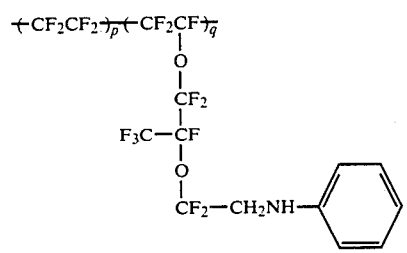 (204)
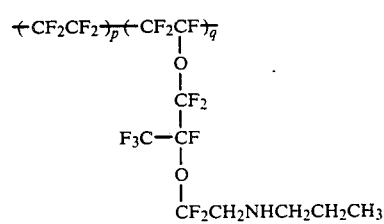 (205)
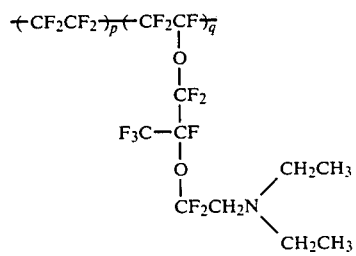 (206)

-continued
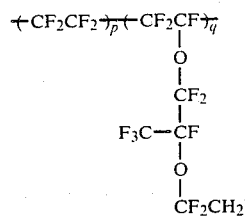 (207)
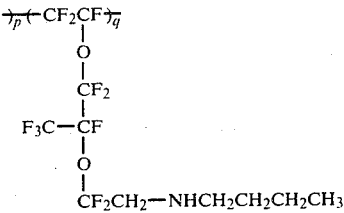 (208)
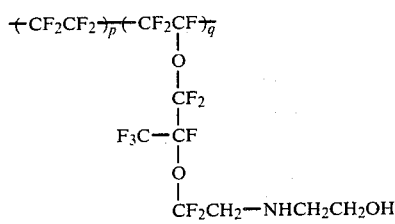 (209)
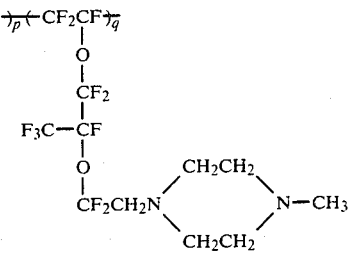 (210)
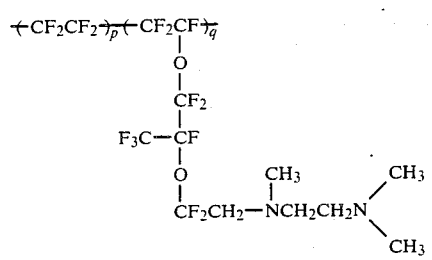 (211)
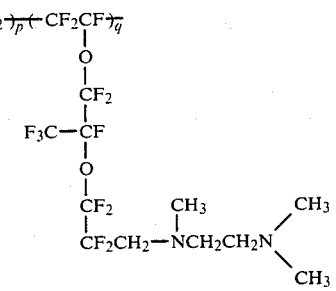 (212)
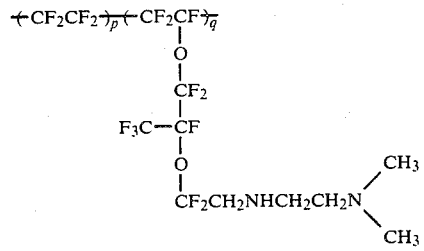 (213)
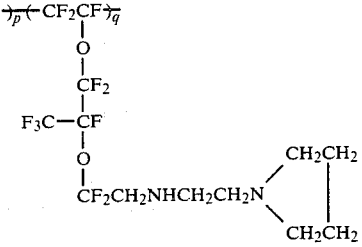 (214)
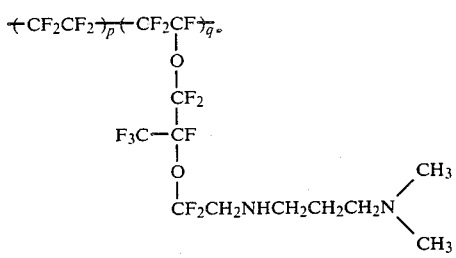 (215)
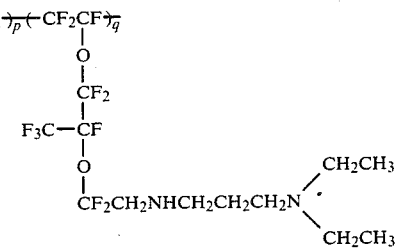 (216)
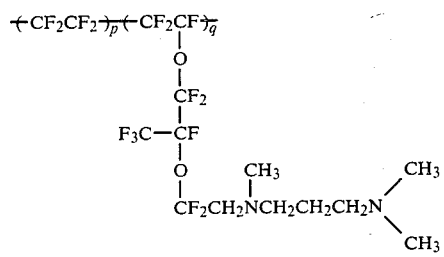 (217)
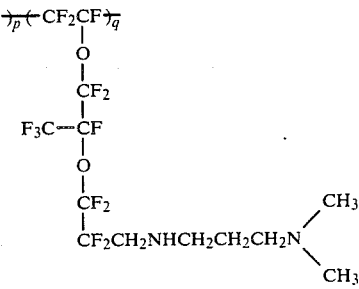 (218)

-continued
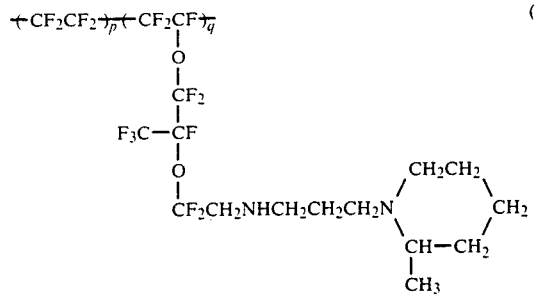 (219)
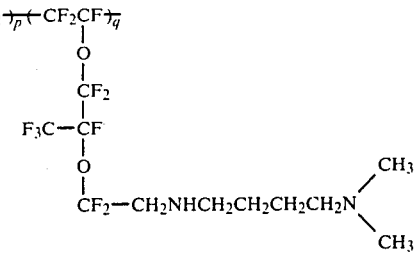 (220)
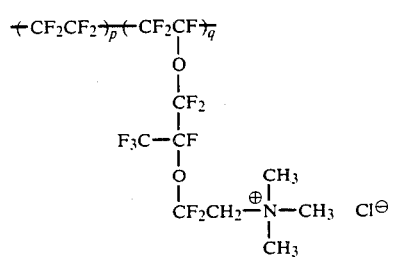 (301)
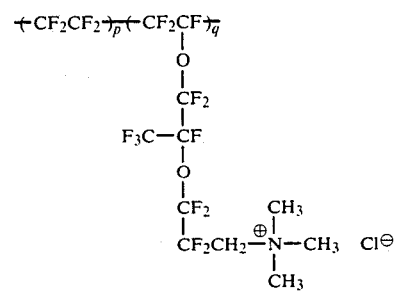 (302)
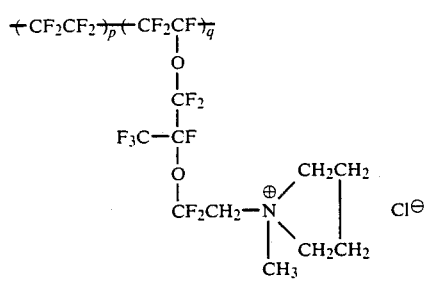 (303)
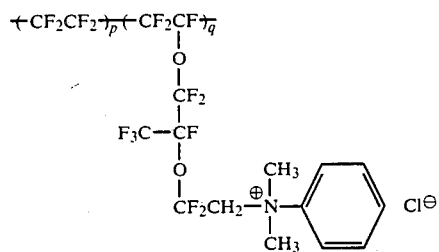 (304)
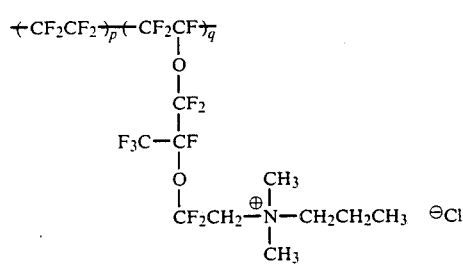 (305)
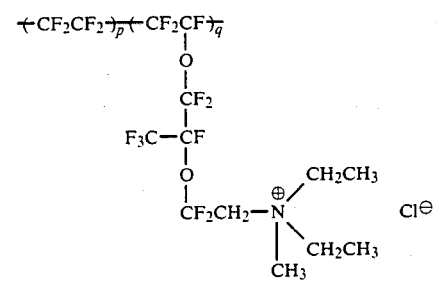 (306)
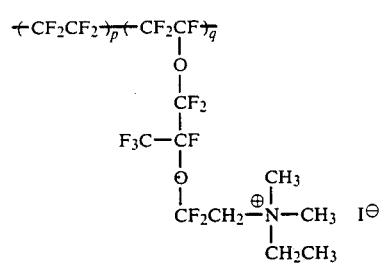 (307)
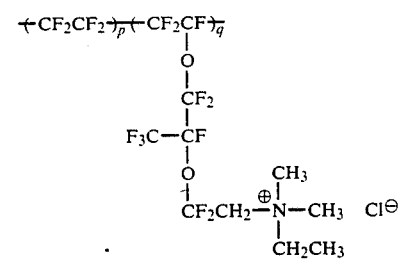 (308)
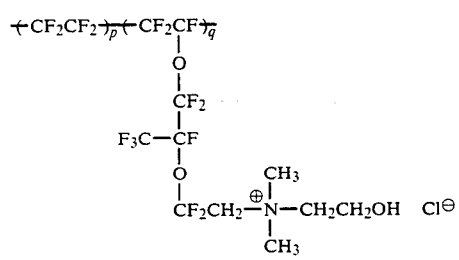 (309)
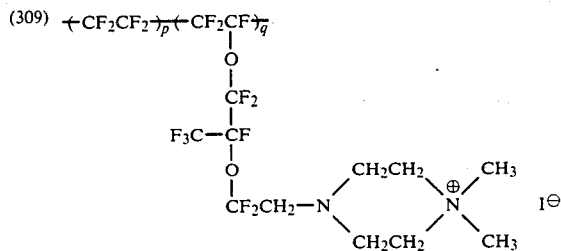 (310)

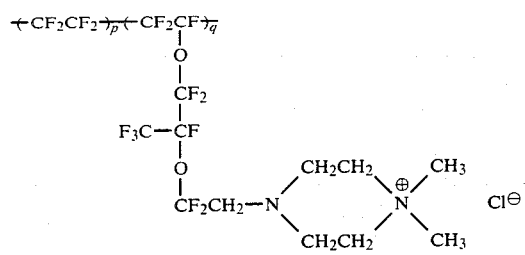 (311)
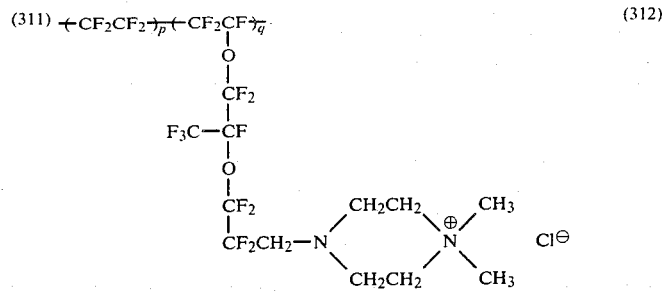 (312)
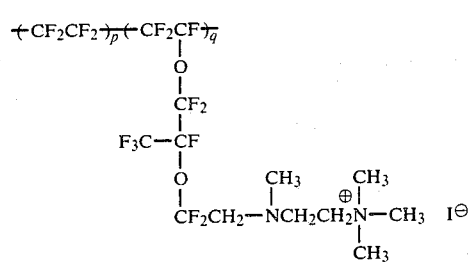 (313)
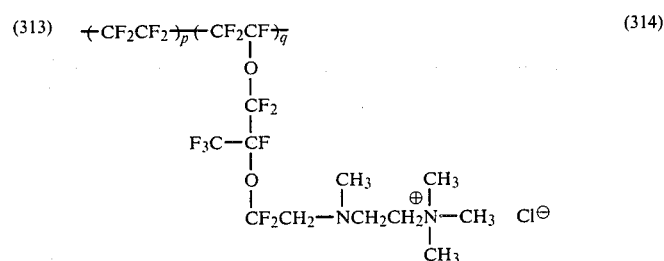 (314)
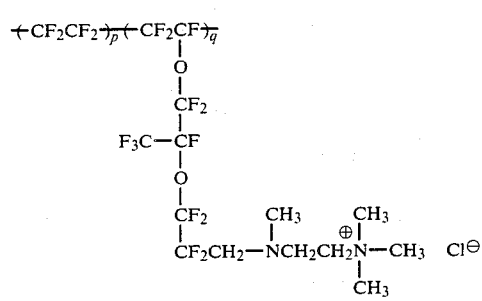 (315)
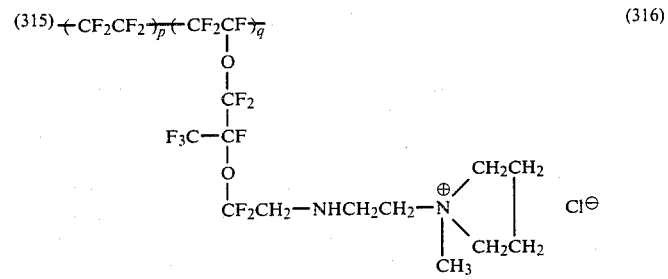 (316)
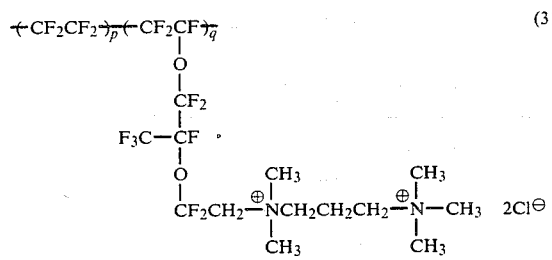 (317)
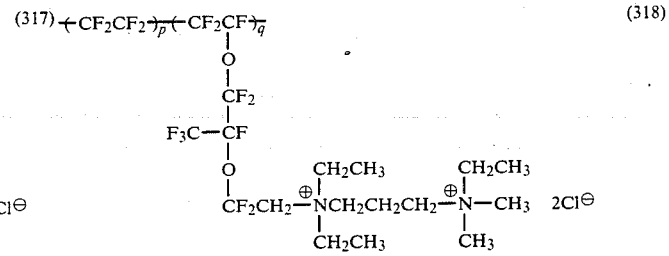 (318)
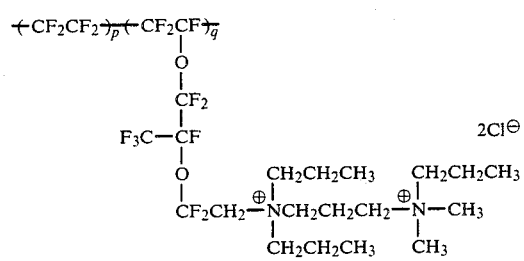 (319)
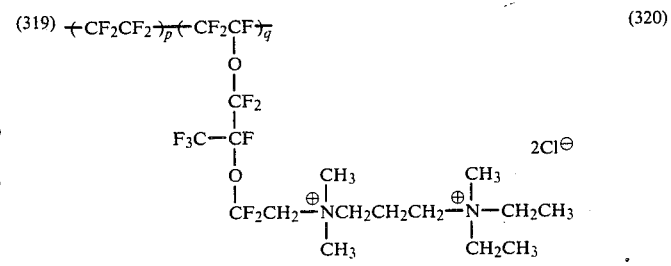 (320)

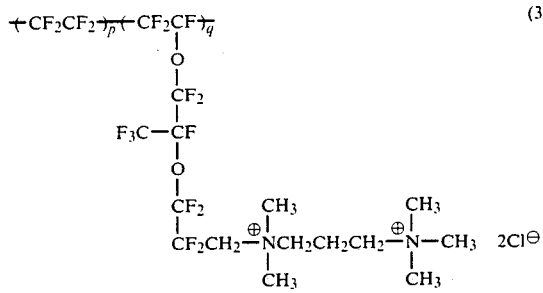
(321)
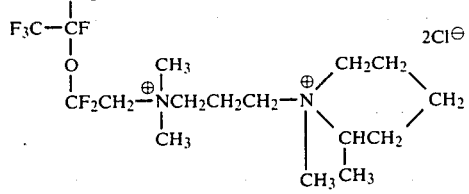
(322)

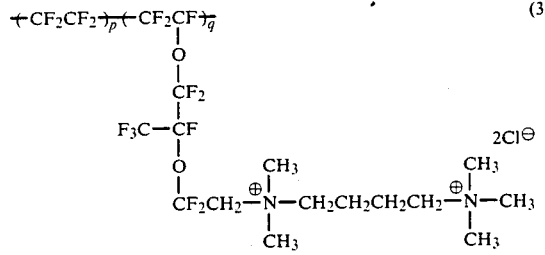
(323)

We claim:

1. A nitrogen-containing fluorocarbon polymer comprising a perfluorocarbon main chain and a pendant chain directly m is 0 or 1 and n is an integer of 1 to 5 attached to the main chain, characterized in that the pendant chain has a structure represented by the formula:

$$[O(CF_2-CF-O)_l]_m(CH_2)_nCH_2-Y$$
$$|$$
$$X$$

where X is a fluorine atom, a chlorine atom or a —CF$_3$ group, l is an integer of 1 to 5 where Y is

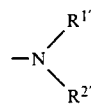

(where each of R$^{1'}$ and R$^{2'}$ is a hydrogen atom, a lower alkyl group, an aromatic group or a hydroxy-lower alkyl group, or R$^{1'}$ and R$^{2'}$ together form a tetramethylene or pentamethylene group),

(where R$^4$ is a lower alkyl group), or

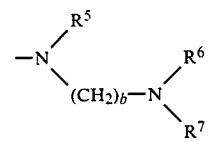

(where R$^5$ is a hydrogen atom or a lower alkyl group, each of R$^6$ and R$^7$ is a lower alkyl group, or R$^6$ and R$^7$ together form a tetramethylene or pentamethylene group, and b is an integer of 2 to 5).

2. The nitrogen-containing fluorocarbon polymr according to claim 1, wherein the pendant chain has a structure represented by the formula:

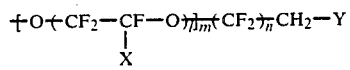

where X is a fluorine atom, a chlorine atom or a —CF$_3$ group, l is an integer of 0 to 5, m is 0 or 1, n is an integer of 1 to 5, and Y is as defined in claim 1.

3. The nitrogen-containing fluorocarbon polymer according to claim 1, wherein the main chain is a linear perfluorocarbon random polymer chain comprising repeating units represented by the formula:

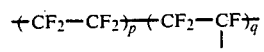

where p is an integer of 3 to 16, q is an integer of 1 to 10, and the ratio of p'/q' is within a range of from 2 to 16 where p' is an average value of all p in the repeating units and q' is an average value of all q in the repeating units.

4. The nitrogen-containing fluorocarbon polymer according to claim 1, which comprises repeating units represented by the formula:

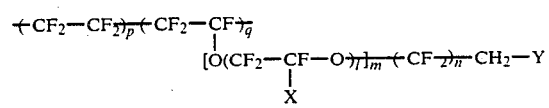

where p is an integer of 3 to 16, q is an integer of 1 to 10, and the ratio of p'/q' is within a range of from 2 to 16 where p' is an average value of all p in the repeating units and q' is an average value of all q in the repeating units, X is a fluorine atom, a chlorine atom or a —CF$_3$ group, l is an integer of 0 to 5, m is 0 or 1, n is an integer of 1 to 5 and Y is as defined in claim 1.

5. The nitrogen-containing fluorocarbon polymer according to claim 1, wherein the pendant chain has a terminal group represented by the formula:

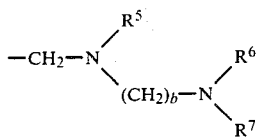

where $R^5$, $R^6$, $R^7$ and b are as defined in claim 1.

6. The nitrogen-containing fluorocarbon polymer according to claim 1, wherein the pendant chain has a terminal group selected from the group consisting of

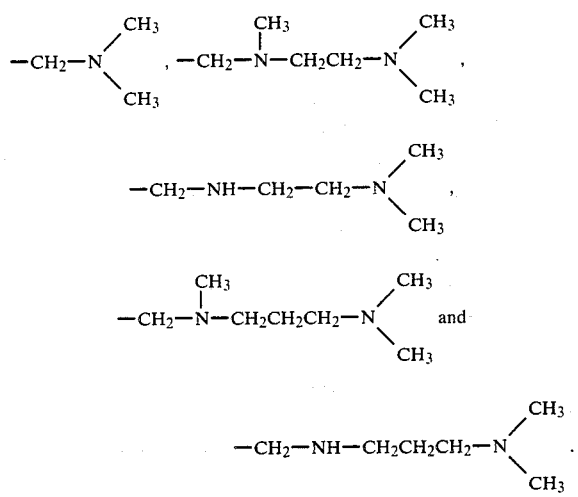

7. A process for preparing a fluorocarbon polymer comprising a perfluorocarbon main chain and a pendant chain attached to the main chain, said pendant chain having a terminal group represented by the formula:

   (I)

where Q is

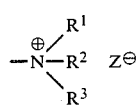   (I)

(where each of $R^1$ and $R^2$ is a lower alkyl group, an aromatic group or a hydroxy-lower alkyl group, or $R^1$ and $R^2$ together from a tetramethylene or pentamethylene group, $R^3$ is a lower alkyl group, and Z is a counter ion for the quaternary ammonium ion),

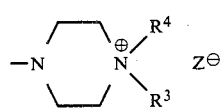

(where $R^4$ is a lower alkyl group, and $R^3$ and Z are as defined above),

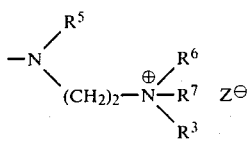

(where $R^5$ is a hydrogen atom or a lower alkyl group, each of $R^6$ and $R^7$ is a lower alkyl group, or $R^6$ and $R^7$ together form a tetramethylene or pentamethylene group, and $R^3$ and Z are as defined above), or

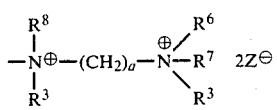

(where $R^8$ is a lower alkyl group, a is an integer of 3 to 5, and $R^3$, $R^6$, $R^7$ and Z are as defined above), which comprises reacting a nitrogen-containing fluorocarbon polymer comprising a perfluorocarbon main chain and a pendant chain attached to the main chain and having a terminal group represented by the formula:

$$-CH_2-Y \qquad (II)$$

where Y is

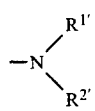

(where each of $R^{1'}$ and $R^{2'}$ is a hydrogen atom, a lower alkyl group, an aromatic group or a hydroxy-lower alkyl group, or $R^{1'}$ and $R^{2'}$ together form a tetramethylene or pentamethylene group),

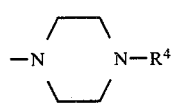

(where $R^4$ is a lower alkyl group), or

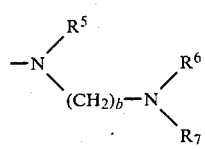

(where $R^5$ is a hydrogen atom or a lower alkyl group, each of $R^6$ and $R^7$ is a lower alkyl group, or $R^6$ and $R^7$ together form a tetramethylene or pentamethylene group, and b is an integer of 2 to 5), with an alkylating agent to convert the terminal group of the formula II to the terminal group of the formula I.

8. A process for preparing a nitrogen-containing fluorocarbon polymer comprising a perfluorocarbon main chain and a pendant chain attached to the main chain, said pendant chain having a terminal group represented by the formula:

$$-CH_2-Y \qquad (II)$$

where Y is

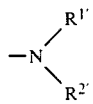

(where each of $R^{1'}$ and $R^{2'}$ is a hydrogen atom, a lower alkyl group, an aromatic group or a hydroxy-lower alkyl group, or $R^{1'}$ and $R^{2'}$ together form a tetramethylene or pentamethylene group),

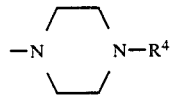

(where $R^4$ is a lower alkyl group), or

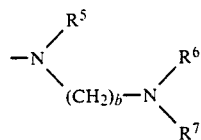

(where $R^5$ is a hydrogen atom or a lower alkyl group, each of $R^6$ and $R^7$ is a lower alkyl group, or $R^6$ and $R^7$ together form a tetramethylene or pentamethylene group, and b is an integer of 2 to 5), which comprises reacting a fluorocarbon polymer comprising a perfluorocarbon main chain and a pendant chain attached to the main chain and having a carboxylic acid amide terminal group represented by the formula:

 (III)

where Y is as defined above, with a reducing agent to convert the terminal group of the formula III to the terminal group of the formula II.

9. A process for preparing a nitrogen-containing fluorocarbon polymer comprising a perfluorocarbon main chain and a pendant chain attached to the main chain, said pendant chain having a carboxylic acid amide terminal group represented by the formula:

 (III)

where Y is

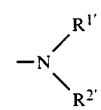

(where each of $R^{1'}$ and $R^{2'}$ is a hydrogen atom, a lower alkyl group, an aromatic group or a hydroxy-lower alkyl group, or $R^{1'}$ and $R^{2'}$ together form a tetramethylene or pentamethylene group),

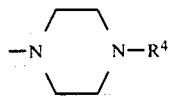

(where $R^4$ is a lower alkyl group), or

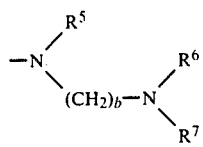

(where $R^5$ is a hydrogen atom or a lower alkyl group, each of $R^6$ and $R^7$ is a lower alkyl group, or $R^6$ and $R^7$ together form a tetramethylene or pentamethylene group, and b is an integer of 2 to 5), which comprises reacting a fluorocarbon polyemr comprising a perfluorocarbon main chain and a pendant chain attached to the main chain and having a substituted carbonyl terminal group represented by the formula:

 (IV)

where W is a halogen atom, a hydroxyl group unsubstituted or substituted by a tri(lower alkyl)silyl group or an ammonium group, or a lower alkoxy group, with ammonia or an amine represented by the formula:

 (V)

where Y is as defined above, to convert the terminal group of the formula IV to the terminal group of the formula III.

10. In an electrochemical cell comprising an anode compartment and a cathode compartment separated by an ion exchange membrane the improvement comprising as the ion exchange membrane an anion exchange membrane comprising a perfluorinated main chain and a pendant chain of the formula:

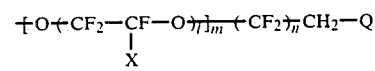

where X is fluorine, chlorine or —$CF_3$, l is an integer of 0 or 5, m is 0 or 1, n is an integer of 1 to 5 and Q is a quarternary ammonium terminal group of the formula:

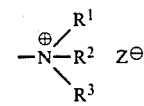 (I)

where each of $R^1$ and $R^2$ is a lower alkyl group, an aromatic group or a hydroxy-lower alkyl group, or $R^1$ and $R^2$ together form a tetramethylene or pentamethylene group, $R^3$ is a lower alkyl group, and Z is a counter ion for the quaternary ammonium ion,

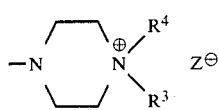

where $R^4$ is a lower alkyl group, and $R^3$ and Z are as defined above,

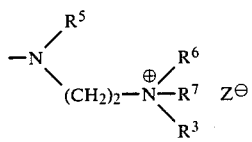

where $R^5$ is a hydrogen atom or a lower alkyl group, each of $R^6$ and $R^7$ is a lower alkyl group, or $R^6$ and $R^7$ together form a tetramethylene or pentamethylene group, and $R^3$ and Z are as defined above, or

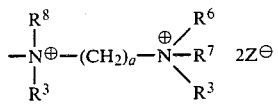

where $R^8$ is a lower alkyl group, a is an integer of 3 to 5, and $R^3$, $R^6$ and $R^7$ and Z are as defined above.

11. In a dialysis apparatus comprising a multitube module the improvement comprising as the multitube module an anion exchange membrane in tubular form comprising a perfluorinated main chain and a pendant group of the formula:

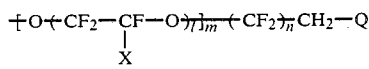

where X is fluorine, chlorine or —CH$_3$, l is an integer of 0 to 5, m is 0 or 1, n is an integer of 1 to 5 and Q is a quarternary ammonium terminal group of the formula:

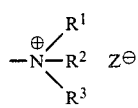 (I)

where each of $R^1$ and $R^2$ is a lower alkyl group, an aromatic group or a hydroxy-lower alkyl group, or $R^1$ and $R^2$ together form a tetramethylene or pentamethylene group, $R^3$ is a lower alkyl group, and Z is a counter ion for the quaternary ammonium ion,

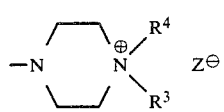

where $R^4$ is a lower alkyl group, and $R^3$ and Z are as defined above,

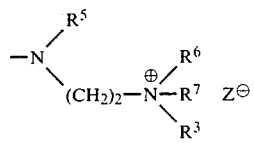

where $R^5$ is a hydrogen atom or a lower alkyl group, each of $R^6$ and $R^7$ is a lower alkyl group, or $R^6$ and $R^7$ together form a tetramethylene or pentamethylene group, and $R^3$ and Z are as defined above, or

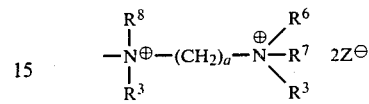

where $R^8$ is a lower alkyl group, a is an integer of 3 to 5, and $R^3$, $R^6$ and $R^7$ and Z are as defined above.

12. In a dialysis cell containing an ion exchange membrane the improvement comprising as the ion exchange membrane an anion exchange membrane comprising a perfluorinated main chain and a pendant chain of the formula:

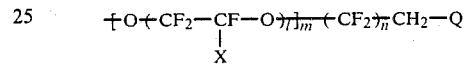

where X is fluorine, chlorine or CF$_3$, P is an integer of 0 to 5, m is 0 or 1, n is an integer of 1 to 5 and Q is a quaternary ammonium terminal group of the formula:

 (I)

where each of $R^1$ and $R^2$ is a lower alkyl group, an aromatic group or a hydroxy-lower alkyl group, or $R^1$ and $R^2$ together form a tetramethylene or pentamethylene group, $R^3$ is a lower alkyl group, and Z is a counter ion for the quaternary ammonium ion,

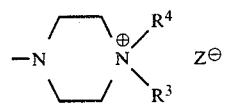

where $R^4$ is a lower alkyl group, and $R^3$ and Z are as defined above,

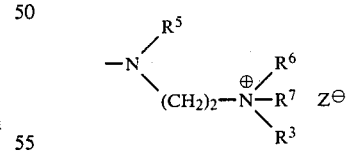

where $R^5$ is a hydrogen atom or a lower alkyl group, each of $R^6$ and $R^7$ is a lower alkyl group, or $R^6$ and $R^7$ together form a tetramethylene or pentamethylene group, and $R^3$ and Z are as defined above, or

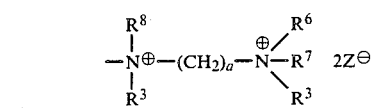

where $R^8$ is a lower alkyl group, a is an integer of 3 to 5, and $R^3$, $R^6$ and $R^7$ and Z are as defined above.

* * * * *